(12) United States Patent
Nishioka et al.

(10) Patent No.: US 7,269,344 B2
(45) Date of Patent: Sep. 11, 2007

(54) OPTICAL APPARATUS

(75) Inventors: Kimihiko Nishioka, Hachioji (JP); Kentaro Sekiyama, Hachioji (JP)

(73) Assignee: Olympus Corporation, Tokyo (JP)

( * ) Notice: Subject to any disclaimer, the term of this patent is extended or adjusted under 35 U.S.C. 154(b) by 94 days.

(21) Appl. No.: 10/775,340

(22) Filed: Feb. 11, 2004

(65) Prior Publication Data

US 2004/0184163 A1 Sep. 23, 2004

(30) Foreign Application Priority Data

Feb. 13, 2003 (JP) .............................. 2003-035430

(51) Int. Cl.
  G03B 13/36 (2006.01)
  G03B 17/00 (2006.01)
(52) U.S. Cl. .................... 396/60; 396/111; 348/240.2; 348/345
(58) Field of Classification Search ........ 359/676–693, 359/290–295, 298, 223, 224, 846–849, 872–881; 396/55, 60, 72, 89, 79–82, 257, 111; 348/208.7, 348/208.12, 240.12, 345, 347, 357, 362, 348/363, 240.2
See application file for complete search history.

(56) References Cited

U.S. PATENT DOCUMENTS

| | | | | |
|---|---|---|---|---|
| 4,950,054 A | * | 8/1990 | Wada et al. | 359/684 |
| 5,144,492 A | * | 9/1992 | Iijima et al. | 359/693 |
| 5,475,426 A | * | 12/1995 | Kinugasa et al. | 348/240.2 |
| 5,491,527 A | * | 2/1996 | Oshikiri et al. | 396/60 |
| 6,392,816 B1 | * | 5/2002 | Hamano | 359/683 |
| 6,437,925 B1 | * | 8/2002 | Nishioka | 359/291 |

(Continued)

FOREIGN PATENT DOCUMENTS

JP 2000-298237 10/2000

(Continued)

OTHER PUBLICATIONS

Vdovin, Gleb, "Quick focusing of imaging optics using micromachined adaptive mirrors," Optics Communications, Elsevier, No. 140, p. 187-190, (Aug. 1, 1997).

Primary Examiner—William B Perkey
(74) Attorney, Agent, or Firm—Pillsbury Winthrop Shaw Pittman LLP

(57) ABSTRACT

An optical apparatus has an imaging optical system provided with a deformable mirror and an electronic zoom function that an image recorded in an image sensor by the imaging optical system is magnified by image processing. A ray deflecting function of the deformable mirror is changed in accordance with a change of an object area corresponding to an image to be used, and aberration of the imaging optical system is optimized. The deformable mirror is controlled by an arithmetical unit connected to an image processor and a driving circuit. The electronic zoom is performed with respect to the image recorded in the image sensor through a signal processing circuit and the image processor, and when the image is displayed on a display device, the deformable mirror is deformed so that sharpness at nearly the center of an object image formed on the image sensor is improved. This offers the optical apparatus in which a compact design is achieved, the magnification of the optical system can be changed, and the sharpness of the image is high even when a variable magnification ratio is increased.

23 Claims, 50 Drawing Sheets

U.S. PATENT DOCUMENTS

| | | |
|---|---|---|
| 6,464,363 B1 | 10/2002 | Nishioka et al. |
| 6,618,209 B2 | 9/2003 | Nishioka et al. |
| 6,738,199 B2 * | 5/2004 | Nishioka ................... 359/291 |
| 6,771,417 B1 | 8/2004 | Wolleschensky et al. |
| 6,791,741 B2 * | 9/2004 | Hishioka ................... 359/291 |
| 6,801,370 B2 * | 10/2004 | Sekiyama et al. .......... 359/846 |
| 6,865,009 B2 * | 3/2005 | Nishioka ................... 359/295 |
| 7,019,919 B2 * | 3/2006 | Wakai et al. ............... 359/726 |
| 2002/0101646 A1 * | 8/2002 | Ide et al. ................... 359/295 |
| 2004/0190154 A1 * | 9/2004 | Wakai et al. ............... 359/676 |

FOREIGN PATENT DOCUMENTS

JP       2002-122784       4/2002

* cited by examiner

Fig. 3A

| A When electronic zoom is not performed: | ELECTRODE No. | | | |
|---|---|---|---|---|
| | 1 | 2 | 3 | ...... |
| OBJECT DISTANCE — far-point allowance | 7 0 | 6 0 | 7 5 | ...... |
| ⋮ | ⋮ | ⋮ | ⋮ | ...... |
| far point | 9 0 | 8 0 | 9 0 | ...... |
| ⋮ | ⋮ | ⋮ | ⋮ | ...... |
| near point | 1 1 5 | 1 1 0 | 1 1 5 | ...... |
| ⋮ | ⋮ | ⋮ | ⋮ | ...... |
| near-point allowance | 1 2 0 | 1 2 0 | 1 2 5 | ...... |

Fig. 3B

| B When electronic zoom is performed: | ELECTRODE No. | | | |
|---|---|---|---|---|
| | 1 | 2 | 3 | ...... |
| OBJECT DISTANCE — far-point allowance | 7 0 | 7 0 | 7 1 | ...... |
| ⋮ | ⋮ | ⋮ | ⋮ | ...... |
| far point | 8 9 | 8 5 | 8 8 | ...... |
| ⋮ | ⋮ | ⋮ | ⋮ | ...... |
| near point | 1 1 4 | 1 1 2 | 1 1 4 | ...... |
| ⋮ | ⋮ | ⋮ | ⋮ | ...... |
| near-point allowance | 1 2 4 | 1 2 3 | 1 2 4 | ...... |

TRANS-TYPE

CIS-TYPE

OPTICAL APPARATUS

BACKGROUND OF THE INVENTION

1. Field of the Invention

This invention relates to an optical apparatus for obtaining an image used by a user.

2. Description of Related Art

In the optical apparatus of this type, there has been the need that a user wants to observe in detail or magnify only a particular part of an image of an object should be observed in detail or magnified. In response to this, for example, in an imaging apparatus such as a digital camera or a TV camera, optical zoom or electronic zoom (also called digital zoom) has been used as the technique meeting the above need. The technique of the electronic zoom is set forth, for example, in Japanese Patent Kokai No. 2002-320135.

In a telescope, the magnification of an optical system has been changed by the replacement of an eyepiece to thereby meet the above need. In a microscope, an objective lens has been replaced to thereby satisfy the above need.

An optical apparatus using the electronic zoom, for example, the digital camera, is designed so that an image photographed and stored through an imaging optical system at the center of the imaging surface of an image sensor inside the digital camera is magnified by an image processor and is processed with respect to pixel interpolation. The image is thus displayed or output to a display device.

In the telescope or the microscope, when the eyepiece or the objective lens is replaced, combined aberration of the entire optical system is changed.

SUMMARY OF THE INVENTION

The optical apparatus according to the present invention has an optical system provided with a variable optical-property element so that a ray deflecting function of the variable optical-property element is changed in accordance with a change of an object area corresponding to an image to be used and aberration of the optical system is optimized.

The optical apparatus according to the present invention has a variable optical-property element, a driving circuit driving the variable optical-property element, and an electronic zoom function.

The optical apparatus according to the present invention preferably has at least two optical element units and at least one of the optical element units is changed in the electronic zoom.

The optical apparatus according to the present invention is a variable magnification optical apparatus that has the optical system provided with the variable optical-property element, in which the ray deflecting function of the variable optical-property element is changed in accordance with the magnification change of the optical system, and thereby aberration of the optical system changed in accordance with the magnification change is optimized.

The optical apparatus according to the present invention uses a combination of a plurality of optical units, one of which is provided with the variable optical-property element, so that the ray deflecting function of the variable optical-property element is changed in accordance with a variation of the combination, and thereby aberration of the optical system changed in accordance with the variation is optimized.

The optical apparatus according to the present invention includes a plurality of optical units, one of which is provided with the variable optical-property element, so that the ray deflecting function of the variable optical-property element is changed in accordance with the magnification change of the optical system, and thereby aberration of the optical system changed in accordance with the magnification change is optimized.

According to the present invention, the optical apparatus is any one of an observing apparatus, a telescope, a microscope, and an endoscope.

According to the present invention, the variable optical-property element is a variable focal-length lens or a variable mirror.

The optical apparatus according to the present invention is provided with an electronic zoom function so that a certain part of the optical system is changed in the electronic zoom, and thereby the image sharpness of an image area used in the electronic zoom is improved.

The optical apparatus according to the present invention has a variable optical-property element, a driving circuit driving the variable optical-property element, and an electronic zoom function. When the electronic zoom is performed, the variable optical-property element is driven so that the image sharpness of the image area magnified by the electronic zoom of the optical system including the variable optical-property element becomes best.

The optical apparatus according to the present invention has a variable optical-property element, a driving circuit driving the variable optical-property element, and an electronic zoom function. When the electronic zoom is performed, the variable optical-property element is driven so that the image sharpness of the image area magnified by the electronic zoom of the optical system including the variable optical-property element becomes best, taking account of a change of an imaging state caused by at least one of a change of an object distance, temperature, humidity, a manufacturing error, a change with age, vibration, and an optical magnification change.

The optical apparatus according to the present invention has a variable optical-property element, a driving circuit driving the variable optical-property element, and an electronic zoom function. When the electronic zoom is performed, the variable optical-property element is driven so that the image sharpness of the image area magnified by the electronic zoom of the optical system including the variable optical-property element becomes best, taking account of the manufacturing error of the optical apparatus.

The optical apparatus according to the present invention has a variable optical-property element, a driving circuit driving the variable optical-property element, driving information, an image sensor, and an electronic zoom function. When the electronic zoom is used to form an image, the variable optical-property element is driven so that aberration of the image of the image area magnified by the electronic zoom of the optical system including the variable optical-property element is reduced.

According to the present invention, the optical system including the variable optical-property element is a single focal-length optical system or a zoom optical system.

The optical apparatus according to the present invention preferably has an auto-focus function.

The optical apparatus according to the present invention is designed to form an image while changing driving information provided to the variable optical-property element, to find the driving information that the focus or contrast of a formed image becomes nearly best, and to drive the variable mirror through the driving information.

The optical apparatus according to the present invention preferably has an image shake correcting function.

The optical apparatus according to the present invention has a variable optical-property element, a driving circuit driving the variable optical-property element, at least one optical element unit, and an electronic zoom function. When the electronic zoom is performed, the variable optical-property element and the optical element unit are associated with each other to thereby improve the sharpness of the image area used in the electronic zoom.

The optical apparatus according to the present invention is such that the electronic zoom is performed and, at the same time, a stop is open.

The optical apparatus according to the present invention is such that an electronic zoom magnification satisfies the following condition in a certain state:

$$1.05 < \beta_E < 30 \times \sqrt{(M/10^6)}$$

where βE is the electronic zoom magnification and M is the number of pixels of an image sensor.

The optical apparatus according to the present invention is such that the number of pixels of the image sensor satisfies the following condition:

$$M \geq \text{two hundred thousand}$$

The optical apparatus according to the present invention has a telephonic function.

The optical apparatus according to the present invention is preferably a mobile phone.

The optical apparatus according to the present invention has an image display function.

The optical apparatus according to the present invention is such that when the electronic zoom is performed, at least one of the optical element units is moved and thereby the sharpness of a part of an image to be used is improved.

The optical apparatus according to the present invention is provided with an image sensor so that a stop is open in the electronic zoom.

According to the present invention, the optical apparatus in which a compact design is achieved, the magnification of the optical system can be changed, and even when a variable magnification ratio is increased, an image with high sharpness is obtained can be provided.

These and other features and advantages of the present invention will become apparent from the following detailed description of the preferred embodiments when taken in conjunction with the accompanying drawings.

BRIEF DESCRIPTION OF THE DRAWINGS

FIGS. 3A and 3B are explanatory views showing examples of data in an LUT;

DETAILED DESCRIPTION OF THE PREFERRED EMBODIMENTS

Figure 1:
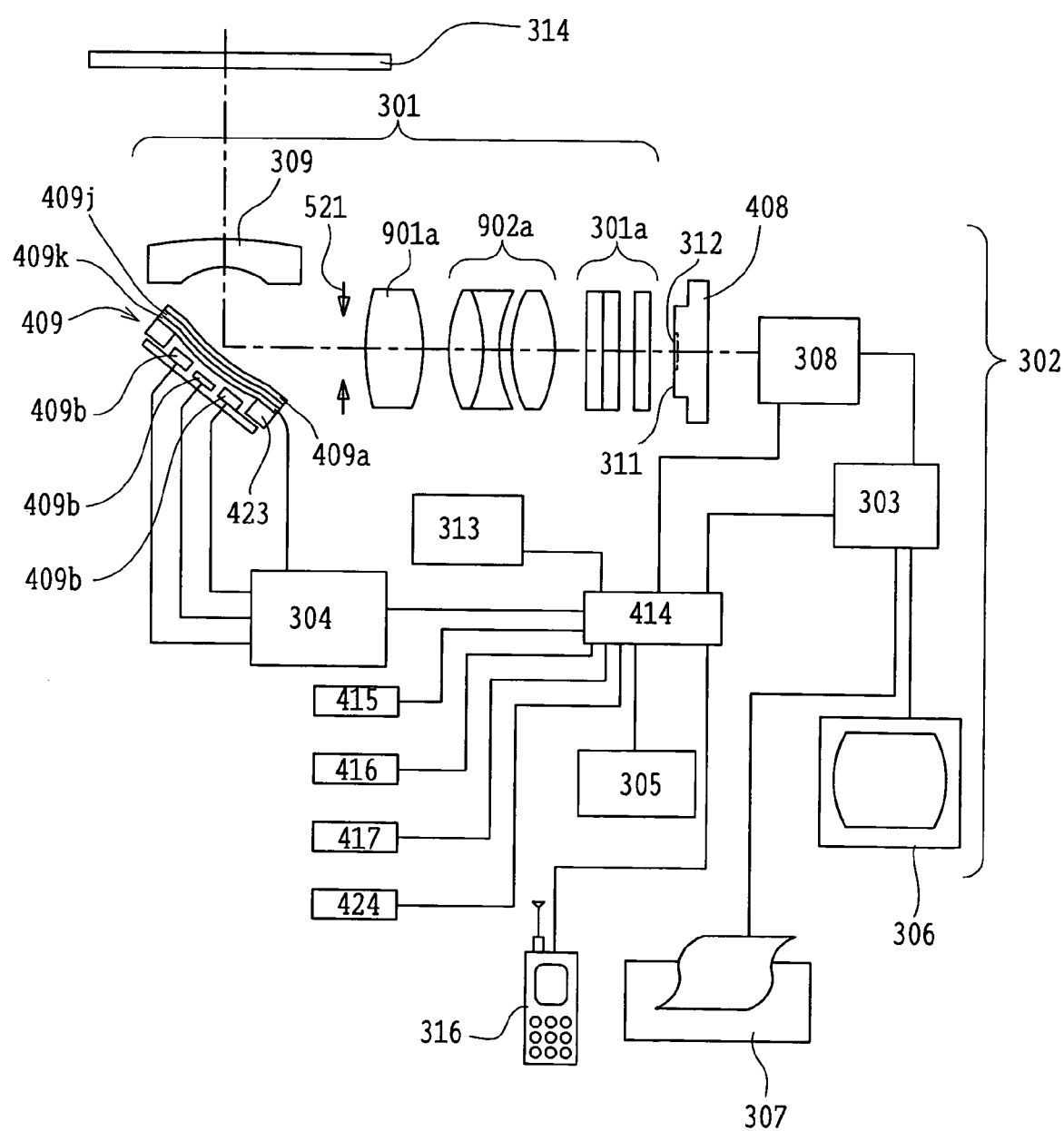
FIG. 1 is a view schematically showing a first embodiment of the optical apparatus according to the present invention.

FIG. 1 shows the first embodiment of the optical apparatus of the present invention. In this embodiment, an optical apparatus 302 has an imaging optical system 301 provided with a variable mirror 409 as the variable optical-property element and an electronic zoom function that an image recorded in a recording element, such as the image sensor, by the imaging optical system 301 is magnified by image processing.

The electronic zoom, also called digital zoom, as set forth, for example, in Kokai No. 2002-320135, is adapted to perform zoom processing in a preset direction with respect to image data stored in a memory so that a plurality of pixels are allocated to addresses.

The imaging optical system 301 includes, in order from the object side, a concave lens 309, the variable mirror 409, an aperture stop 521, a convex lens 901a, a convex lens unit 902a with two lens components composed of three lens elements, and a filter unit 301a, having a low-pass filter and/or an infrared cutoff filter, which does not affect imaging performance.

The imaging optical system is a single focal-length optical system and is constructed so that when an object distance is changed by the deformation of a thin film 409a constituting the reflecting surface of the variable mirror 409, focusing can be carried out.

The variable mirror 409, which includes a deformable three-layer structure supported on the upper surface of an annular support 423, has a thin film 409a whose surface layer constitutes a reflecting surface, an intermediate substrate 409j holding the thin film 409a, a thin lower-layer electrode 409k, and a plurality of electrodes 409b arranged at preset intervals with respect to the electrode 409k on the lower side of the support 423. The electrode 409k and the plurality of electrodes 409b are connected to a driving circuit 304 provided with voltage-controllable, variable resistors so that preset voltages are selectively applied between the electrode 409k and the plurality of electrodes 409b to deform the thin film 409a.

The driving circuit 304 is connected to an arithmetical unit 414 which calculates the configuration of the thin film 409a subjected to deformation in the electronic zoom, that is, the position and the amount of deformation of the thin film 409a and outputs a control signal in accordance with the result of the calculation. A temperature sensor 415 securing the working ambient data of the optical apparatus, a humidity sensor 416, and a range sensor 417 are connected to the arithmetical unit 414.

The electronic zoom is performed through a signal processing circuit 308 which acquires a pixel signal by timing from individual pixels (light-receiving elements) constituting the imaging surface of an image sensor 408 to process the signal so that a real time moving image of the object formed on the imaging surface of the image sensor 408 by the imaging optical system 301 is displayed on a display device 306, an image processor 303 which processes data signal-processed by the signal processing circuit 308 so that the data are displayed as a magnified image on the display device 306, and the arithmetical unit (microprocessor) 414 which calculates the control signal deforming the reflecting surface of the variable mirror 409 so that the control signal such as to acquire the pixel signal by timing with respect to the signal processing circuit 308 is output and focusing of the imaging optical system 301 and the sharpness of the image at nearly the center of the imaging surface are improved in a focus state of the magnified image where the image is processed by the image processor 303.

The arithmetical unit 414 is provided with a calculating means for making calculations in the electronic zoom and a calculating means for making calculations to control the shape of the variable mirror 409 in accordance with a signal from the above calculating means and signals from the sensors 415, 416, and 417.

The variable mirror 409 is thus constructed so that it is controlled by the arithmetical unit 414 connected to the image processor 303 and the driving circuit 304. In order to perform the electronic zoom with respect to the image recorded in the image sensor 408 through the signal processing circuit 308 and the image processor 303 and to heighten the sharpness at nearly the center of an object image (an image of the object to be photographed) formed on the image sensor 408 when the image is displayed on the display device 306, the variable mirror 409 is driven through the driving circuit 304, including the case of focusing, so that the thin film 409a constituting the reflecting surface of the variable mirror 409 is deformed.

In addition to being displayed on the display device 306, the image processed by the image processor 303 can be printed by a printer 307 and can also be recorded and stored in a memory 305. In the first embodiment, the sensors 415, 416, and 417 and the printer 307 need not necessarily be provided.

Figure 2:
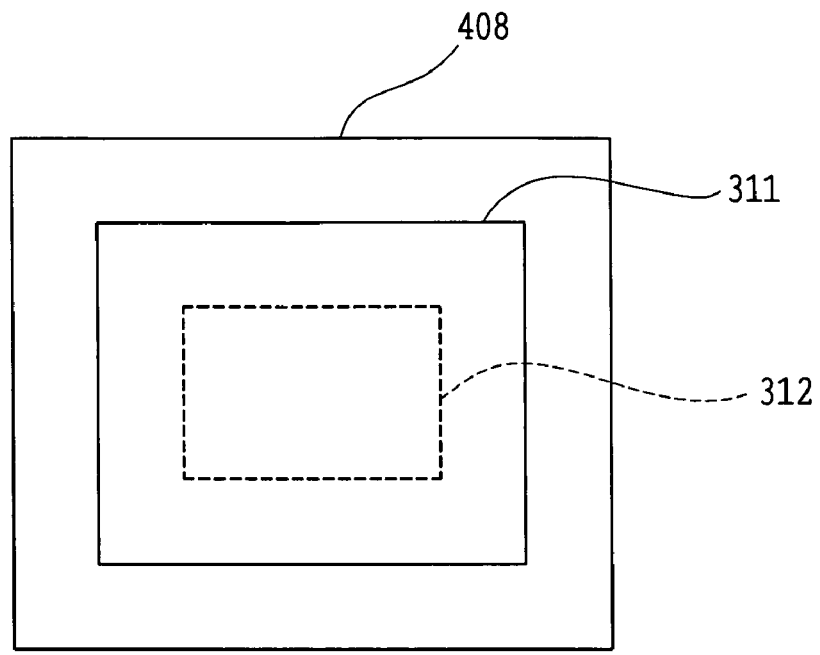
FIG. 2 is an explanatory view showing the relationship between an imaging surface of an image sensor and an image to be formed in the optical apparatus.

FIG. 2 shows the relationship between the imaging surface of the image sensor and the image to be formed. In a conventional imaging apparatus, when ordinary electronic zoom is performed, only a center portion 312 of an imaging surface 311 of the image sensor 408 is displayed as an image on the display device 306 such as that shown in FIG. 1, is printed through the printer 307, or is stored in the memory 306. This image is magnified by the image processor 303 and is processed with respect to pixel interpolation. The image is thus output to the display device. In this state, however, aberration produced in the imaging optical system 301 for forming the image of an object 314 on the image sensor 408 also becomes a magnified image, and hence there is the drawback that the image is blurred.

Thus, the first embodiment shown in FIG. 1, when performing the electronic zoom, is provided with a control means for controlling the shape of the thin film 409a constituting the reflecting surface where the image is formed on the imaging surface 311 of the image sensor 408 so that aberration of the image of the center portion 312 of the imaging surface 311 is reduced. In this case, aberration of the image of the outside area of the center portion 312 may be deteriorated. This is because, in most cases, the image of the outside area is not displayed nor stored. However, control may, of course, be made so that the aberration of the outside area of the center portion 312 is corrected.

As a specific control means, for example, a look-up table (hereinafter abbreviated to LUT) such as that shown in each of FIGS. 3A and 3B is used. Each of FIGS. 3A and 3B shows an example of data matrix in the LUT.

The LUT of this embodiment is the data matrix in which the column title is the object distance (photographing distance) from the first surface on the object side of the imaging optical system 301 in the optical apparatus of FIG. 1 to the object 314 and the row title is the electrode number of the electrodes 409b. Numerical values in the LUT of each figure are the ones of voltages applied between the electrodes 409b and the electrode 409k at individual object distances. The voltages are expressed in volts. The LUT is stored in a LUT data section 313 of the optical apparatus in FIG. 1.

The LUT data section 313 is controlled so that when the electronic zoom is not performed, the data of the LUT of FIG. 3A are used, while when the electronic zoom is performed, the data of the LUT of FIG. 3B are used.

In the data of the LUT of FIG. 3A, the voltages are set so that the thin film 409a is deformed and thereby aberration of the image on the entire imaging surface 311 of the image sensor 408 is reduced, whereas in the data of the LUT of FIG. 3B, the voltages are set so that the thin film 409a is deformed and thereby aberration of the image of the center portion 312 on the imaging surface 311 is reduced.

In the optical apparatus of the present invention, the LUTs constructed as mentioned above are used, and thus even when the electronic zoom is performed, an image with high sharpness can be photographed, displayed, and stored.

Also, the far-point allowance and the near-point allowance in FIGS. 3A and 3B are values used for the purpose that when photo-focusing of a hill-climbing method (or called a contrast method) takes place, an image is first brought to a considerably out-of-focus state to find a position where the contrast of the image is low and then to determine a position where the contrast of the image is maximized while scanning the LUT from the above state and gradually changing focusing.

In the optical apparatus of FIG. 1, since an electrostatic driving variable mirror is used as the variable mirror 409, the values in the LUT are indicated by the voltages, but an electromagnetic driving variable mirror may be used. In this case, it is merely necessary that the values in the LUT are indicated by electric currents flowing through the individual electrodes. Also, in the present invention, the value of the voltage or electric current used for driving the thin film 409 is referred to as driving information.

Although the optical apparatus of FIG. 1 is constructed to use the variable mirror 409, the present invention is not limited to this construction, and a zoom operation may be performed by a combination of a variable optical-property element which can change aberration, such as a variable focal-length lens or a variable prism, and the electronic zoom.

Figure 36:
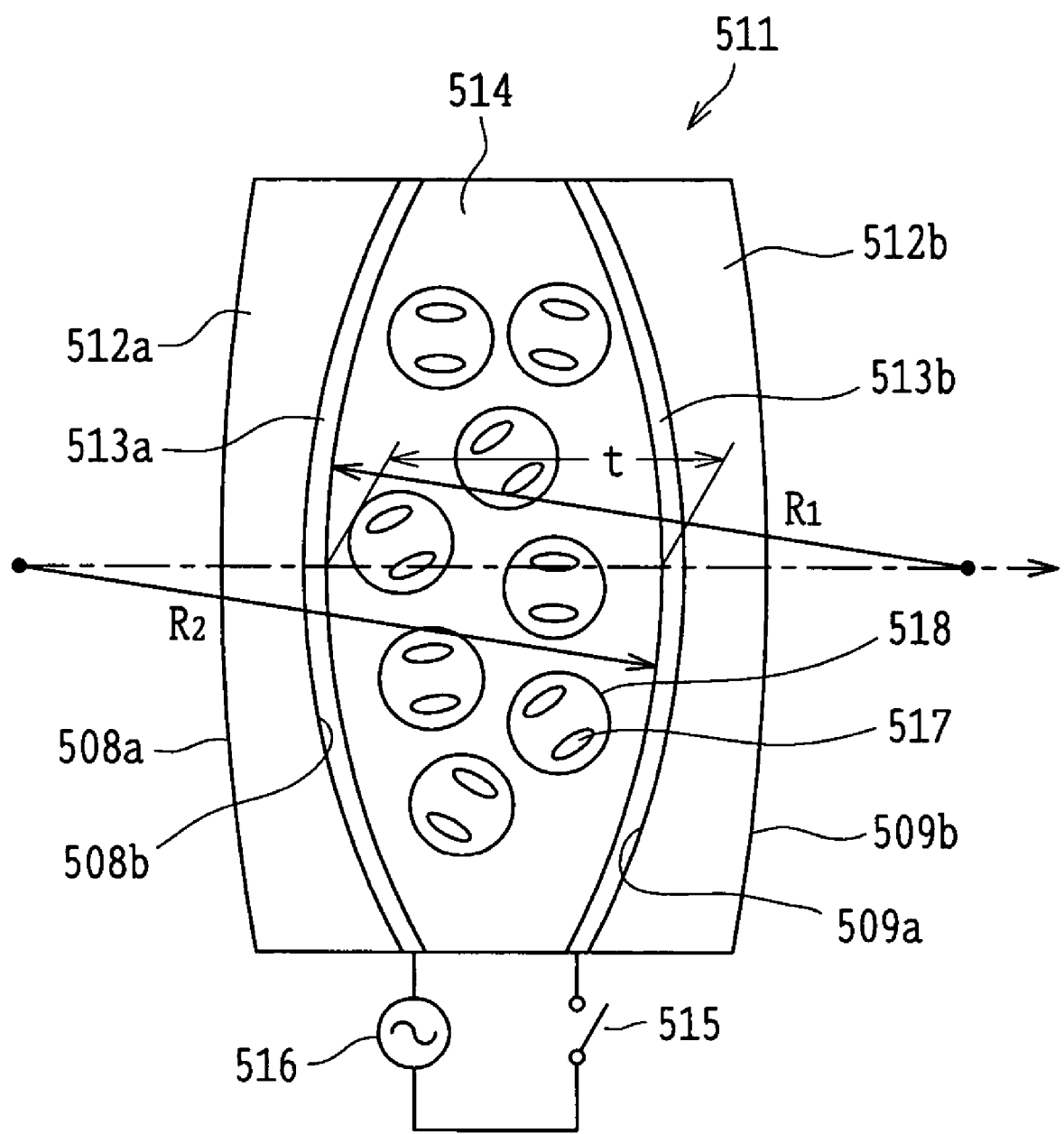
FIG. 36 is a view showing the principle structure of a variable focal-length lens applicable to the optical system of the present invention.

The variable focal-length lens is shown, for example, in FIG. 36. In a variable focal-length lens 511 of FIG. 36, when an electrode 513a or an electrode 513b is divided into a plurality of electrodes, aberration of the image used as a picture, like the optical apparatus of FIG. 1, can be reduced.

The optical apparatus of the first embodiment may be constructed so that numerical values derived from the LUTs of FIGS. 3A and 3B are interpolated to obtain the optimum driving information.

When the values in the LUTs of FIGS. 3A and 3B are determined, the design values of the imaging optical system 301 may be used, but alternatively, the values in the LUTs may be determined so that when the optical apparatus 302 is fabricated, aberration or the MTF of the image formed by the imaging optical system 301 becomes best, including the fabrication error. By doing so, an optical apparatus with a higher degree of accuracy than the case where only the design values are used to determine the values in the LUTs can be provided.

Specifically, it is only necessary that, for example, the test chart 314 provided as the object is placed at each of some object distances and is imaged by the optical apparatus 302, and after the values of the LUTs are determined so that the contrast of the test chart 314 placed at each distance is optimized in cases where the electronic zoom is performed and not, the values are stored in the LUT data section 313.

The optical apparatus of the first embodiment may also be constructed so that, for example, the LUT is used to improve imaging performance where the electronic zoom takes place, with respect to the degradation of imaging performance of the optical apparatus attributable to changes in temperature and humidity, a change with age, and an image shake caused by an unsteady hold and vibrations.

For image shake compensation, it is only necessary that the shake of the optical apparatus is detected by a shake sensor 424 connected to the arithmetical unit 414, and the thin film 409a is deformed through the driving circuit 304 so that the shake is canceled. In addition, it is only necessary to provide driving information for shake compensation to the image processor 303.

In the optical apparatus of FIG. 1, the imaging optical system 301 is constructed as a single focal-length optical system, but it can be done as a zooming optical system. In this case, the optical apparatus with a higher zoom ratio, in addition to the electronic zoom, is obtained. However, when the imaging optical system 301 is constructed as the zooming optical system, the mechanical size of the optical apparatus is increased. In this case also, by using the LUTs as an aberration compensating means in the electronic zoom, as described with reference to FIGS. 2, 3A, and 3B, an image with high sharpness is obtained.

It is only necessary that, in addition to the data shown in FIGS. 3A and 3B, the LUTs in this case possess data provided with the driving information in FIGS. 3A and 3B in accordance with optical zoom states at telephoto, middle, and wide-angle positions of the optical system. Alternatively, the optical apparatus may be designed so that when the electronic zoom is performed at only the telephoto position in the optical zoom, the LUTs possess data provided with the driving information in FIGS. 3A and 3B at only the telephoto position.

When the electronic zoom is performed with a plurality of kinds of magnification, the LUTs may possess data groups provided with the driving information in FIGS. 3A and 3B in accordance with the kind of magnification. For example, in order to perform the electronic zoom with four kinds of magnification, it is only necessary to possess data groups provided with four kinds of driving information.

Figure 4:
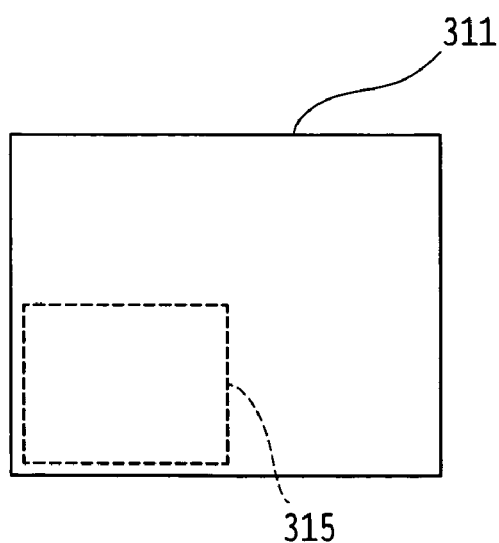
FIG. 4 is an explanatory view showing the relationship between the imaging surface of the image sensor and the image to be formed in the optical apparatus.

As an area magnified by the electronic zoom, not only the middle portion of an imaging area indicated as the center portion 312 of the imaging surface 311 in FIG. 2, but also, for example, as shown in FIG. 4, an arbitrary portion such as one portion 315 of the imaging surface 311 divided into four can be used. In this case, it is only necessary that, by possessing the data provided with the driving information in FIGS. 3A and 3B, the variable mirror 409 is controlled so that aberration produced by the imaging optical system 301 in the area of the portion 315 is reduced.

Subsequently, a description will be given of the electronic zoom magnification. If the electronic zoom magnification is too high, an image becomes rough, which is unfavorable. If it is too low, the effect of adoption on the electronic zoom will not be obtained. Here, when the number of pixels is represented by M and the electronic zoom magnification is represented by $\beta_E$, it is desirable that the electronic zoom magnification $\beta_E$ satisfies the following condition:

$$1.05 < \beta_E < 30 \times \sqrt{(M/10^6)} \quad (1)$$

The upper limit of Condition (1) is proportional to $\sqrt{M}$, because even when the image is magnified as the number of pixels is increased, the roughness of the image becomes invisible.

When the following condition is satisfied, the roughness of the image is invisible and the efficiency of image magnification is increased, which is favorable.

$$1.1 < \beta_E < 15 \times \sqrt{(M/10^6)} \quad (1')$$

When the following condition is further satisfied, an image whose roughness is hard to see even in printing is obtained, which is favorable.

$$M \geq \text{two hundred thousand} \quad (2)$$

In the optical apparatus of FIG. 1, when the imaging optical system 301 is panfocus, that is, in the case where focus adjustment is unnecessary even though the object distance is varied, the variable mirror 409 can be controlled for only the purpose of correcting aberration in the electronic zoom. In this case, the data provided with the driving information of the LUTs in FIGS. 3A and 3B are such that the number of variable values in the column title is decreased to 1 or close to 1.

In the optical apparatus of the first embodiment, it is convenient to provide a telephonic function 316, such as a mobile phone, to the optical apparatus 302. The optical apparatus 302 of this embodiment may be incorporated in the mobile phone. This is very favorable because photographing is performed by a compact apparatus in which zoom is possible, and an image with high sharpness is obtained.

Figure 5:
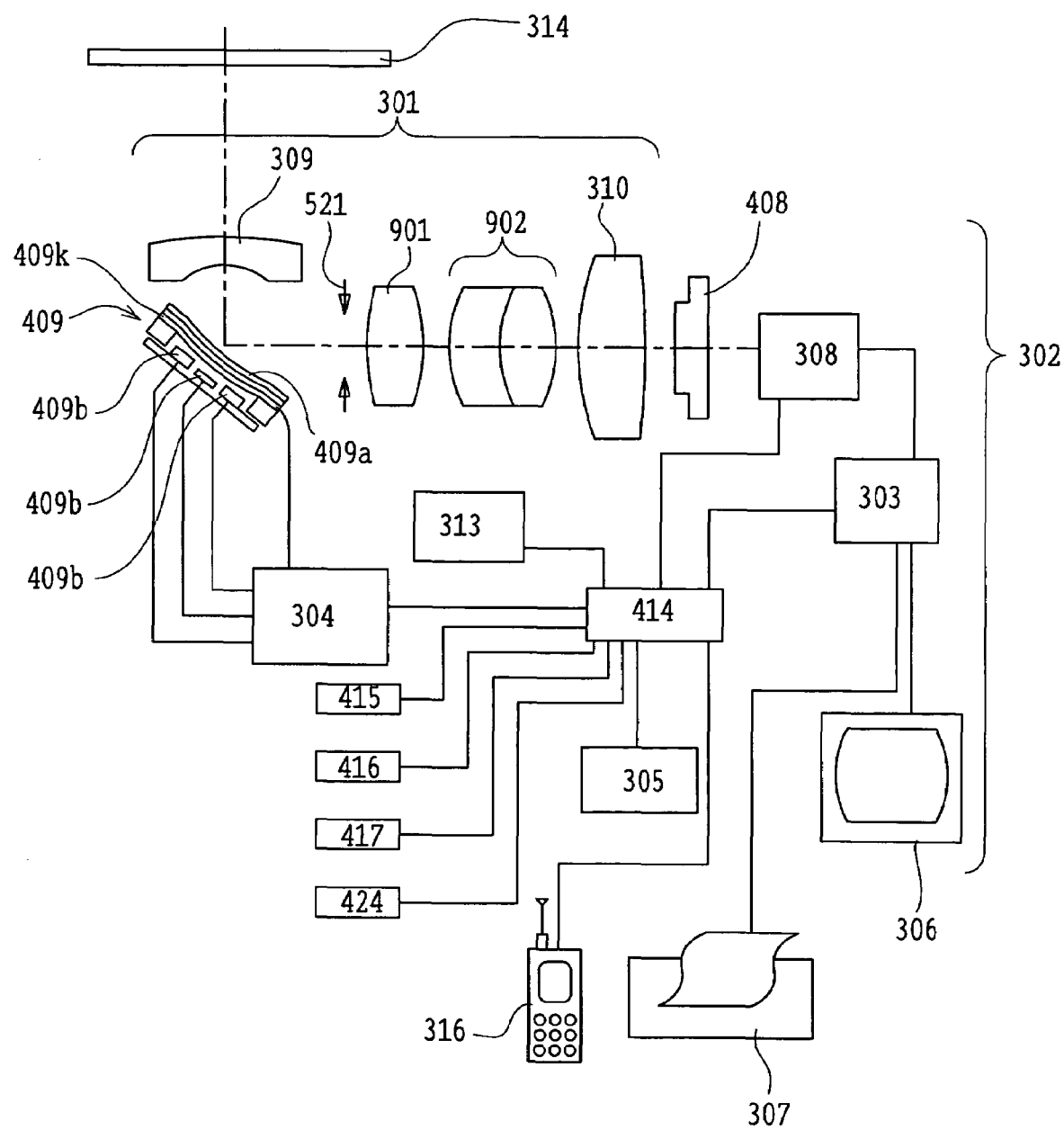
FIG. 5 is a view schematically showing a second embodiment of the optical apparatus according to the present invention.

FIG. 5 shows the second embodiment of the present invention. The optical apparatus 302 of the second embodiment has the same structure as that of the first embodiment with the exception of the imaging optical system 301. Specifically, the imaging optical system 301 of the second embodiment includes, in order from the object side, the concave lens 309, the variable mirror 409, the aperture stop 521, a convex lens 901, a convex lens unit 902 with one lens component composed of two lens elements, and a convex lens 310.

The variable mirror 409 used in the optical apparatus 302 of the second embodiment, an arithmetical control means for controlling the shape of the thin film 409a of the variable mirror 409, and an electronic zoom display means for magnifying and displaying the object image formed on the imaging surface of the image sensor by performing the electronic zoom are identical with those of the first embodiment, and thus their explanation is omitted. The optical apparatus of the second embodiment brings about the same effect as that of the first embodiment.

Figure 6:
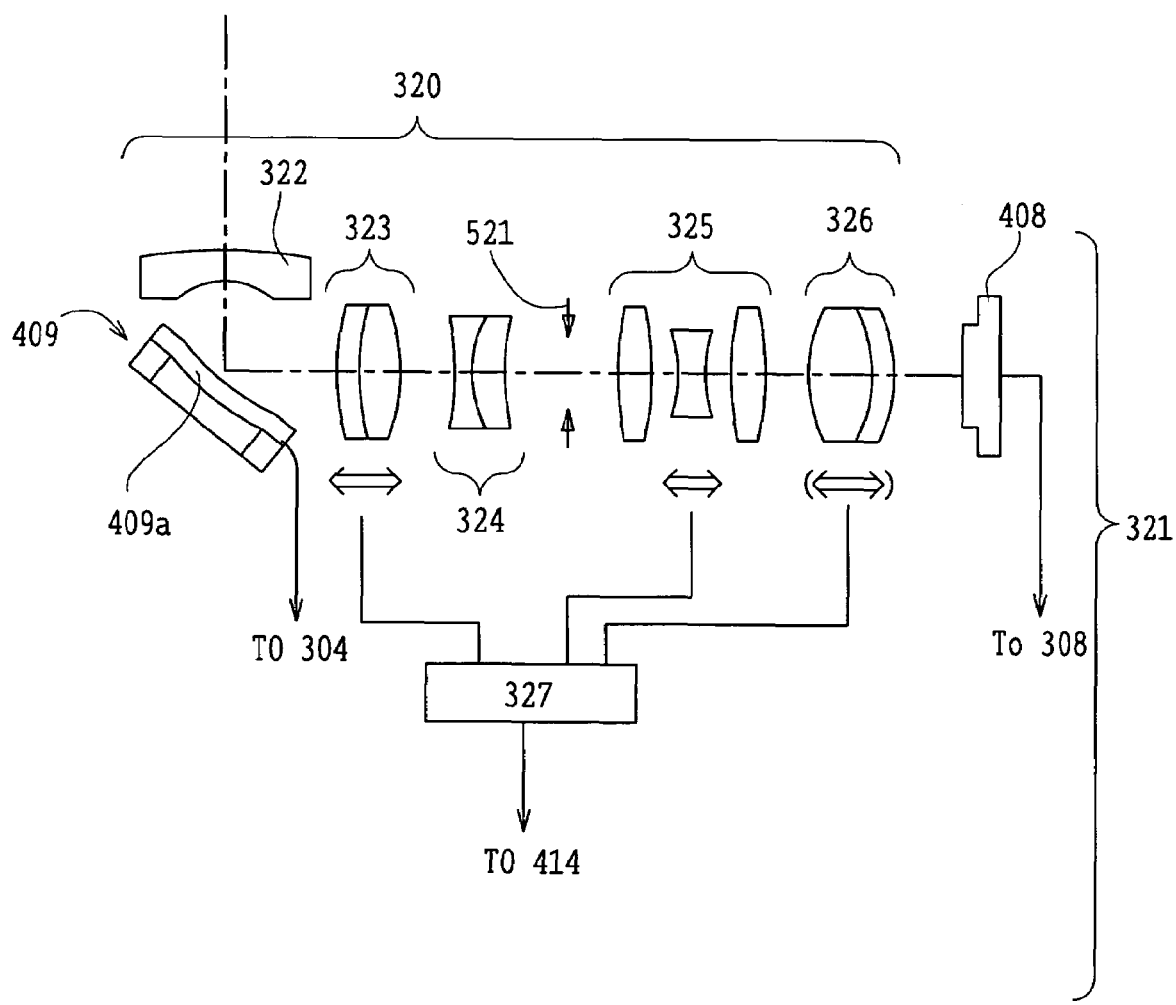
FIG. 6 is a view schematically showing a third embodiment of the optical apparatus according to the present invention.

FIG. 6 shows the third embodiment of the present invention. An optical apparatus 321 of the third embodiment, in which the imaging optical system is constructed as a zooming optical system 320, has the same structure as the optical apparatus 302 of the first embodiment with the exception of the imaging optical system. The optical apparatus 321 of the third embodiment is constructed by combining the zooming optical system 320 with the electronic zoom described in the first embodiment. Also, the same parts as in the optical apparatus of the first embodiment, that is, the signal processing circuit 308, the driving circuit 304, etc., are omitted from FIG. 6.

The zooming optical system 320 includes, in order from the object side, a concave lens 322, the variable mirror 409, a lens unit 323, a fixed lens unit 324, the aperture stop 521, a lens unit 325, and a lens unit 326. The lens unit 323 is a variable magnification lens unit and the lens unit 325 is a compensator. They are designed to move along the optical axis (in the directions of arrows in FIG. 6) in the zoom operation. The variable mirror 409 is constructed to perform focusing where the object distance is changed and to correct a focus shift which cannot be completely corrected by the compensator 325 in the zoom operation. When the lens unit 326 is designed to be movable along the optical axis together with the lens units 323 and 325, usefulness to be described later is obtained. These lens units 323, 325, and 326 are driven through a driving device 327 controlled by the arithmetical unit 414.

In the optical apparatus 321 of the third embodiment, as well as in the optical apparatus 302 of the first embodiment, when the electronic zoom is performed, the shape of the thin film 409a is optimized and the image is formed so that the sharpness of the area used as the image in the image sensor is improved.

The optical apparatus 321 of the third embodiment may be constructed so that the variable mirror 409 is replaced with a mirror whose shape is not changed and the lens unit 326 is moved along the optical axis (in the directions of arrows of the FIG. 6), thereby improving the sharpness of the area used as the image where the electronic zoom is performed. That is, when it is designed so that the three lens units 323, 325, and 326 can be moved, the degree of freedom for adjusting aberration can be provided in addition to the magnification change and correction for the focus shift caused by the magnification change. Consequently, when the electronic zoom is performed, the lens units 323, 325, and 326 are together moved along the optical axis, and thereby an image which is high in sharpness can be obtained.

Also, when the optical apparatus 321 of the third embodiment, as shown in FIG. 6, is provided with the variable mirror 409, at least one of the lens unit 325 constituting the compensator, the lens unit 326, and the lens unit 323 constituting the variable magnification lens unit is moved along the optical axis (in the directions of arrows of FIG. 6) while changing the shape of the variable mirror 409. Whereby, the optical zoom magnification is maintained to have a necessary value so that the sharpness of only the image used by the electronic zoom is improved while bringing the object into focus. The optical apparatus 321 may be constructed as mentioned above. By doing so, the number of degrees of freedom of correction for aberration of the image is increased, and thus an image with high sharpness can be obtained.

Figure 7:
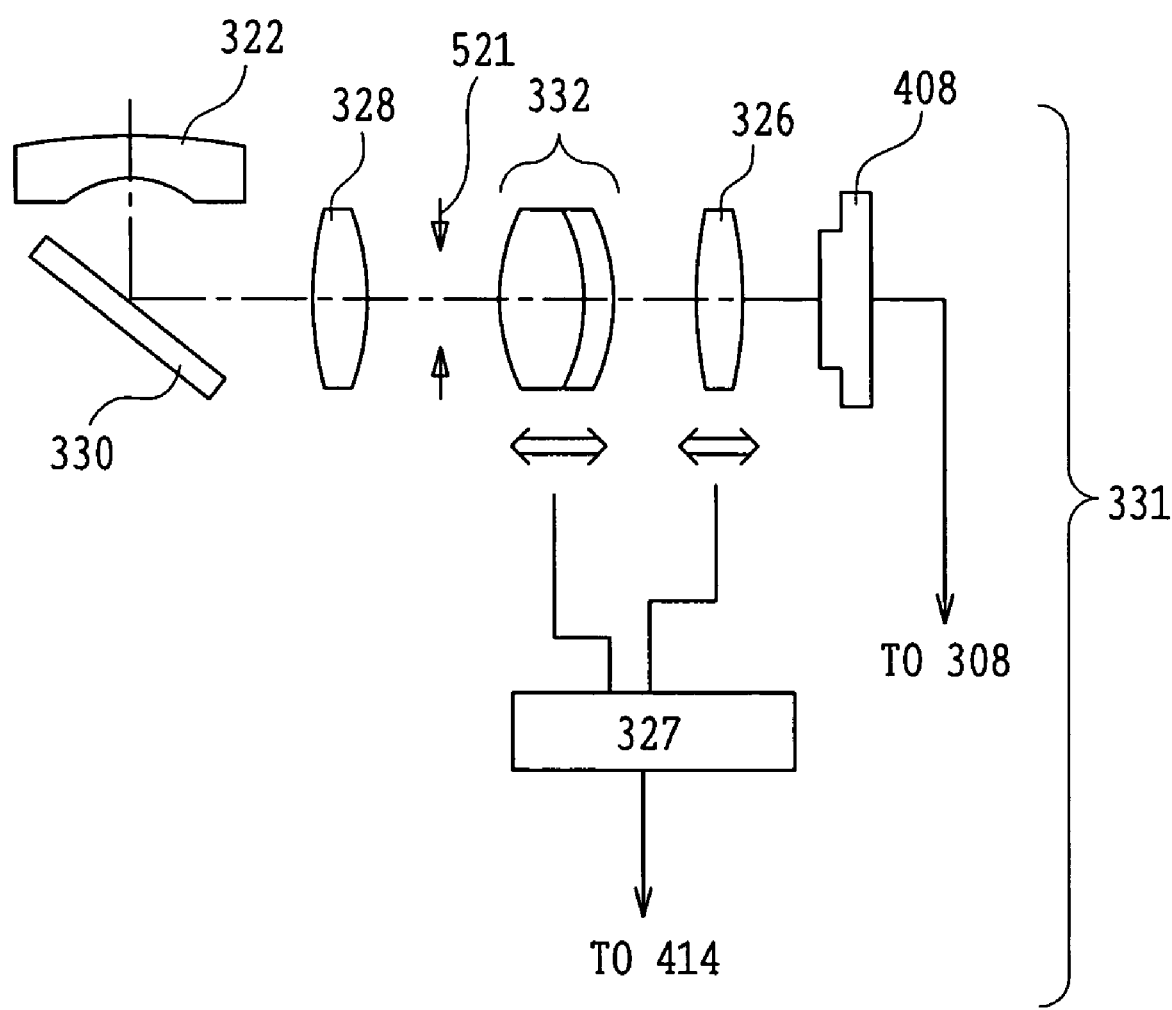
FIG. 7 is a view schematically showing a fourth embodiment of the optical apparatus according to the present invention.

FIG. 7 shows the fourth embodiment of the present invention. An optical apparatus 331 of the fourth embodiment is constructed so that a mirror 330 whose shape is not changed has the electronic zoom function. In this optical apparatus, two optical element units (a lens unit 332 and the lens unit 326) are together moved along the optical axis (in the directions of arrows of FIG. 7). Whereby, the driving device 327 is controlled by the arithmetical unit 414 so as to make correction for aberration where the electronic zoom is performed and to carry out focusing where the object distance is changed.

When the electronic zoom is performed, the lens units 332 and 336 are together moved along the optical axis (in the directions of arrows of FIG. 7) in accordance with the object distance so that the sharpness of only the area used as the image in the image sensor 408 is improved. Whereby, the driving device 327 is controlled by the arithmetical unit 414.

The optical apparatus 331 of the fourth embodiment, instead of using the mirror 330 whose shape is not changed, shown in FIG. 7, may be constructed to use the variable mirror 409 such as that shown in FIG. 1. In this case, one of the lens units 332 and 326 may be fixed. The variable mirror 409 and one of the lens units 332 and 326 are together driven when the electronic zoom is performed, and thereby the sharpness of the image of the area used in the electronic zoom can be improved.

When the pan-focus optical system is constructed, the focus position need not be corrected even when the object distance is changed, and hence one of the lens units 332 and 326 may be moved. In this case, it is only necessary that the focal length of the lens unit to be moved is set at nearly infinity.

The optical apparatus 331 of the fourth embodiment may also be constructed to open the stop simultaneously with the start of the electronic zoom in order to decrease the F-number of the optical system. This is because a decrease in F-number brings about an increase in diffraction limited frequency and the improvement of the sharpness of the image. Moreover, since exposure time is reduced, the image shake is lessened, which is favorable. At the same time, when the surface profile of the variable mirror 409 is optimized, the sharpness of the image can be further improved, which is more favorable. In an imaging apparatus or optical apparatus which has no variable optical-property element, the aperture stop may, of course, be opened at the start of the electronic zoom.

Figure 8:
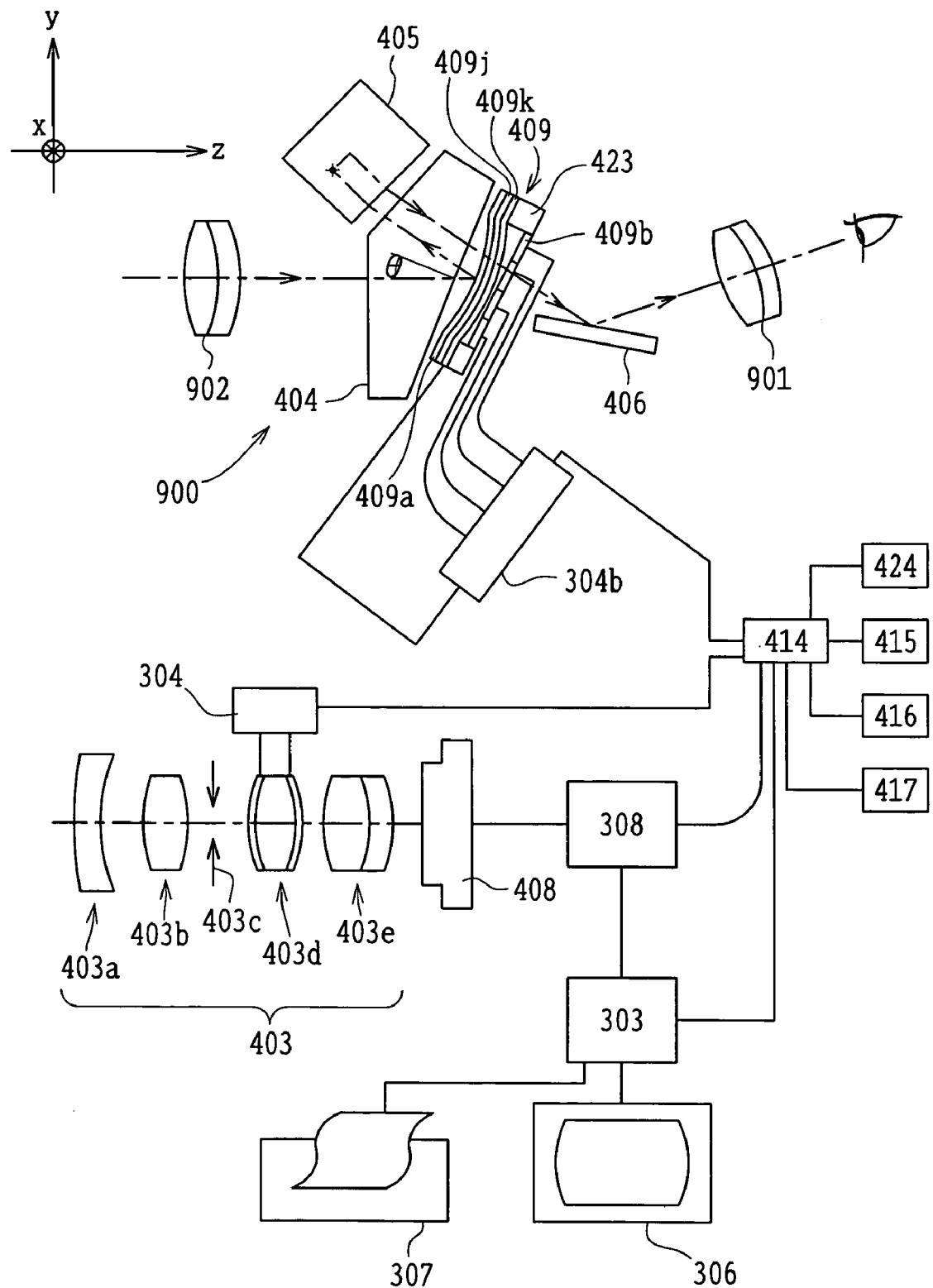
FIG. 8 is a view schematically showing a fifth embodiment of the optical apparatus according to the present invention.

FIG. 8 shows the fifth embodiment of the present invention. The optical apparatus of the fifth embodiment has an observation optical system 900 provided with the variable mirror 409 as the variable optical-property element, an imaging optical system 403 provided with a variable focal-length lens 403*d* as the variable optical-property element, and an electronic zoom function that an image recorded in the image sensor 408 as a recording element by the imaging optical system 403 is magnified by image processing. This construction is applicable to a digital camera that has a Keplerian finder. It is also applicable to a silver-halide film camera. In the silver-halide film camera, the electronic zoom cannot be performed, but only a part of the film may be magnified so that it is printed on printing paper. Alternatively, the film may be read by a film scanner so that only a necessary part of the image is magnified and used.

The optical apparatus of the fifth embodiment is designed so that, for example, an object (to be photographed) is observed in a wide range by the observation optical system 900 to determine the area of the object image (the image to be photographed), and in accordance with this result, the object image is recorded in the image sensor 408 through the imaging optical system 403 and the recorded object image can be magnified by the electronic zoom. In this optical apparatus, when the electronic zoom is performed, the variable mirror 409 is driven through the driving circuit 304, including the case of focusing, so that the sharpness of the image at nearly the center of the object image formed on the image sensor 408 is heightened and the variable focal-length lens 403*d* placed in the imaging optical system 403 is deformed. The driving circuit 304 is connected to the arithmetical unit (microprocessor) 414 described with reference to FIG. 1.

The observation optical system 900, as shown in FIG. 8, includes an objective lens 902, an eyepiece 901, a prism 404, an isosceles rectangular prism 405, a mirror 406, and the variable mirror 409.

The variable mirror 409, which includes the deformable three-layer structure supported on the upper surface of the annular support 423, has the thin film 409*a* in which the surface layer of the three-layer structure constitutes a reflecting surface, the intermediate substrate 409*j* holding the thin film 409*a*, the thin lower-layer electrode 409*k*, and the plurality of electrodes 409*b* arranged at preset intervals with respect to the electrode 409*k* on the lower side of the support 423. The electrode 409*k* and the plurality of electrodes 409*b* are connected to a driving circuit 304*b* provided with voltage controllable, variable resistors so that preset voltages are selectively applied between the electrode 409*k* and the plurality of electrodes 409*b* to deform the thin film 409*a*. The driving circuit 304*b* is connected to the arithmetical unit (microprocessor) 414.

According to the observation optical system 900 constructed as mentioned above, light from the object is refracted by the entrance and exit surfaces of the objective lens 902 and the prism 404, and after being reflected by the thin film 409*a* constituting the reflecting surface of the variable mirror 409, passes through the prism 404. The light is further reflected by the isosceles rectangular prism 405 and is reflected by the mirror 406 to enter an observer's eye through the eyepiece 901. (Also, in the figure, a mark + on the optical path indicates that a ray of light travels toward the back side of the plane of the page.)

In the observation optical system 900, when a wider area than an expected imaging area (the area of a larger field angle than an expected imaging field angle) is observed and then the area (the expected imaging field angle) of an object image to be formed (an image of an object to be photographed) is stopped down and determined, the profile of the thin film 409*a* of the variable mirror 409 is deformed into an extended surface through the driving circuit 304*b* by the control of the arithmetical unit 414 and a focusing adjustment is made in accordance with an observer's diopter. At the same time, it is possible to suppress deformations of the lenses 901 and 902 and/or the prism 404, the isosceles rectangular prism 405, and the mirror 406 and changes in refractive index, caused by changes in temperature and humidity, or the degradation of imaging performance by the expansion and deformation of a lens frame and assembly errors of parts such as optical elements and frames. In this way, the focusing adjustment and correction for aberration produced by the focusing adjustment can be always properly made.

On the other hand, the imaging optical system 403 includes, in order from the object side, a first lens 403*a*, a second lens 403*b*, a stop 403*c*, the variable focal-length lens 403*d* constructed as a third lens in which the focal length can be changed and correction for aberration and focusing in the optical system 403 are possible, and a fourth lens 403*e*. Behind the imaging optical system 403, the image sensor 408 is placed.

The imaging optical system 403 is set so that, on the basis of the information of the area (the expected imaging field angle) of the object image stopped down through the observation optical system 900, the shape of the variable focal-length lens 403*d* in the imaging optical system 403 is deformed into a proper extended surface through the driving circuit 304 by the control of the arithmetical unit 414, and the sharpness of the image at nearly the center of the stopped-down object image formed on the image sensor 408 is heightened.

Thus, in the optical apparatus shown in FIG. 8, on the basis of the information of the area of the object image stopped down through the observation optical system 900, the image is recorded in the image sensor 408 by the imaging optical system 403 and the electronic zoom, as in FIG. 1, is performed with respect to the recorded image through the signal processing circuit 308 and the image processor 303. When the image is displayed on the display device 306, the profile of the lens surface of the variable focal-length lens 403*d* is changed so that the sharpness of the image at nearly the center of the object image (the image of the object to be photographed) formed on the image sensor 408 is heightened, or the variable focal-length lens 403*d* is drived by the driving circuit 304 so that the refractive index is changed.

According to the optical apparatus of the fifth embodiment constructed as mentioned above, in either the observation optical system or the imaging optical system of the optical apparatus, there is no need to move a part of lens units along the optical axis for the zoom operation. Even when the electronic zoom is performed, the image is recorded in the image sensor 408 constructed as the recording element in a state where the optical system is controlled so that aberration is completely reduced. Hence, the optical apparatus can be downsized and even though the zoom ratio is increased, the optical apparatus which forms an image with high sharpness is obtained.

In the optical apparatus of FIG. 8, unit construction in which the prism 404 and the variable mirror 409 of the observation optical system 900 are integrally configured is convenient for assembly. When the lenses 901 and 902, the prisms 404 and 405, and the mirror 406 are molded out of plastic, curved surfaces of desired shapes can be easily configured at will and fabrication is simple, which is favorable. In the optical apparatus of FIG. 8, the lenses 901 and 902 are provided separate from the prism 404, but the prisms 404 and 405, the mirror 406, and the variable mirror 409 may be designed so that aberration can be eliminated without providing the lenses 901 and 902. By doing so, the prisms 404 and 405 and the variable mirror 409 are configured into a single optical block. This facilitates assembly.

A part or all of the lenses 901 and 902, the prisms 404 and 405, and the mirror 406 may be made of glass. By doing so, the observation optical system with a higher degree of accuracy is obtained. It is desirable that the reflecting surface of the variable mirror 409 is a free-formed surface. The free-formed surface facilitates correction for aberration and thus is advantageous.

Each of the surfaces of the objective lens 902, the eyepiece 901, the prism 404, the isosceles rectangular prism 405, and the mirror 406 may have any shape such as a planar, spherical, or rotationally symmetrical aspherical surface; a planar, spherical, or rotationally symmetrical aspherical surface which has decentration with respect to the optical axis; an aspherical surface with symmetrical surfaces; an aspherical surface with only one symmetrical surface; an aspherical surface with no symmetrical surface; a free-formed surface; a surface with a nondifferentiable point or line; etc., or the so-called extended surface.

Subsequently, reference is made to the embodiments of an optical system applicable to the optical apparatus of the present invention.

FIRST EMBODIMENT

Figure 9:
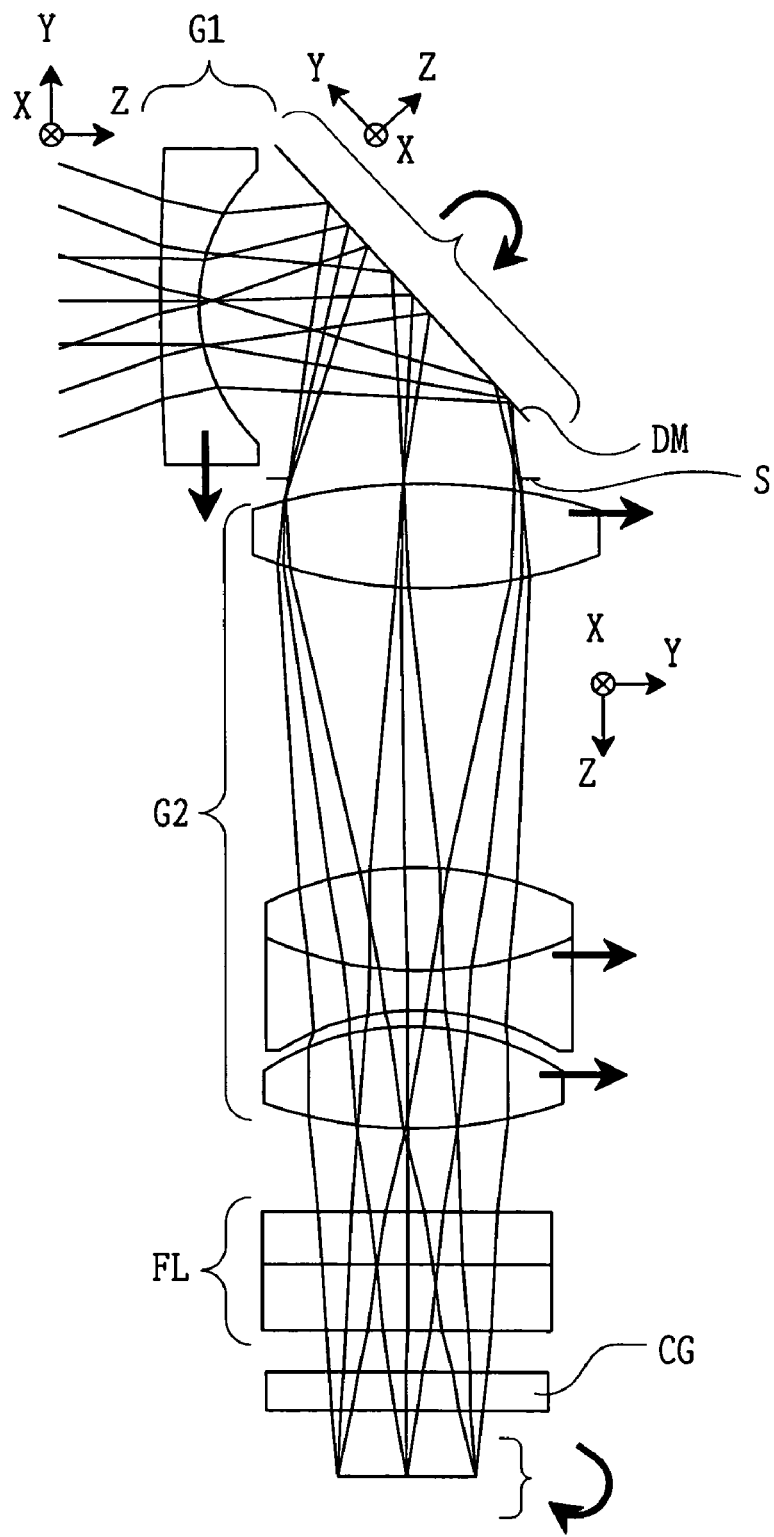
FIG. 9 is a Y-Z sectional view showing the first embodiment of an optical system applicable to the optical apparatus of the present invention.
Figure 10:
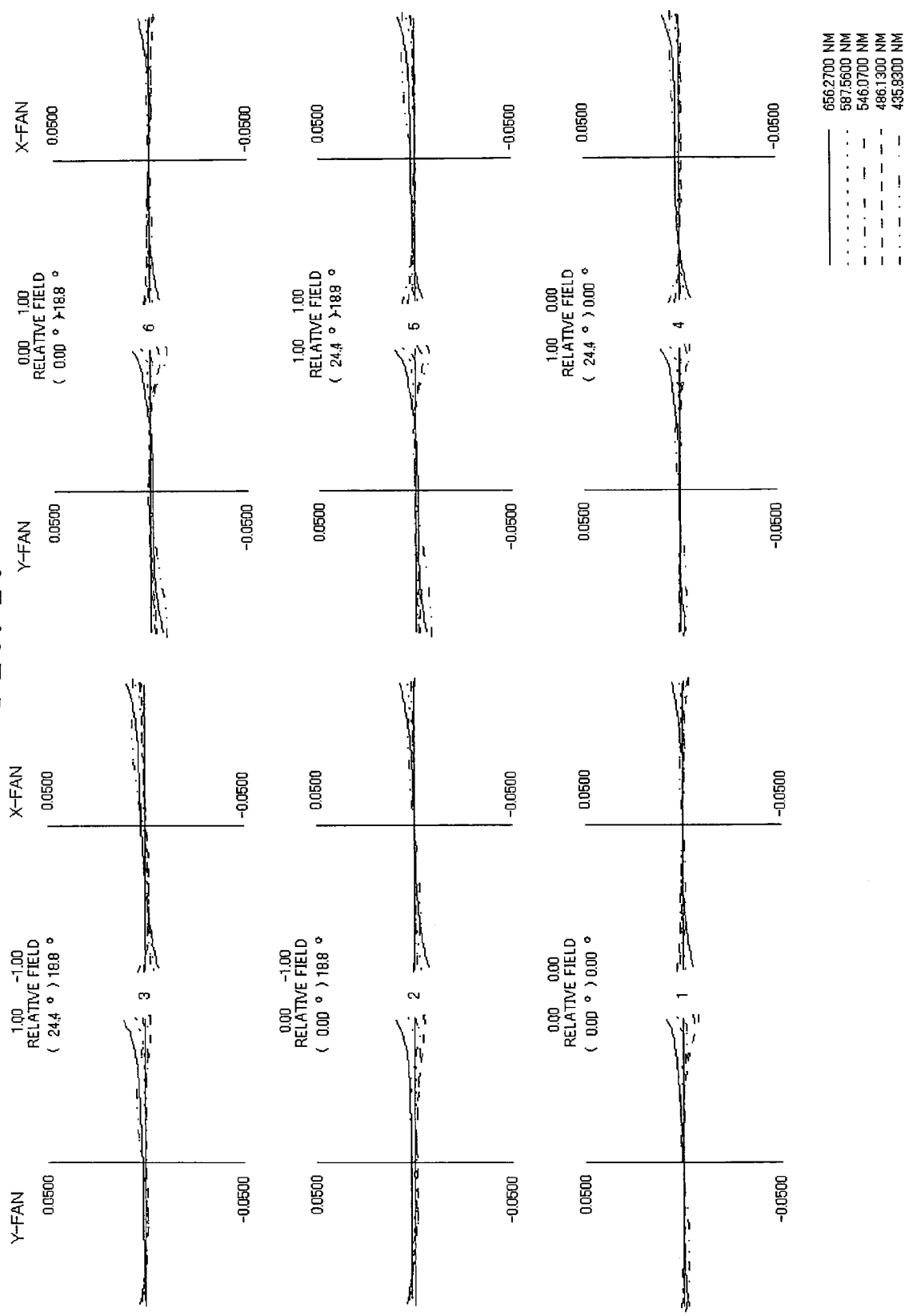
FIG. 10 is a diagram showing transverse aberration characteristics at the infinity of an object point distance of the optical system of FIG. 9.
Figure 11:
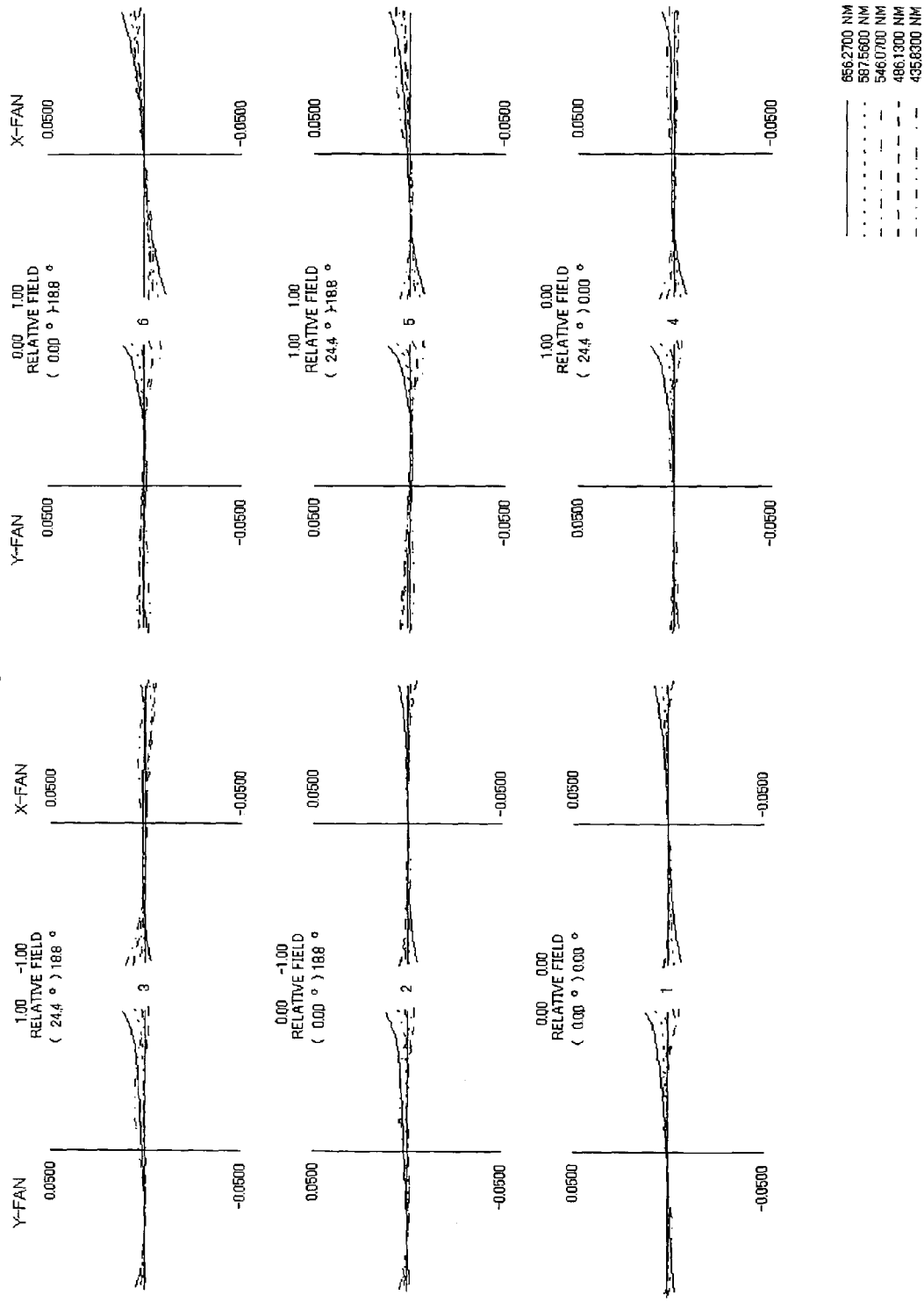
FIG. 11 is a diagram showing transverse aberration characteristics at an object point distance of 150 mm in the first embodiment.

FIG. 9 shows the first embodiment of the optical system applicable to the optical apparatus of the present invention. FIG. 10 shows transverse aberration characteristics at the infinity of the object point distance in the first embodiment. FIG. 11 shows transverse aberration characteristics at an object point distance of 150 mm in the first embodiment. Also, arrows in FIG. 9 indicate directions of decentration of individual optical members.

The optical system of the first embodiment, as shown in FIG. 9, includes a deformable mirror DM; a concave lens unit G1 with one lens component composed of one lens element, located on the object side of the deformable mirror DM and constructed with a negative meniscus lens with a convex surface facing the object side; an aperture stop S located on the image side of the deformable mirror DM; a convex lens unit G2 with three lens components composed of four lens elements, located on the image side thereof and having a biconvex positive lens, a cemented doublet of a biconvex positive lens and a biconcave negative lens, and a biconvex positive lens; a filter unit FL composed of a low-pass filter and an infrared cutoff filter, located behind the lens unit G2: and a cover glass CG for an image sensor. A thin film constituting the reflecting surface of the deformable mirror DM is deformed and thereby focusing is performed in the range from the infinity to a near point of 150 mm. The arrangement of this optical system corresponds to that of the imaging optical system 301 of FIG. 1.

In the optical system of the first embodiment, when the deformable mirror DM is deformed from a planar surface into a curved surface, decentering aberration is produced by reflection from the surface of the mirror. In particular, when focusing is carried out at the near point where the amount of deformation of the deformable mirror DM is appreciable, the decentering aberration is increased. Thus, in order to obtain favorable optical performance in the range from the far point to the near point, shift or tilt decentration is applied to each of the lens units or an imaging plane so that it is fixed. Whereby, the production of decentering aberration in focusing can be balanced. The optical system of the first embodiment has at least one deformable mirror DM so that focusing can be performed by only the deformation of the deformable mirror.

Since the optical system of the first embodiment is constructed as mentioned above, there is no need to drive lenses in focusing. As such, the optical system and the optical apparatus, which are extremely low in power consumption, noiseless in operation, simple in mechanical structure, compact in design, and low in cost, can be realized.

The deformable mirror DM is controlled so that when the balance of decentering aberration is not maintained in focusing even by the shift or tilt decentration applied to the lens unit or the imaging plane, the deformable mirror is changed into a rotationally asymmetrical shape in a preset state in order to reduce the decentering aberration.

By this control, good imaging performance can be obtained in the whole focusing region. When the deformable mirror is deformed to have power, its reflecting surface is deformed with respect to incident light and therefore decentering aberration is produced on reflection. In order to correct this decentering aberration, it is desirable that the deformable mirror is changed into the rotationally asymmetrical shape in addition to the shift or tilt decentration applied to the lens unit or the imaging plane.

Also, the profile of the reflecting surface of the deformable mirror DM may be changed so that the shift or tilt decentration is not applied to the lens unit or the imaging plane, but decentering aberration is corrected by the deformable mirror DM itself.

The optical system of the first embodiment is such that, in order to correct decentering aberration, at least one rotationally symmetrical lens, the lens unit, or the imaging plane is placed so that it is subjected to the shift or tilt decentration with respect to the Z axis.

In this arrangement, as the power of the deformable mirror is strengthened, the amount of residual decentering aberration is increased. In such a case also, it becomes possible to obtain favorable optical performance. Also, the decentration in the optical apparatus of the present invention and the optical system applied to the optical apparatus refers to a shift or tilt.

According to the optical system of the first embodiment, the deformable mirror DM is constructed so that as the object distance for focusing is reduced, its positive power is increased. By this construction, favorable optical performance can be obtained in a wide range from the far point to the near point. Also, in this specification, the signs of power are defined as plus when the mirror has a converging function and minus when it has a diverging function. That is, in the deformable mirror, as the amount of deformation of a concave surface is increased, the positive power is strengthened. The deformable mirror DM is also constructed so that it is capable of having the positive power alone. By doing so, mechanical and electrical structures are simplified, and the deformable mirror which is low in cost can be provided.

The deformable mirror DM may be designed to have either the positive power or the negative power in accordance with deformation. By this design, the production of decentering aberration in the deformable mirror is suppressed and good optical performance can be secured. That is, in the deformable mirror, the amount of deformation increases with increasing power and thereby decentering aberration is produced to cause the deterioration of optical performance. However, the deformable mirror has either the positive power or the negative power to thereby control the amount of deformation. Thus, the production of decentering aberration is suppressed and good optical performance can be secured.

The deformable mirror DM is constructed so that when its mirror surface is deformed, the periphery of the thin film constituting the mirror surface is fixed at the top of an annular member. The optical system applicable to the present invention and the optical apparatus using this optical system are designed to have at least one cemented lens. This design allows chromatic aberrations produced in individual lens units to be favorably corrected and is capable of contributing to compactness of the optical system.

When the maximum amount of deformation of the deformable mirror is represented by md and the focal length of the optical system is represented by f, the optical system applicable to the present invention and the optical apparatus using the optical system satisfy the following condition in a preset state:

$$0 < |md/f| < 0.1 \quad (3)$$

Here, in the present invention, the focal length f of the optical system is defined as the one where the deformable mirror has a planar shape.

By this condition, the amount of deformation of the deformable mirror can be kept within a proper limit. That is, beyond the upper limit of Condition (3), the amount of deformation of the deformable mirror is extremely increased and the amount of production of decentering aberration is increased. Consequently, it becomes difficult to fulfil desired optical performance. Moreover, the degree of difficulty of fabrication becomes remarkable.

It is desirable that the optical system applicable to the present invention and the optical apparatus using the optical system satisfy the following condition in a preset state:

$$0 < |md/f| < 0.05 \quad (3')$$

By this condition, the amount of production of decentering aberration can be further controlled.

It is further desirable that the optical system applicable to the present invention and the optical apparatus using the optical system satisfy the following condition in a preset state:

$$0 < |md/f| < 0.03 \quad (3'')$$

By this condition, the amount of production of decentering aberration can be more favorably controlled.

When the area of an optically effective reflecting surface in the deformable mirror is denoted by Sm, the optical system and the optical apparatus using the optical system satisfy the following condition in a preset state:

$$0 < md^2/Sm < 5.0 \times 10^{-4} \quad (4)$$

By this condition, the amount of deformation of the deformable mirror can be kept within a proper limit.

It is desirable that the optical system applicable to the present invention and the optical apparatus using the optical system satisfy the following condition in a preset state:

$$0 < md^2/Sm < 1.0 \times 10^{-4} \quad (4')$$

By this condition, the amount of deformation of the deformable mirror can be more favorably kept within a proper limit.

The optical system including the deformable mirror applicable to the present invention is such that the deformable mirror is driven by an electrostatic driving system in focusing, and when a voltage applied to the deformable mirror in focusing is represented by Vm (volt), the optical system satisfies the following condition in a preset state:

$$0 \leq |Vm| < 500 \quad (5)$$

By this condition, the dangerous property of atmospheric discharge is diminished and at the same time, the amount of deformation of the deformable mirror can be increased.

In the optical system applicable to the present invention and the optical apparatus using the optical system, it is desirable that when focusing is performed by the deformable mirror, the deformable mirror is driven by the electrostatic driving system to satisfy the following condition in a preset state:

$$0 \leq |Vm| < 300 \quad (5')$$

By this condition, power consumption can be lowered and thus the optical system and the optical apparatus that are more favorable can be provided.

When an amount proportional to the power of the deformable mirror is denoted by $\phi DM$, the optical system applicable to the present invention and the optical apparatus using the optical system satisfy the following condition in a preset state:

$$0 \leq |\phi DM \times f| < 1.00 \quad (6)$$

Here, the amount $\phi DM$ proportional to the power of the deformable mirror is the average value of an amount $\phi DMy$ proportional to the power in a plane in a decentering direction (the Y direction) of the deformable mirror and an amount $\phi DMx$ proportional to the power in a plane in a direction perpendicular to the Y direction (the X direction), and is defined as $\phi DM=(\phi DMx+\phi DMy)/2$. Also, in the present invention, C4 and C6 of power components to be described later are used as $\phi DMx=C4$ and $\phi DMy=C6$.

By this condition, the focusing function of the deformable mirror can be satisfactorily performed, and decentering aberration produced in the deformable mirror can be kept within a proper limit.

It is desirable that the optical system applicable to the present invention and the optical apparatus using the optical system satisfy the following condition in a preset state:

$$0 \leq |\phi DM \times f| < 0.50 \quad (6')$$

By this condition, decentering aberration produced in the deformable mirror can be further suppressed.

It is also desirable that the optical system applicable to the present invention and the optical apparatus using the optical system satisfy the following condition in a preset state:

$$0 \leq |\phi DM \times f| < 0.10 \quad (6'')$$

By this condition, decentering aberration produced in the deformable mirror can be more favorably suppressed.

The optical system applicable to the present invention and the optical apparatus using the optical system have the advantage that when focusing is carried out at the far point by the deformable mirror, the deformable mirror can be deformed to have lower power than in focusing. By this construction, an autofocus operation of a contrast method can be performed. Specifically, the deformable mirror has lower power than in focusing at the far point, and thereby the blurring of an image at the far point can be adjusted.

The optical system applicable to the present invention and the optical apparatus using the optical system have the advantage that when focusing is carried out at the near point by the deformable mirror, the deformable mirror can be deformed to have higher power than in focusing. By this construction, the autofocus operation of the contrast method can be performed. Specifically, the deformable mirror has higher power than in focusing at the near point, and thereby the blurring of an image at the near point can be adjusted.

The optical system applicable to the present invention and the optical apparatus using the optical system are such that when focusing is performed by the deformable mirror at the object point where the object distance is infinite, the deformable mirror is deformed not into a planar surface, but into a concave surface that has larger power than zero.

The optical system applicable to the present invention and the optical apparatus using the optical system have a lens unit with negative power on the object side of the deformable mirror and satisfy the following condition:

$$-5.0 < f1/f < -0.2 \tag{7}$$

where f1 is the focal length of the lens unit.

By this condition, compactness, cost reduction, and favorable optical performance of the deformable mirror can be obtained. That is, below the lower limit of Condition (7), the power of the lens unit with negative power is extremely weakened, and the off-axis ray height of the deformable mirror at the wide-angle position cannot be decreased. This leads to oversizing of the deformable mirror and raises cost. Beyond the upper limit of Condition (7), the power of the lens unit with negative power is extremely strengthened, and it becomes difficult to correct coma and chromatic aberration of magnification, produced in the lens unit.

It is desirable that the optical system applicable to the present invention and the optical apparatus using the optical system satisfy the following condition:

$$-2.5 < f1/f < -0.5 \tag{7'}$$

By this condition, favorable optical performance is ensured and at the same time, further compactness of the deformable mirror can be achieved.

The optical system applicable to the present invention and the optical apparatus using the optical system have the advantage that the lens unit with negative power, located on the object side of the deformable mirror, is constructed with a single concave lens. By this construction, a compact- and slim-design optical system can be achieved because only one lens is placed on the object side of the deformable mirror.

When an angle at which an axial chief ray is bent by the deformable mirror is denoted by θ, the optical system applicable to the present invention and the optical apparatus using the optical system satisfy the following condition:

$$60° < \theta < 140° \tag{8}$$

Below the lower limit of Condition (8), the longitudinal dimension of the deformable mirror must be increased and a cost reduction becomes difficult. Beyond the upper limit of Condition (8), the size of the mirror is reduced, but lens units located in front of and behind the deformable mirror interfere with each other, and the arrangement of the optical system is rendered difficult. Also, the axial chief ray described here refers to a ray that emanates from the center of the object, passes through the center of a stop, and reaches the center of an image. Usually, the axial chief ray is called the optical axis.

It is desirable that the optical system applicable to the present invention and the optical apparatus using the optical system satisfy Condition (8') described below. It is more desirable to satisfy Condition (8") described below.

$$60° < \theta < 120° \tag{8'}$$

$$75° < \theta < 105° \tag{8''}$$

By these conditions, better results are brought about.

When the magnification of a lens unit located on the image side of the deformable mirror, that is, a lens unit ranging from an optical surface situated immediately behind the deformable mirror to the last surface, is represented by β1, the optical system applicable to the present invention and the optical apparatus using the optical system satisfy the following condition:

$$0.2 < |\beta 1| < 1.50 \tag{9}$$

Below the lower limit of Condition (9), the magnification of the lens unit located behind the deformable mirror becomes so low that a focus sensitivity of the deformable mirror is impaired and the amount of deformation of the deformable mirror required for focusing is increased. Beyond the upper limit of Condition (9), the magnification of the lens unit is so high that decentering aberration produced in the deformable mirror is increased and it becomes difficult to obtain satisfactory optical performance.

It is desirable that the optical system applicable to the present invention and the optical apparatus using the optical system satisfy Condition (9') described below. It is more desirable to satisfy Condition (9") described below.

$$0.35 < |\beta 1| < 1.50 \tag{9'}$$

$$0.50 < |\beta 1| < 1.20 \tag{9''}$$

By these conditions, since optical performance is ensured and the amount of deformation of the deformable mirror can be kept within a proper limit, better results are brought about.

When the overall length of the optical system is denoted by Cj, the optical system applicable to the present invention and the optical apparatus using the optical system satisfy the following condition:

$$1.0 < Cj/f < 20.0 \tag{10}$$

Beyond the upper limit of Condition (10), the overall length of the optical system is extremely increased and compactness of the optical system becomes difficult. Below the lower limit of Condition (10), the compactness is attained, but the arrangement of lens units is limited and satisfactory optical performance cannot be obtained.

It is desirable that the optical system applicable to the present invention and the optical apparatus using the optical system satisfy the following condition:

$$3.0 < Cj/f < 15.0 \tag{10'}$$

By this condition, a compact optical system and higher optical performance can be obtained.

It is desirable that the optical system applicable to the present invention and the optical apparatus using the optical system satisfy the following condition:

$$5.0 < Cj/f < 10.0 \tag{10''}$$

By this condition, a compact optical system and better optical performance can be obtained.

In order to correct decentering aberration produced by the deformable mirror, at least one lens is subjected to the shift and the optical system applicable to the present invention and the optical apparatus using the optical system satisfy the following condition in a preset state:

$$0.0 \leq |\delta/f| < 1.00 \tag{11}$$

where $\delta$ is the amount of shift of the lens.

By this condition, the amount of decentration applied to the lens can be kept within a proper limit, and the balance of optical performance between a weak power and a strong power of the deformable mirror can be held. Here, the amount of shift $\delta$ refers to the amount defined as a distance between the center axis of the shifted lens and the Z axis of the optical system.

It is desirable that the optical system applicable to the present invention and the optical apparatus using the optical system satisfy the following condition in a preset state:

$$0.0 \leq |\delta/f| < 0.50 \tag{11'}$$

By this condition, performance in focusing at the far and near points can be further improved.

It is desirable that the optical system applicable to the present invention and the optical apparatus using the optical system satisfy the following condition in a preset state:

$$0.0 \leq |\delta/f| < 0.25 \tag{11''}$$

By this condition, the performance in focusing at the far and near points can be further improved.

In order to correct decentering aberration produced by the deformable mirror, at least one lens or an imaging plane is subjected to the tilt and the optical system applicable to the present invention and the optical apparatus using the optical system satisfy the following condition in a preset state:

$$0.0° \leq |\epsilon| < 10.0° \tag{12}$$

where $\epsilon$ is the amount of tilt applied to the lens or the imaging plane.

By this condition, the amount of decentration applied to the lens can be kept within a proper limit, and the balance of optical performance between a weak power and a strong power of the deformable mirror can be held. Here, the amount of tilt $\epsilon$ refers to the amount defined as a tilt angle made by the center axis of the tilted lens or imaging plane with the Z axis of the optical system.

It is desirable that the optical system applicable to the present invention and the optical apparatus using the optical system satisfy the following condition in a preset state:

$$0.0° \leq |\epsilon| < 7.0° \tag{12'}$$

By this condition, the performance in focusing at the far and near points can be further improved.

It is desirable that the optical system applicable to the present invention and the optical apparatus using the optical system satisfy the following condition in a preset state:

$$0.0° \leq |\epsilon| < 5.5° \tag{12''}$$

By this condition, the performance in focusing at the far and near points can be further improved.

The optical system applicable to the present invention and the optical apparatus using the optical system have the advantage that, of the absolute values of the amounts of tilt applied to individual lenses or the imaging plane, the absolute value of the amount of tilt of the imaging plane is largest.

The optical system applicable to the present invention and the optical apparatus using the optical system have the advantage that the direction of tilt applied to the imaging plane is a direction approaching parallel to the deformable mirror.

The optical system applicable to the present invention and the optical apparatus using the optical system have the advantage that, in the optical system in which the shift and tilt are applied to at least one lens or an imaging plane in order to correct decentering aberration produced by the deformation of the deformable mirror, the shift takes place in a certain plane and the rotary axis of the tilt is perpendicular to the plane.

The optical system applicable to the present invention and the optical apparatus using the optical system are such that the aperture stop is placed on the image side of the deformable mirror.

Subsequently, reference is made to the profile of the reflecting surface of the deformable mirror DM in the optical system applicable to the present invention, namely, a free-formed surface (FFS) defined by the following equation. The Z axis in this defining equation corresponds to the axis of the free-formed surface.

$$Z = cr^2 / \left[ 1 + \sqrt{\{1 - (1+k)c^2 r^2\}} \right] + \sum_{j=2}^{N} C_j X^m Y^n \tag{a}$$

Here, the first term of this equation is a spherical surface term, and the second term is a free-formed surface term. In the spherical surface term, c is the curvature of the vertex, k is a conic constant, $r = \sqrt{(X^2 + Y^2)}$, N is a natural number of 2 or larger, m is an integral number of 0 or larger, and n is an integral number of 0 or larger.

The free-formed surface term is as follows:

$$\sum_{j=2}^{N} C_j X^m Y^n = C_2 X + C_3 Y +$$
$$C_4 X^2 + C_5 XY + C_6 Y^2 +$$
$$C_7 X^3 + C_8 X^2 Y + C_9 XY^2 + C_{10} Y^3 +$$
$$C_{11} X^4 + C_{12} X^3 Y + C_{13} X^2 Y^2 + C_{14} XY^3 +$$
$$C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 +$$
$$C_{25} X^3 Y^3 + C_{26} X^2 Y^4 + C_{27} XY^5 + C_{28} Y^6 + C_{29} X^7 +$$
$$C_{30} X^6 Y + C_{31} X^5 Y^2 + C_{32} X^4 Y^3 + C_{33} X^3 Y^4 +$$
$$C_{34} X^2 Y^5 + C_{35} XY^6 + C_{36} Y^7 \cdots$$

where $C_j$ (j is an integral number of 2 or larger) is a coefficient.

In general, the above-mentioned free-formed surface does not have a symmetric surface for both the X-Z plane and the Y-Z plane. However, by bringing all odd-number order terms of X to 0, a free-formed surface having only one symmetrical surface parallel to the Y-Z plane is obtained. By bringing all odd-number order terms of Y to 0, a free-formed surface having only one symmetrical surface parallel to the X-Z plane is obtained.

The free-formed surface of rotationally asymmetrical curved shape, mentioned above, can also be defined by the Zernike polynomial as another defining equation. The configuration of this surface is defined by the following equation. The Z axis of this equation corresponds to the axis of the Zernike polynomial. The rotationally asymmetrical surface is defined by polar coordinates of a height from the Z axis relative to the X-Y plane, where R is a distance from the Z axis in the X-Y plane, and A is an azimuth around the Z axis and is expressed by an rotating angle measured from the Z axis.

$X = R \times \cos(A)$ $Y = R \times \sin(A)$ $Z = D_2$ $+ D_3 R \cos(A) + D_4 R \sin(A)$ $+ D_5 R^2 \cos(2A) + D_6 (R^2 - 1) + D_7 R^2 \sin(2A)$ $+ D_8 R^3 \cos(3A) + D_9 (3R^3 - 2R)\cos(A) + D_{10}$ $(3R^3 - 2R)\sin(A) + D_{11} R^3 \sin(3A)$ $+ D_{12} R^4 \cos(4A) + D_{13}(4R^4 - 3R^2)\cos(2A)$ $+ D_{14}(6R^4 - 6R^2 + 1) + D_{15}(4R^4 - 3R^2)\sin(2A) + D_{16} R^4 \sin(4A)$ $+ D_{17} R^5 \cos(5A) + D_{18}(5R^5 - 4R^3)\cos(3A)$ $+ D_{19}(10R^5 - 12R^3 + 3R)\cos(A)$ $+ D_{20}(10R^5 - 12R^3 + 3R)\sin(A)$ $+ D_{21}(5R^5 - 4R^3)\sin(3A) + D_{22} R^5 \sin(5A)$ $+ D_{23} R^6 \cos(6A) + D_{24}(6R^6 - 5R^4)\cos(4A)$ $+ D_{25}(15R^6 - 20R^4 + 6R^2)\cos(2A)$ $+ D_{26}(20R^6 - 30R^4 + 12R^2 - 1)$ $+ D_{27}(15R^6 - 20R^4 + 6R^2)\sin(2A)$ $+ D_{28}(6R^6 - 5R^4)\sin(4A) + D_{29} R^6 \sin(6A)$ (b)

where $D_m$ (m is an integral number of 2 or larger) is a coefficient. Also, in order to make a design as an optical system symmetrical with respect to the X axis, $D_4, D_5, D_6, D_{10}, D_{11}, D_{12}, D_{13}, D_{14}, D_{20}, D_{21}, D_{22}, \ldots$ are used.

The above defining equation is shown to give an example of the configuration of the rotational asymmetrical curved surface, and it is needless to say that the same effect is secured with respect to any other defining equation. If mathematically identical values are given, the configuration of the curved surface may be expressed by another definition.

In the present invention, all odd-number order terms of X in Equation (a) are brought to zero and thereby the free-formed surface that has a symmetrical surface parallel to the Y-Z plane is obtained.

Also, when Z is taken as the coordinate in the direction of the optical axis, Y is taken as the coordinate normal to the optical axis, k represents a conic constant, and a, b, c, and d represent aspherical coefficients, the configuration of an aspherical surface is expressed by the following equation:

$Z = (Y^2/r)/[1 + \{1 - (1+k) \cdot (Y/r)^2\}^{1/2}] + a y^4 + b y^6 + c y^8 + d y^{10}$ (c)

These symbols are also used for the numerical data of the embodiments to be described later.

In the embodiments, "ASP" denotes an aspherical surface, "FFS" denotes a free-formed surface, and "DM" denotes a deformable mirror. The terms relative to the aspherical surface and the free-formed surface that are not set forth in the data are zero. The refractive index and the Abbe's number are described with respect to the d line (wavelength 587.56 nm). The length is expressed in millimeters (mm) and the angle in degrees (deg). Also, although two or three plane-parallel plates are arranged on the most image-plane side in each of the embodiments, they are assumed as the cover glass of an image sensor, a low-pass filter placed ahead of the cover glass, and an IR cutoff filter ahead thereof. Also, when the low-pass filter coated with the IR cutoff filter is fabricated, two plane-parallel plates are obtained.

In each embodiment, the Z axis of the coordinate system on the surface of an object is defined as a straight line perpendicular to the surface of the object, passing through the center of the object. The Y axis is taken as the coordinate normal to the Z axis, and the X axis is taken as an axis constituting a right-handed coordinate system together with the Y axis and the Z axis. The optical axis is defined as the path of a ray of light passing through the centers of the surface of the object and the stop or the exit pupil. Thus, the optical axis is changed with the deformation of the deformable mirror, but this change is slight in most cases. Consequently, the Z axis practically coincides with the optical axis in each embodiment.

A decentering surface is given by the shift of the vertex position of this surface (the directions of X, Y, and Z axes are denoted by X, Y, and Z, respectively) from the origin of the coordinate system and by the tilt (α, β, and γ (deg)) of the center axis of the surface (the Z axis of Equation (a) in the free-formed surface), with the X, Y, and Z axes as centers. When a surface to be decentered is called a k surface, the origin of the coordinate system where decentration takes place is defined as a point shifted from the vertex position of a k−1 surface along the Z axis for surface-to-surface spacing. The decentration takes place in order of X shift, Y shift, Z shift, α tilt, β tilt, and γ tilt. In this case, the plus sign of each of α and β indicates a counter-clockwise direction where each of the X axis and the Y axis is viewed from a minus side, and the plus sign of γ indicates a clockwise direction where the Z axis is viewed from a minus direction.

Also, in each embodiment, there are two kinds of decentration, decenter-and-return (DAR) and decenter-only (DEO). In the DAR, when the k surface has been decentered, each of the coordinate systems of a k+1 surface and surfaces lying behind it coincides with that of the k surface before decentration. The vertex position of the k+1 surface is defined as a point shifted from that of the k surface before decentration along the Z axis for surface-to-surface spacing. In the DEO, on the other hand, when the k surface has been decentered, each of the coordinate systems of the k+1 surface and surfaces lying behind it coincides with that of the k surface after decentration. The vertex position of the k+1 surface is defined as a point shifted from that of the k surface after decentration along the Z axis for surface-to-surface spacing.

The positive direction of the Z axis of the coordinate system of a reflecting surface refers to a direction in which the axis travels from the obverse of the reflecting surface toward the reverse. Thus, when the reflecting surface is changed into the free-formed surface shape expressed by the X-Y polynomial and the power components $C_4$ and $C_6$ are positive, the reflecting surface becomes a convex mirror, that is, a mirror with negative power. Conversely, when the power components $C_4$ and $C_6$ are negative, a concave mirror, that is, a mirror with positive power, is obtained. The coordinate system of the optical system after a light ray is reflected by the reflecting surface corresponds to the case where the coordinate system before the ray is reflected is rotated by 180° about the X axis. Whereby, the ray always travels along the positive direction of the Z axis of the optical system.

The deformable mirror is capable of changing the power to perform focusing from the far point to the near point, but is designed to bring about a state of weaker power than in focusing at the far point and a state of stronger power than in focusing at the near point in order to perform auto-focusing of a contrast method. In each embodiment to be described below, the state of weaker power than in focusing at the far point is defined as far-point allowance, and a state of stronger power than in focusing at the near point is defined as near-point allowance. That is, the deformable mirror has four states, the far-point allowance, the far point, the near point, and the near-point allowance.

The deformable mirror in each embodiment is designed to have an allowance for the amount of deformation before and after the focusing range, in view of the shift of the image plane in the Z direction caused by a fabrication error in actual fabrication and by a temperature change.

As mentioned above, since the focusing function is imparted to the deformable mirror and thereby focusing can be performed without mechanical drive, a lens frame structure is simplified and a compact design and a cost reduction can be attained. Moreover, there is the merit of eliminating the driving noise of a motor in focusing.

Figure 12:
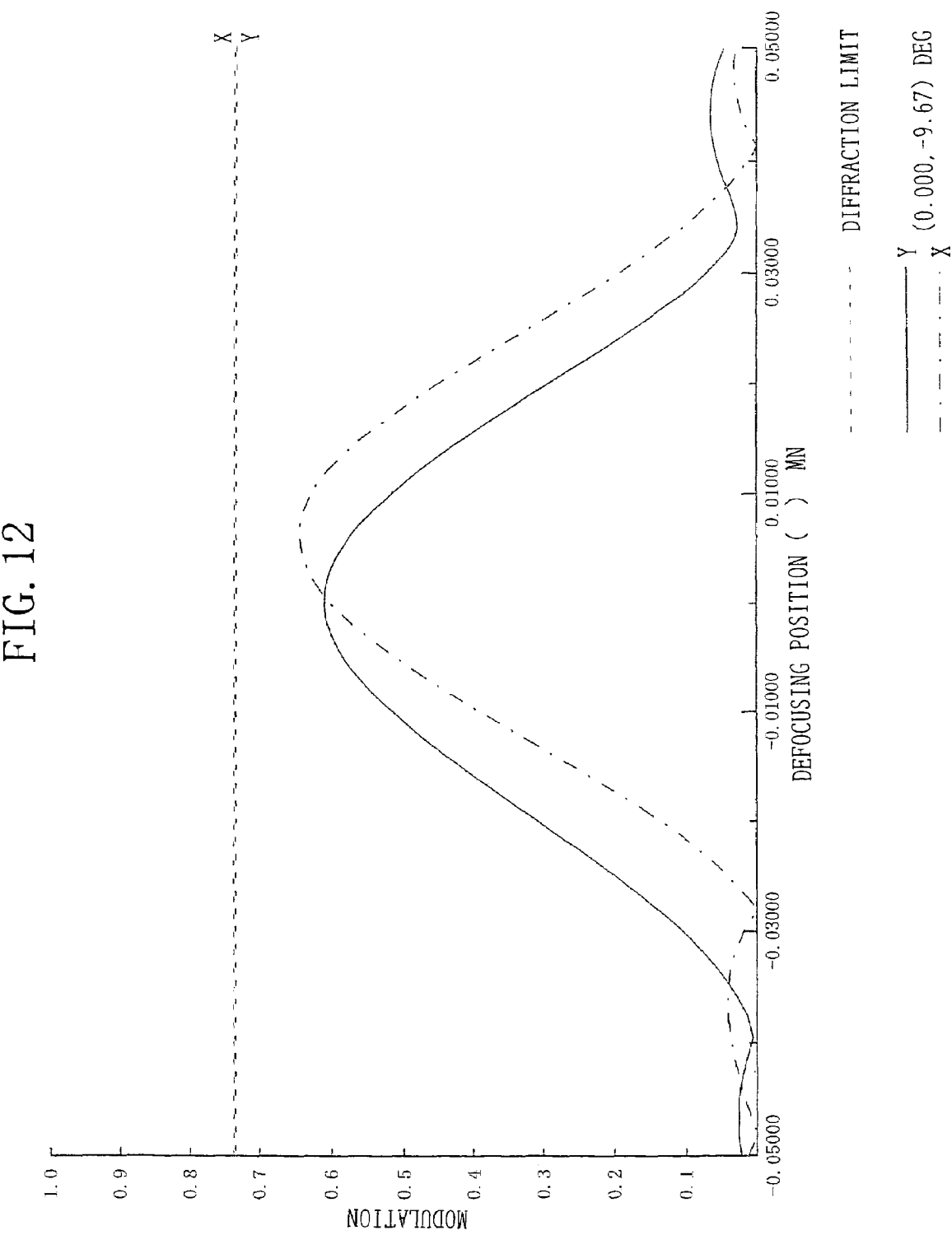
FIG. 12 is a graph showing a wave optical MTF (140 lines/mm) at 9.67° in the −Y direction of the object (which refers to the orientation of the object where X is 0.000° and Y is −9.67°) when twofold electronic zoom is performed by the optical system of the first embodiment, optimizing the configuration of a thin film so that when the size of the imaging surface of the image sensor is assumed as 2 mm×1.5 mm, the sharpness of the image is improved in this area at the infinity of the object point distance.
Figure 13:
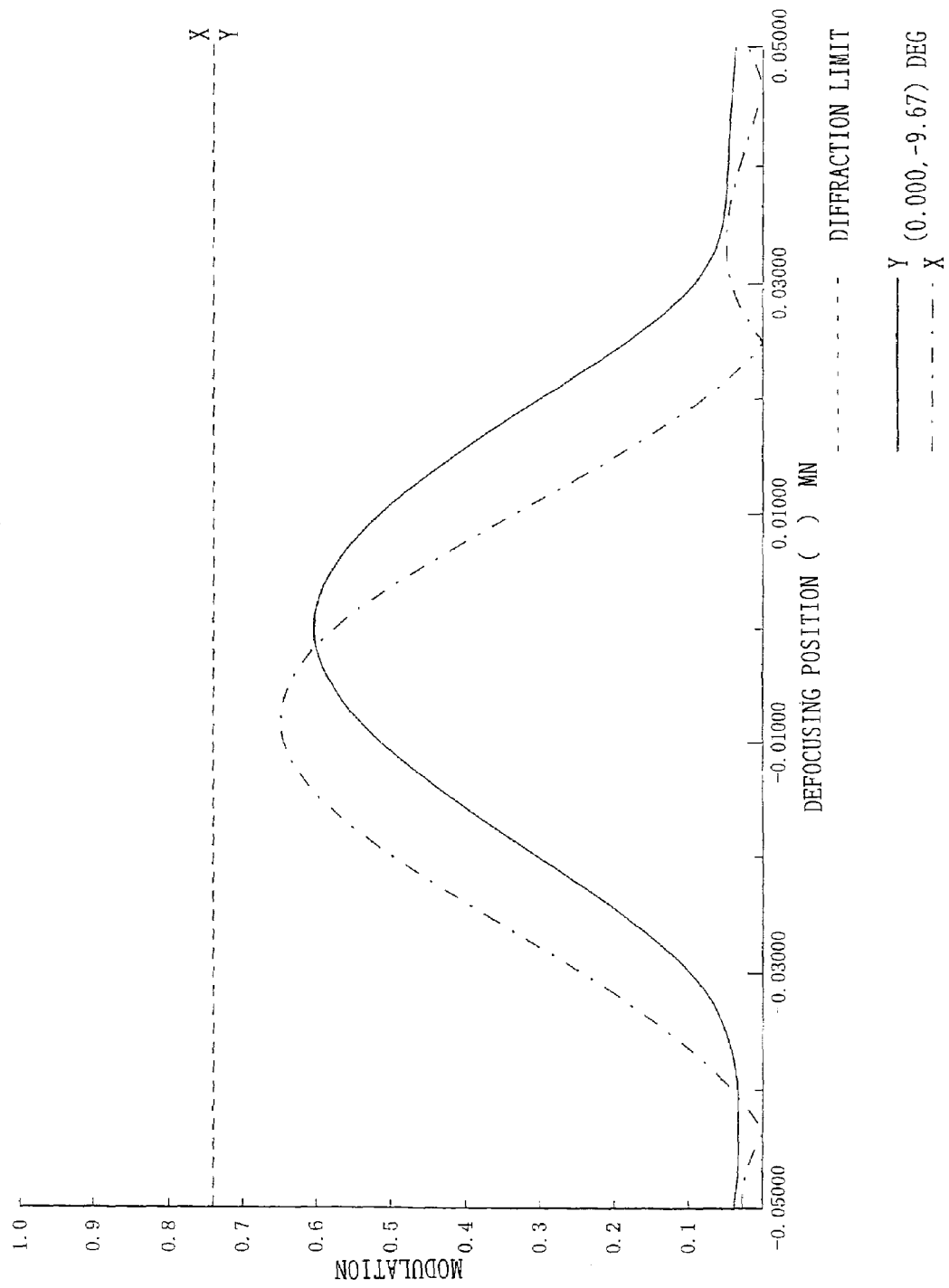
FIG. 13 is a graph showing a wave optical MTF (140 lines/mm) at 9.67° in the −Y direction of the object (which refers to the orientation of the object where X is 0.000° and Y is −9.67°) when twofold electronic zoom is performed by the optical system of the first embodiment, optimizing the configuration of the thin film so that when the size of the imaging surface of the image sensor is assumed as 2 mm×1.5 mm, the sharpness of the image is improved in this area at an object point distance of 150 mm.
Figure 14:
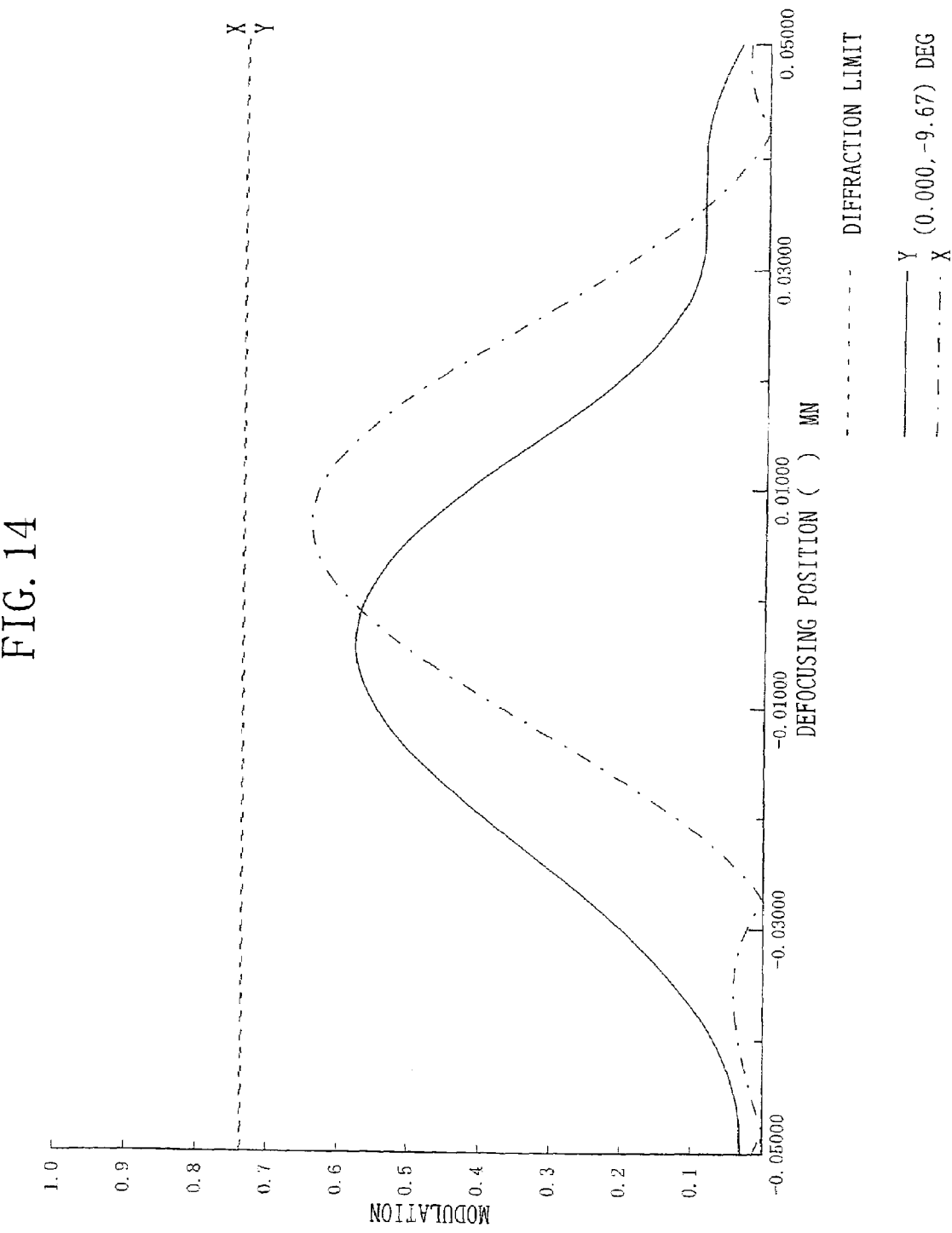
FIG. 14 is a graph showing the MTF where the configuration of the thin film is not optimized in the optical system of the first embodiment, at the infinity of the object point distance where the size of the imaging surface is 4 mm×3 mm.

FIGS. 12-15 are graphs, each showing a wave optical MTF (140 lines/mm) at 9.67° in the −Y direction of the object (which refers to the orientation of the object where X is 0.000° and Y is −9.67°) when twofold electronic zoom is performed by the optical system of the first embodiment. Specifically, the size of the imaging surface of the image sensor is thought of as 2 mm×1.5 mm, and graphs showing the MTF where the shape of the thin film 409$a$ is optimized so that the sharpness of the image is improved in the area of the imaging surface are given in FIG. 12 (object distance ∞) and FIG. 13 (object distance 150 mm). Also, the pixel size of the image sensor is 2.5 microns and the number of pixels is two million. The electronic zoom magnification $\beta_E=2$ satisfies Conditions (1) and (1'). For comparison, graphs of the MTF where the shape of the thin film 409$a$ is not optimized are shown in FIG. 14 (object distance ∞) and FIG. 15 (object distance 150 mm). That is, these are the same as the MTF at the center of image where the electronic zoom is not performed.

Figure 15:
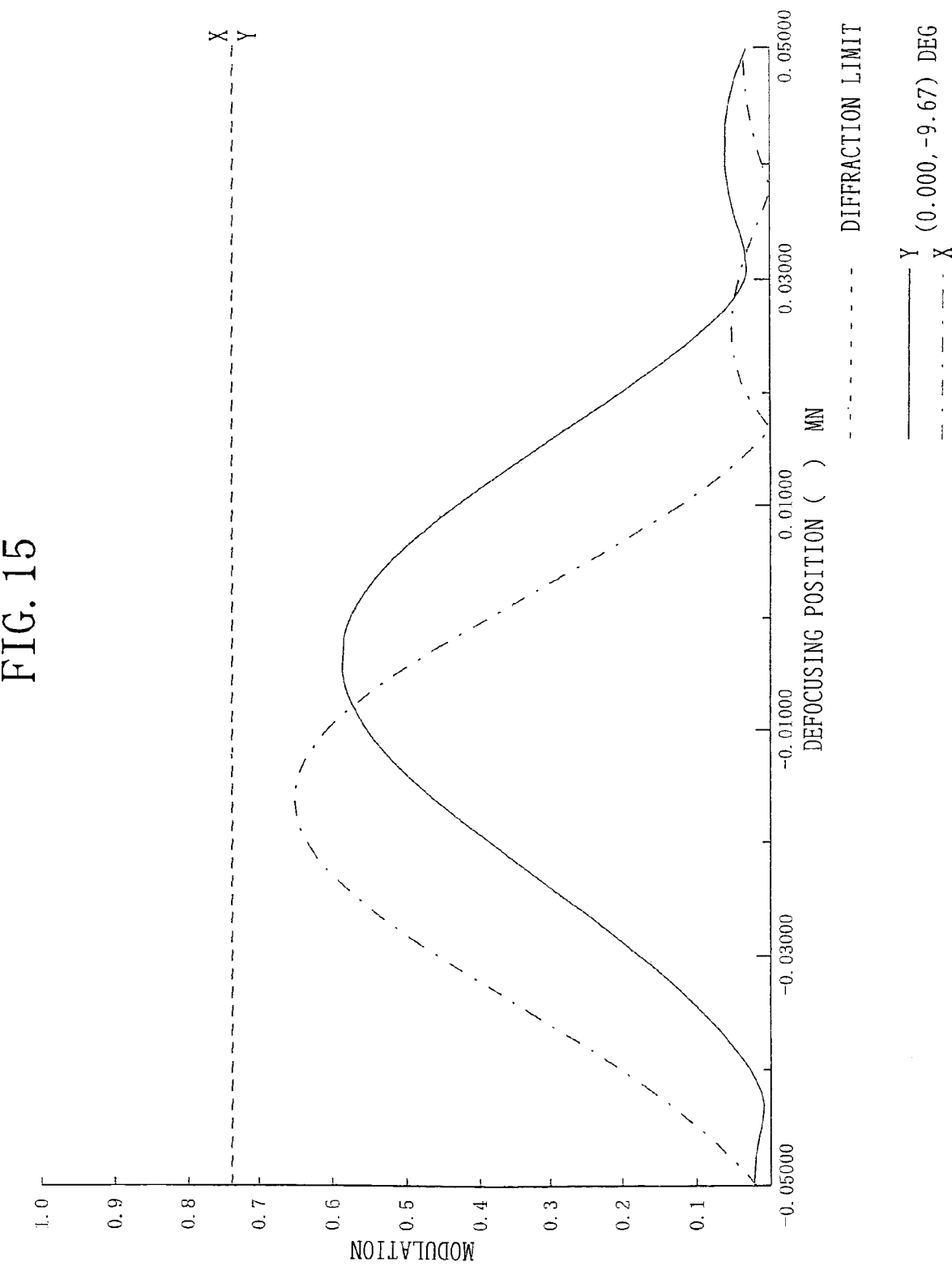
FIG. 15 is a graph showing the MTF where the configuration of the thin film is not optimized in the optical system of the first embodiment, at an object point distance of 150 mm where the size of the imaging surface is 4 mm×3 mm.

Comparison of FIGS. 12 and 13 with FIGS. 14 and 15 shows that the MTF in a state where the size of the imaging surface is limited to 2 mm×1.5 mm and the shape of the thin film 409$a$ is optimized is improved in contrast with that in a state where the shape is not optimized, namely, the size of the imaging surface is 4 mm×3 mm.

Subsequently, numerical data of optical members constituting the optical system of the first embodiment are shown below.

Numerical data 1
Focal length: 4.4 mm (38 mm in terms of silver halide)
Open F-number: 2.8
Size of imaging surface: 4.0 mm × 3.0 mm (X direction × Y direction)

| Surface number | Radius of curvature | Surface spacing | Decentration | Refractive index | Abbe's number |
|---|---|---|---|---|---|
| Object surface | ∞ | ∞ | | | |
| 1 | ASP [1] | 0.800 | Decentration (1) | 1.8141 | 32.2 |
| 2 | ASP [2] | 4.200 | Decentration (1) | | |
| 3 | ∞ | 0.000 | Decentration (2) | | |
| 4 | FFS [1] | 0.000 | Decentration (3) | | |
| 5 | ∞ | 3.800 | Decentration (4) | | |
| 6 (stop surface) | ∞ | 0.100 | | | |
| 7 | ASP [3] | 2.000 | Decentration (5) | 1.7465 | 51.1 |
| 8 | ASP [4] | 5.438 | Decentration (5) | | |
| 9 | 7.324 | 2.021 | Decentration (6) | 1.5011 | 68.3 |
| 10 | −7.973 | 0.800 | Decentration (6) | 1.8307 | 24.5 |
| 11 | 5.885 | 0.300 | Decentration (6) | | |
| 12 | 5.787 | 2.000 | Decentration (7) | 1.4900 | 70.0 |
| 13 | ASP [5] | 1.626 | Decentration (7) | | |
| 14 | ∞ | 1.000 | | 1.5163 | 64.1 |
| 15 | ∞ | 1.290 | | 1.5477 | 62.8 |
| 16 | ∞ | 0.800 | | | |
| 17 | ∞ | 0.750 | | 1.5163 | 64.1 |

-continued

Numerical data 1
Focal length: 4.4 mm (38 mm in terms of silver halide)
Open F-number: 2.8
Size of imaging surface: 4.0 mm × 3.0 mm (X direction × Y direction)

| 18 | ∞ | 1.200 | |
|---|---|---|---|
| Image plane | ∞ | 0.000 | Decentration (8) |

Aspherical coefficients

ASP [1]
Radius of curvature 70.428

$k = 0$
$a = 2.2133 \times 10^{-3}$   $b = -4.1162 \times 10^{-4}$   $c = 2.4537 \times 10^{-5}$   $d = -3.6373 \times 10^{-7}$

ASP [2]
Radius of curvature 3.507

$k = 0$
$a = 2.1789 \times 10^{-3}$   $b = -4.6380 \times 10^{-4}$   $c = -3.9638 \times 10^{-5}$   $d = 5.3918 \times 10^{-6}$

ASP [3]
Radius of curvature 13.911

$k = 0$
$a = 5.4052 \times 10^{-5}$   $b = -2.3064 \times 10^{-6}$   $c = 1.0798 \times 10^{-6}$   $d = 3.3961 \times 10^{-8}$

ASP [4]
Radius of curvature −9.140

$k = 0$
$a = 3.7861 \times 10^{-4}$   $b = 6.5188 \times 10^{-6}$   $c = -8.0902 \times 10^{-8}$   $d = 9.8151 \times 10^{-8}$

ASP [5]
Radius of curvature −8.610

$k = 0$
$a = 1.3105 \times 10^{-3}$   $b = -2.6285 \times 10^{-5}$   $c = 2.0896 \times 10^{-6}$   $d = -9.3284 \times 10^{-8}$

Amount of decentration

Decentration [1] (DAR)
X = 0.000   Y = −0.455   Z = 0.000
α = 0.000   β = 0.000   γ = 0.000

Decentration [2] (DEO)
X = 0.000   Y = 0.000   Z = 0.000
α = 45.000   β = 0.000   γ = 0.000

Decentration [3] (DAR)
X = 0.000   Y (described in FFS [1])   Z (described in FFS [1])
α = −0.783   β = 0.000   γ = 0.000

Decentration [4] (DEO)
X = 0.000   Y = 0.000   Z = 0.000
α = 45.000   β = 0.000   γ = 0.000

Decentration [5] (DAR)
X = 0.000   Y = 0.428   Z = 0.000
α = 0.000   β = 0.000   γ = 0.000

Decentration [6] (DAR)
X = 0.000   Y = 0.270   Z = 0.000
α = 0.000   β = 0.000   γ = 0.000

Decentration [7] (DAR)
X = 0.000   Y = 0.147   Z = 0.000
α = 0.000   β = 0.000   γ = 0.000

Decentration [8] (DAR)
X = 0.000   Y = 0.000   Z = 0.000
α = −2.000   β = 0.000   γ = 0.000

FFS [1]

State 1: Far-point allowance (∞)

C 4 = 0.00000   C 6 = 0.00000   C 8 = 0.00000
C10 = 0.00000   C11 = 0.00000   C13 = 0.00000
C15 = 0.00000
X = 0   Y = 0   Z = 0

-continued

Numerical data 1
Focal length: 4.4 mm (38 mm in terms of silver halide)
Open F-number: 2.8
Size of imaging surface: 4.0 mm × 3.0 mm (X direction × Y direction)

State 2: Far point (∞)

C 4 = −0.5892 × 10$^{−3}$     C 6 = −0.3128 × 10$^{−3}$     C 8 = −0.3938 × 10$^{−4}$
C10 = −0.2812 × 10$^{−4}$     C11 = 0.2639 × 10$^{−5}$      C13 = −0.2463 × 10$^{−5}$
C15 = −0.2641 × 10$^{−5}$
X = 0                          Y = 0.47001                    Z = 0.00338

State 3: Near point (150 mm)

C 4 = −0.1086 × 10$^{−2}$     C 6 = −0.6189 × 10$^{−3}$     C 8 = −0.6338 × 10$^{−4}$
C10 = −0.4815 × 10$^{−4}$     C11 = 0.3921 × 10$^{−5}$      C13 = 0.6584 × 10$^{−6}$
C15 = −0.2915 × 10$^{−5}$
X = 0                          Y = 0.34044                    Z = 0.00643

State 4: Near-point allowance (150 mm)

C 4 = −0.1575 × 10$^{−2}$     C 6 = −0.9311 × 10$^{−3}$     C 8 = −0.9810 × 10$^{−4}$
C10 = −0.7349 × 10$^{−4}$     C11 = 0.5562 × 10$^{−6}$      C13 = −0.2496 × 10$^{−5}$
C15 = −0.4413 × 10$^{−5}$
X = 0                          Y = 0.36255                    Z = 0.00964

State 5: Far point (∞) where the variable mirror is optimized
in accordance with twofold electronic zoom.

FFS [1]

C 4 = −6.3929474 × 10$^{−4}$   C 6 = −3.6980265 × 10$^{−4}$
C 8 = −2.8038856 × 10$^{−5}$   C10 = −1.8430997 × 10$^{−5}$
C11 = 1.1082276 × 10$^{−6}$    C13 = −3.6490148 × 10$^{−7}$
C15 = −7.0733077 × 10$^{−7}$
X = 0                          Y = 1.6130766                  Z = 1.5976326 × 10$^{−2}$

Decentration [3] (DAR)

X(described in FFS [1])        Y(described in FFS [1])        Z(described in FFS [1])
α = −8.4693588 × 10$^{−1}$     β = 0.000                      γ = 0.000
md = 0.003

In this state, the value of md is different from that of the decentration Z.

Data of other surfaces are the same as in States 1-4.

State 6: Near-point (150 mm) where the variable mirror is optimized in accordance with twofold electronic zoom.

FFS [1]

C 4 = −8.6605429 × 10$^{−4}$   C 6 = −3.3179512 × 10$^{−4}$
C 8 = −8.2667455 × 10$^{−5}$   C10 = −3.1749661 × 10$^{−5}$
C11 = 7.4217471 × 10$^{−6}$    C13 = −1.6164728 × 10$^{−7}$
C15 = −2.8477659 × 10$^{−6}$
X = 0       Y = −1.7740545     Z = −9.0076818 × 10$^{−3}$

-continued

Decentration [3] (DAR)

X(described in FFS [1])        Y(described in FFS [1])        Z(described in FFS [1])
α = −8.4693588 × 10$^{−1}$     β = 0.000                      γ = 0.000
md = 0.006

In this state, the value of md is different from that of the decentration Z.

Data of other surfaces are the same as in States 1-4.

Subsequently, values of parameters of individual conditions in the first embodiment are shown in Tables 1A and 1B.

TABLE 1A

|  | Condition | State 1 | State 2 | State 3 | State 4 |
|---|---|---|---|---|---|
| Object distance |  | ∞ allowance | ∞ | 150 mm | 150 mm allowance |
| φDMx (power x) [1/mm] |  | 0.000 × 10$^0$ | −5.892 × 10$^{−4}$ | −1.086 × 10$^{−3}$ | −1.575 × 10$^{−3}$ |
| φDMy (power y) [1/mm] |  | 0.000 × 10$^0$ | −3.128 × 10$^{−4}$ | −6.189 × 10$^{−4}$ | −9.311 × 10$^{−4}$ |
| md (the amount of deformation) [mm] |  | 0.000 × 10$^0$ | 3.380 × 10$^{−3}$ | 6.430 × 10$^{−3}$ | 9.640 × 10$^{−3}$ |
| β 1 (magnification of rear lens unit) | (9) | −0.995 | −0.995 | −0.994 | −0.993 |
| f (focal length) [mm] |  | 4.538 | 4.538 | 4.538 | 4.538 |
| Cj (overall length of optical system) [mm] |  | 28.250 | 28.250 | 28.250 | 28.250 |

TABLE 1A-continued

| | Condition | State 1 | State 2 | State 3 | State 4 |
|---|---|---|---|---|---|
| Sm (mirror area) [mm$^2$] | | 25.525 | 25.525 | 25.525 | 25.525 |
| f1 (focal length of front lens unit) [mm] | | −4.558 | −4.558 | −4.558 | −4.558 |
| δ (maximum value of shift) [mm] | | 0.455 | 0.455 | 0.455 | 0.455 |
| ε (maximum value of tilt) [deg] | (12) | −2.000 | −2.000 | −2.000 | −2.000 |
| \|md/f\| | (3) | $0.000 \times 10^0$ | $7.448 \times 10^{-4}$ | $1.417 \times 10^{-3}$ | $2.124 \times 10^{-3}$ |
| md$^2$/Sm | (4) | $0.000 \times 10^0$ | $4.476 \times 10^{-7}$ | $1.620 \times 10^{-6}$ | $3.641 \times 10^{-6}$ |
| \|φDM × f\| | (6) | $0.000 \times 10^0$ | $2.047 \times 10^{-4}$ | $3.868 \times 10^{-3}$ | $5.686 \times 10^{-3}$ |
| f1/f | (7) | −1.004 | −1.004 | −1.004 | −1.004 |
| Cj/f | (10) | 6.225 | 6.225 | 6.225 | 6.225 |
| \|δ/f\| | (11) | 0.100 | 0.100 | 0.100 | 0.100 |

TABLE 1B

| | Condition | State 5 | State 6 |
|---|---|---|---|
| Object distance | | ∞ | 150 mm |
| φDMx (power x) [1/mm] | | $-6.393 \times 10^{-4}$ | $-8.661 \times 10^{-4}$ |
| φDMy (power y) [1/mm] | | $-3.698 \times 10^{-4}$ | $-3.318 \times 10^{-4}$ |
| md (the amount of deformation) [mm] | | $3 \times 10^{-3}$ | $6 \times 10^{-3}$ |
| β1 (magnification of rear lens unit) | (9) | −0.995 | −0.994 |
| f (focal length) [mm] | | 4.538 | 4.538 |
| Cj (overall length of optical system) [mm] | | 28.250 | 28.250 |
| Sm (mirror area) [mm$^2$] | | 25.525 | 25.525 |
| f1 (focal length of front lens unit) [mm] | | −4.558 | −4.558 |
| δ (maximum value of shift) [mm] | | 0.455 | 0.455 |
| ε (maximum value of tilt) [deg] | (12) | −2.000 | −2.000 |
| \|md/f\| | (3) | $6.6 \times 10^{-4}$ | $1.32 \times 10^{-3}$ |
| md$^2$/Sm | (4) | $3.52 \times 10^{-7}$ | $1.41 \times 10^{-6}$ |
| \|φDM × f\| | (6) | $2.290 \times 10^{-3}$ | $2.718 \times 10^{-3}$ |
| f1/f | (7) | −1.004 | −1.004 |
| Cj/f | (10) | 6.225 | 6.225 |
| \|δ/f\| | (11) | 0.100 | 0.100 |

Second Embodiment

Figure 16:
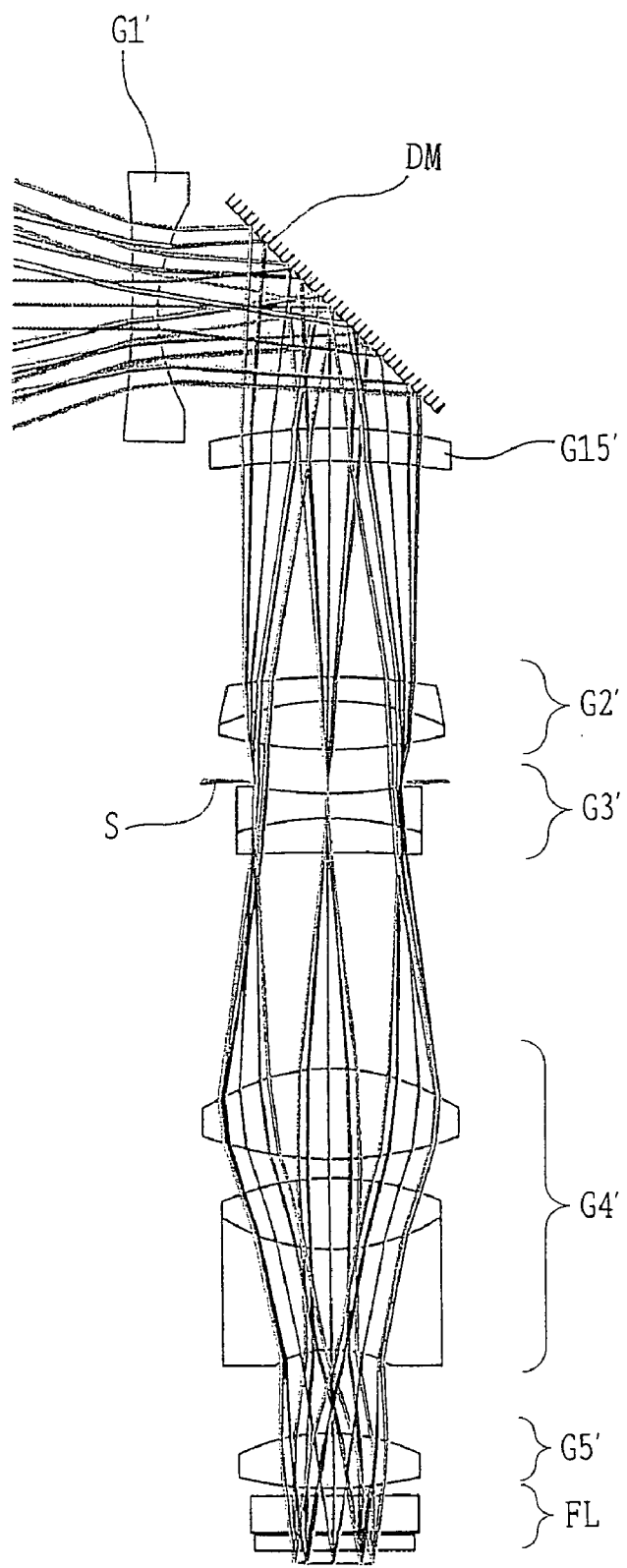
FIG. 16 is a Y-Z sectional view schematically showing the second embodiment, at a wide-angle position, of an optical system applicable to the optical apparatus of the present invention.
Figure 17:
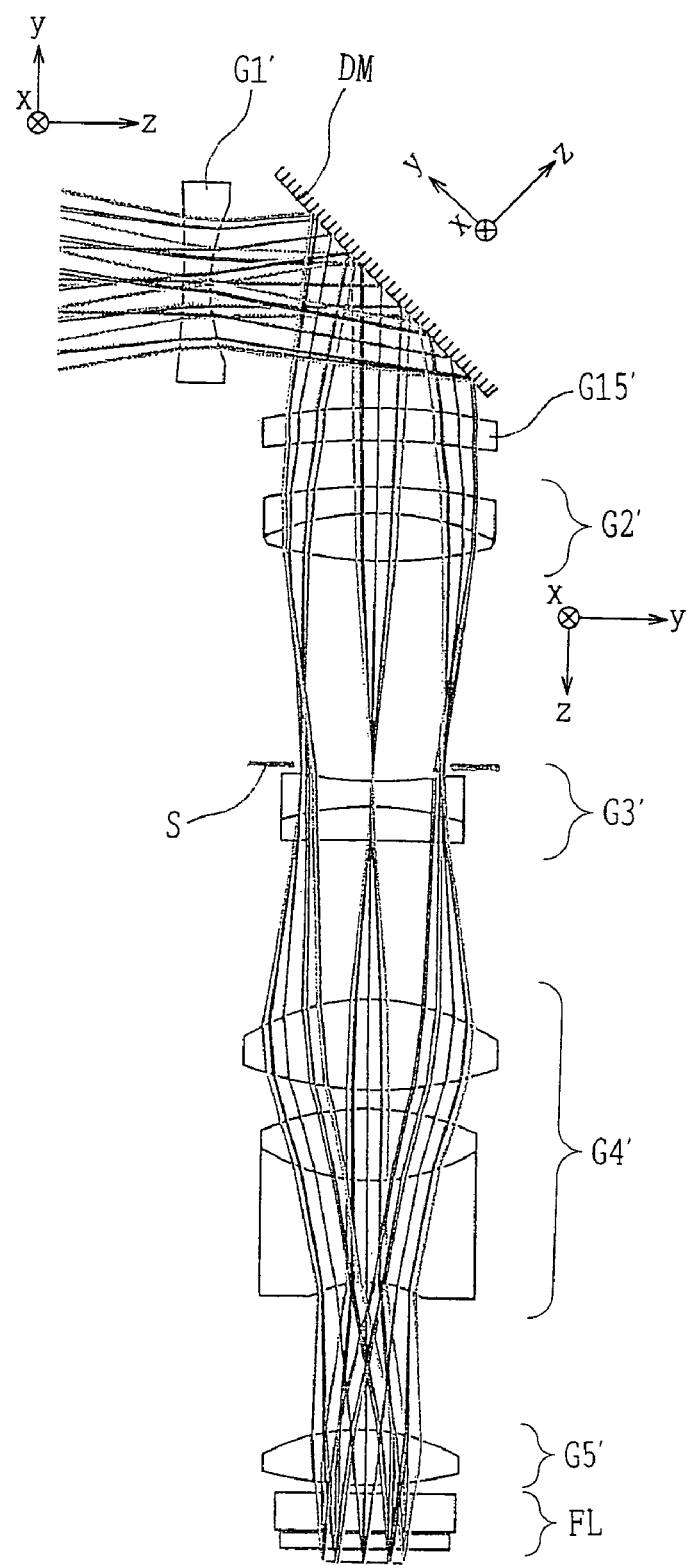
FIG. 17 is a Y-Z sectional view schematically showing the second embodiment, at a middle position, of the optical system applicable to the optical apparatus of the present invention.
Figure 18:
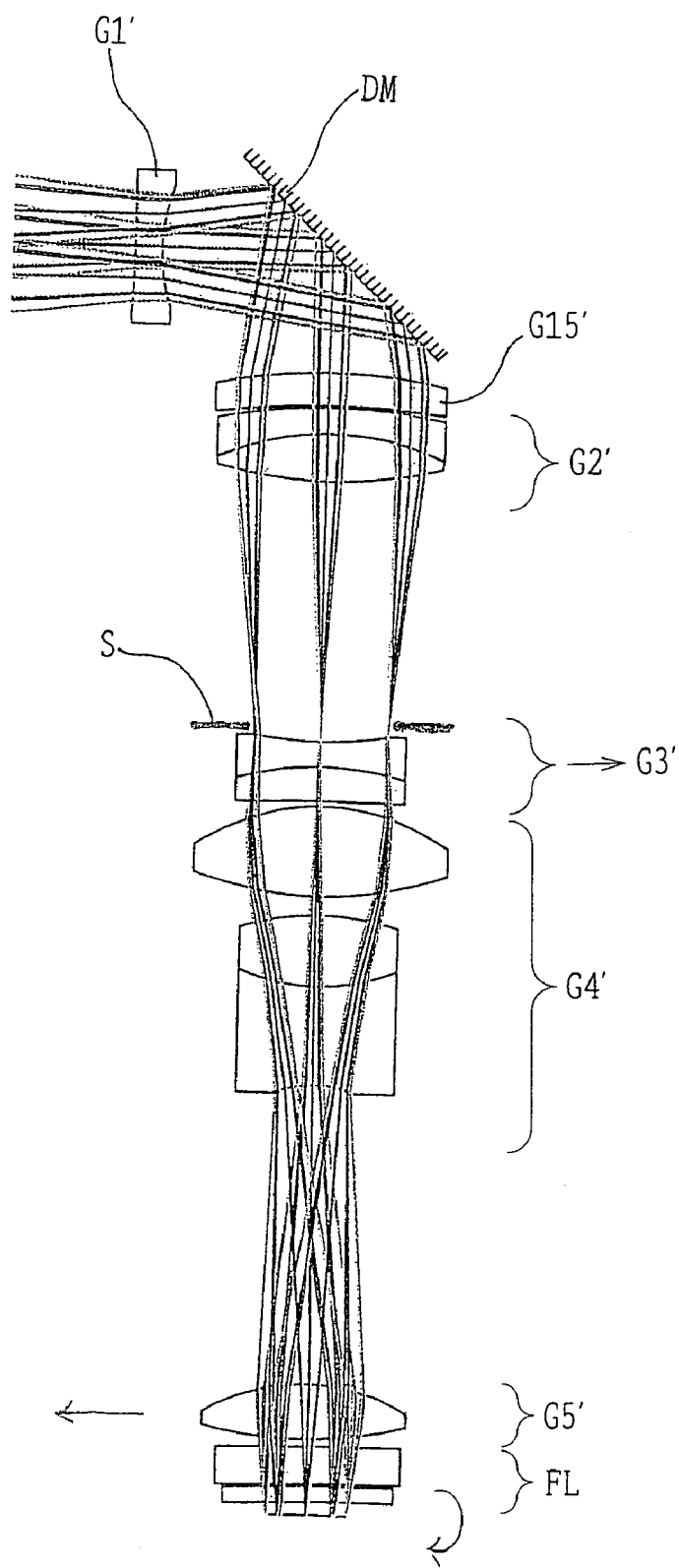
FIG. 18 is a Y-Z sectional view schematically showing the second embodiment, at a telephoto position, of an optical system applicable to the optical apparatus of the present invention.

FIGS. 16, 17, and 18 show the second embodiment of the optical system applicable to the optical apparatus of the present invention, at wide-angle, middle, and telephoto positions, respectively.

The deformable mirror of the second embodiment is capable of changing the power to perform focusing in the range from the far point to the near point, but is designed to bring about a state of weaker power than in focusing at the far point and a state of stronger power than in focusing at the near point in order to perform the autofocus operation of a contrast method. In the second embodiment, the state of weaker power than in focusing at the far point is defined as far-point allowance, and a state of stronger power than in focusing at the near point is defined as near-point allowance. That is, the deformable mirror has four states, the far-point allowance, the far point, the near point, and the near-point allowance, and in addition to each of these states, three states, the wide-angle, middle, and telephoto positions. Thus, in total, 12 states are brought about.

The deformable mirror in the second embodiment is designed to have an allowance for the amount of deformation before and after the focusing range, in view of the shift of the image plane in the Z direction caused by a fabrication error in actual fabrication and by a temperature change.

The optical system of the second embodiment includes, in order from the object side, a fixed lens unit G1' with negative power, the deformable mirror DM, a fixed lens unit 15' with positive power, a moving lens unit G2' with positive power, the stop S, a fixed lens unit G3' with negative power, a moving lens unit G4' with positive power, and a fixed lens unit G5' with positive power. In FIGS. 16-18, again, reference symbol FL designates the filter unit.

The fixed lens unit G1' is constructed with a biconcave negative lens. The fixed lens unit G 15' has a positive meniscus lens with a convex surface facing the object side. The moving lens unit G2' is constructed with a cemented doublet of a negative meniscus lens with a convex surface facing the object side and a biconvex positive lens. The fixed lens unit G3' is constructed with a cemented doublet of a biconcave negative lens and a positive meniscus lens with a convex surface facing the object side. The moving lens unit G4' has a biconvex positive lens and a cemented doublet of a biconvex positive lens and a biconcave negative lens. The fixed lens unit G5' is constructed with a biconvex positive lens.

The optical system of the second embodiment is provided with a variable magnification function by moving the moving lens units G2' and G4'. The thin film constituting the reflecting surface of the deformable mirror DM is deformed, and thereby focusing can be carried out in the range from the infinity to a near point of 300 mm.

When the thin film of the deformable mirror is deformed from a planar surface into a curved surface, decentering aberration is produced by reflection from a mirror surface. In particular, when focusing is carried out at the nearest point where the amount of deformation of the deformable mirror DM is appreciable, the decentering aberration is increased. Thus, in the second embodiment, to obtain favorable optical performance in the range from the far point to the near point, shift or tilt decentration is applied to a lens unit or an imaging plane. Whereby, the production of decentering aberration in focusing is balanced.

According to the optical system in the first and second embodiments, since focusing can be performed without mechanical drive, a lens frame structure is simplified and a compact design and a cost reduction can be attained. Moreover, there is the merit of eliminating the driving noise of a motor in focusing.

Also, although in the first embodiment the variable mirror is placed in the optical system and thereby various functions and effects are brought about, identical functions and effects can be obtained in the second embodiment.

Subsequently, numerical data optical members constituting the optical system of the second embodiment are shown below.

Numerical data 2
Focal length: 4.4 mm (wide-angle) ~13.2 mm (telephoto), 7.6 mm (middle)
Open F-number: 2.4~5.3
Size of imaging surface: 4.0 mm × 3.0 mm (X direction × Y direction)
Lens-to-lens spacing is changed in order of (wide-angle)-(middle)-(telephoto)

| Surface number | Radius of curvature | Surface spacing | Decentration | Refractive index | Abbe's number |
|---|---|---|---|---|---|
| Object surface | ∞ | ∞ | | | |
| 1 (virtual plane) | ∞ | 0.00 | | | |
| 2 | −50.75 | 1.00 | Decentration (1) | 1.7800 | 50.0 |
| 3 | ASP [1] | 0.00 | | | |
| 4 (virtual plane) | ∞ | 6.60 | | | |
| 5 (virtual plane) | ∞ | 0.00 | | | |
| 6 (virtual plane) | ∞ | 0.00 | | | |
| 7 (virtual plane) | ∞ | 0.00 | Decentration (2) | | |
| 8 | FFS [1] | 0.00 | Decentration (3) | | |
| 9 (virtual plane) | ∞ | 0.00 | Decentration (2) | | |
| 10 (virtual plane) | ∞ | 4.64 | | | |
| 11 | 19.94 | 1.27 | Decentration (4) | 1.8500 | 24.0 |
| 12 | 29.66 | 0.10 | Decentration (4) | | |
| 13 (virtual plane) | ∞ | 8.44~1.70~0.00 | | | |
| 14 | 21.47 | 1.00 | Decentration (5) | 1.8500 | 24.0 |
| 15 | 10.21 | 1.86 | Decentration (5) | 1.6173 | 57.3 |
| 16 | ASP[2] | 1.70~8.44~10.14 | Decentration (5) | | |
| 17 (stop surface) | | 1.00 | Decentration (6) | 1.7281 | 48.3 |
| 18 | 11.26 | 1.33 | Decentration (6) | 1.8500 | 24.0 |
| 19 | 77.41 | 0.10 | Decentration (6) | | |
| 20 (virtual plane) | ∞ | 8.45~6.07~0.10 | | | |
| 21 | ASP [3] | 3.56 | Decentration (7) | 1.4900 | 70.0 |
| 22 | ASP [4] | 0.75 | Decentration (7) | | |
| 23 | 9.80 | 2.77 | Decentration (8) | 1.5269 | 65.1 |
| 24 | −7.45 | 3.89 | Decentration (8) | 1.7727 | 31.5 |
| 25 | 4.26 | 3.27~5.65~11.62 | Decentration (8) | | |
| 26 (virtual plane) | ∞ | 0.00 | | | |
| 27 | 7.43 | 2.13 | Decentration (9) | 1.4900 | 70.0 |
| 28 | −14.27 | 0.30 | Decentration (9) | | |
| 29 | ∞ | 1.44 | | 1.5477 | 62.8 |
| 30 | ∞ | 0.10 | | | |
| 31 | ∞ | 0.60 | | 1.5163 | 64.1 |
| 32 | ∞ | 0.50 | | | |
| 33 (virtual plane) | ∞ | 0.00 | | | |
| Image plane | ∞ | 0.00 | Decentration (10) | | |

Aspherical coefficients

ASP [1]
Radius of curvature 7.18

$k = 0$
$a = -3.8858 \times 10^{-4}$   $b = -3.6372 \times 10^{-6}$   $c = -8.8491 \times 10^{-8}$   $d = 3.2705 \times 10^{-10}$ ASP [2]
Radius of curvature −16.03

$k = 0$
$a = 4.4224 \times 10^{-5}$   $b = 5.4185 \times 10^{-9}$   $c = 1.6428 \times 10^{-8}$   $d = -7.0199 \times 10^{-10}$ ASP [3]
Radius of curvature 7.70

$k = 0$
$a = -1.6991 \times 10^{-4}$   $b = -1.7112 \times 10^{-7}$   $c = 3.8286 \times 10^{-8}$   $d = -7.0832 \times 10^{-9}$ ASP [4]
Radius of curvature −12.01

$k = 0$
$a = 2.8459 \times 10^{-4}$   $b = 1.9921 \times 10^{-6}$   $c = -1.3381 \times 10^{-7}$   $d = -3.1611 \times 10^{-9}$ Amount of decentration Decentration [1] (DEO)

$X = 0.00$   $Y = 0.06$   $Z = 0.00$

-continued

| | | |
|---|---|---|
| α = −0.76 | β = 0.00 | γ = 0.00 |
| Decentration [2] (DAR) | | |
| X = 0.00 | Y = 0.00 | Z = 0.00 |
| α = 45.00 | β = 0.00 | γ = 0.00 |
| Decentration [3] (DAR) | | |
| X = 0.00 | Y (described in FFS [1]) | Z (described in FFS [1]) |
| α = −0.29 | β = 0.00 | γ = 0.00 |
| Decentration [4] (DAR) | | |
| X = 0.00 | Y = 0.00 | Z = 0.00 |
| α = 0.00 | β = 0.00 | γ = 0.00 |
| Decentration [5] (DAR) | | |
| X = 0.00 | Y = −0.05 | Z = 0.00 |
| α = 0.00 | β = 0.00 | γ = 0.00 |
| Decentration [6] (DAR) | | |
| X = 0.00 | Y = 0.07 | Z = 0.00 |
| α = 0.00 | β = 0.00 | γ = 0.00 |
| Decentration [7] (DAR) | | |
| X = 0.00 | Y = −0.01 | Z = 0.00 |
| α = 0.00 | β = 0.00 | γ = 0.00 |
| Decentration [8] (DAR) | | |
| X = 0.00 | Y = 0.00 | Z = 0.00 |
| α = 0.00 | β = 0.00 | γ = 0.00 |
| Decentration [9] (DAR) | | |
| X = 0.00 | Y = 0.19 | Z = 0.00 |
| α = 0.00 | β = 0.00 | γ = 0.00 |
| Decentration [10] (DAR) | | |
| X = 0.00 | Y = 0.00 | Z = 0.00 |
| α = 1.15 | β = 0.00 | γ = 0.00 |

However, the coordinate system of the fourth surface is the same as that of the first surface. The coordinate systems after the fifth surface are defined in order from the fourth surface.

FFS [1]

State 1: Wide-angle, far-point allowance (∞)
State 2: Middle, far-point allowance (∞)
State 3: Telephoto, Far-point allowance (∞)

In these three states, all of C4-C21 are zero.
All values of Y and Z in the decentration are also zero.

State 4: Wide-angle, far-point (∞)

C 4 = −5.8995 × 10$^{-4}$   C 6 = −2.9424 × 10$^{-4}$   C 8 = −1.1899 × 10$^{-5}$
C10 = −5.2364 × 10$^{-6}$   C11 = 6.5392 × 10$^{-6}$   C13 = 5.6143 × 10$^{-6}$
C15 = 1.5847 × 10$^{-6}$   C17 = 5.4357 × 10$^{-7}$   C19 = −1.9838 × 10$^{-8}$
C21 = 1.4414 × 10$^{-7}$
X = 0   Y = 2.5683618 × 10$^{-2}$   Z = 7.5651900 × 10$^{-3}$

State 5: Middle, far-point

C 4 = −2.2653 × 10$^{-4}$   C 6 = −1.1179 × 10$^{-4}$   C 8 = −7.6259 × 10$^{-6}$
C10 = −2.9580 × 10$^{-6}$   C11 = 2.5261 × 10$^{-6}$   C13 = 1.9724 × 10$^{-6}$
C15 = 6.5262 × 10$^{-7}$   C17 = 2.5658 × 10$^{-7}$   C19 = −7.4094 × 10$^{-8}$
C21 = 5.0196 × 10$^{-8}$
X = 0   Y = 6.7269098 × 10$^{-2}$   Z = 2.7958048 × 10$^{-3}$

State 6: Telephoto, far-point (∞)

C 4 = −1.0629 × 10$^{-4}$   C 6 = −5.1178 × 10$^{-5}$   C 8 = −3.0545 × 10$^{-6}$
C10 = −1.3201 × 10$^{-6}$   C11 = 1.7419 × 10$^{-6}$   C13 = 1.5053 × 10$^{-6}$
C15 = 3.9446 × 10$^{-7}$   C17 = 1.1609 × 10$^{-7}$   C19 = −7.8183 × 10$^{-8}$
C21 = 2.1350 × 10$^{-8}$
X = 0   Y = −2.8997388 × 10$^{-1}$   Z = 1.1937900 × 10$^{-3}$

-continued

State 7: Wide-angle, near-point (300 mm)

C 4 = −8.9987 × 10$^{-4}$   C 6 = −4.6031 × 10$^{-4}$   C 8 = −1.2709 × 10$^{-5}$
C10 = −9.2227 × 10$^{-6}$   C11 = 5.8328 × 10$^{-6}$   C13 = 5.2240 × 10$^{-6}$
C15 = 1.3529 × 10$^{-6}$   C17 = −1.3885 × 10$^{-7}$   C19 = 2.9544 × 10$^{-7}$
C21 = 1.2636 × 10$^{-7}$
X = 0   Y = 1.8131829 × 10$^{-1}$   Z = 1.2704720 × 10$^{-2}$

State 8: Middle, near-point (300 mm)

C 4 = −5.5202 × 10$^{-4}$   C 6 = −2.8215 × 10$^{-4}$   C 8 = −1.5110 × 10$^{-5}$
C10 = −8.0880 × 10$^{-6}$   C11 = 1.0816 × 10$^{-6}$   C13 = 8.5525 × 10$^{-7}$
C15 = −2.4178 × 10$^{-7}$   C17 = −2.6235 × 10$^{-7}$   C19 = −1.2175 × 10$^{-8}$
C21 = −6.1369 × 10$^{-8}$
X = 0   Y = 4.6081175 × 10$^{-1}$   Z = 8.3554983 × 10$^{-3}$

State 9: Telephoto, near-point (300 mm)

C 4 = −4.4543 × 10$^{-4}$   C 6 = −2.3298 × 10$^{-4}$   C 8 = −1.5323 × 10$^{-5}$
C10 = −9.3389 × 10$^{-6}$   C11 = 6.7912 × 10$^{-7}$   C13 = 3.7985 × 10$^{-7}$
C15 = 5.8882 × 10$^{-8}$   C17 = −1.2604 × 10$^{-7}$   C19 = 9.7671 × 10$^{-8}$
C21 = 4.6322 × 10$^{-8}$
X = 0   Y = 4.5036089 × 10$^{-1}$   Z = 6.7530421 × 10$^{-3}$

State 10: Wide-angle, near-point allowance (300 mm)

C 4 = −1.4304 × 10$^{-3}$   C 6 = −7.4243 × 10$^{-4}$   C 8 = −3.0911 × 10$^{-5}$
C10 = −2.5613 × 10$^{-5}$   C11 = 7.5650 × 10$^{-6}$   C13 = 5.8627 × 10$^{-6}$
C15 = 2.0048 × 10$^{-6}$   C17 = −2.3602 × 10$^{-7}$   C19 = 1.0980 × 10$^{-6}$
C21 = 4.6601 × 10$^{-7}$
X = 0   Y = 2.6318036 × 10$^{-1}$   Z = 2.0749379 × 10$^{-2}$

State 11: Middle, near-point allowance (300 mm)

C 4 = −7.6639 × 10$^{-4}$   C 6 = −3.9897 × 10$^{-4}$   C 8 = −2.6746 × 10$^{-5}$
C10 = −1.4551 × 10$^{-5}$   C11 = 2.3683 × 10$^{-6}$   C13 = 2.2765 × 10$^{-6}$
C15 = 2.1997 × 10$^{-7}$   C17 = 1.3439 × 10$^{-7}$   C19 = 4.1759 × 10$^{-7}$
C21 = 5.7639 × 10$^{-8}$
X = 0   Y = 4.6261205 × 10$^{-1}$   Z = 1.1455965 × 10$^{-2}$

-continued

State 12: Telephoto, near-point allowance (300 mm)

C 4 = −5.4800 × 10$^{-4}$   C 6 = −2.8654 × 10$^{-4}$   C 8 = −2.1514 × 10$^{-5}$
C10 = −1.1640 × 10$^{-5}$   C11 = 1.1846 × 10$^{-6}$   C13 = 1.8790 × 10$^{-7}$
C15 = 1.4185 × 10$^{-7}$    C17 = 1.0460 × 10$^{-7}$   C19 = 1.0214 × 10$^{-7}$
C21 = 7.2358 × 10$^{-8}$
X = 0                        Y = 4.5428613 × 10$^{-1}$   Z = 8.2647224 × 10$^{-3}$

Figure 19:
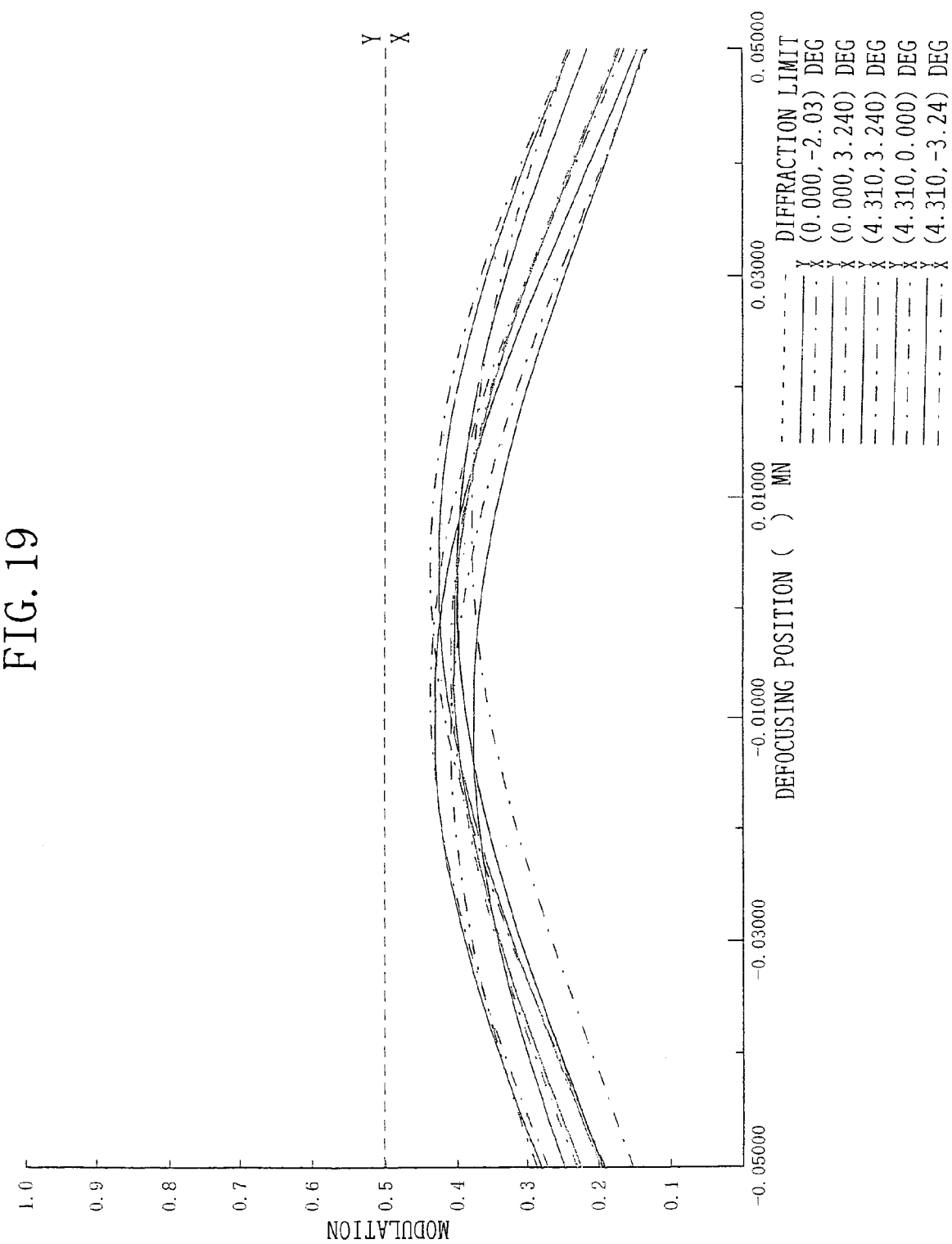
FIG. 19 is a graph showing the MTF where twofold electronic zoom is performed in the optical system of the second embodiment of FIGS. 16-18.

FIG. 19 is a graph showing the wave optical MTF (140 lines/mm) where two-fold electronic zoom is performed in the optical system of the second embodiment of FIGS. 16-18. The optical system is in the telephoto state and has an object point distance of ∞. In five object positions indicated at the bottom of FIG. 19, the graphs of the MTF are superimposed.

Figure 20:
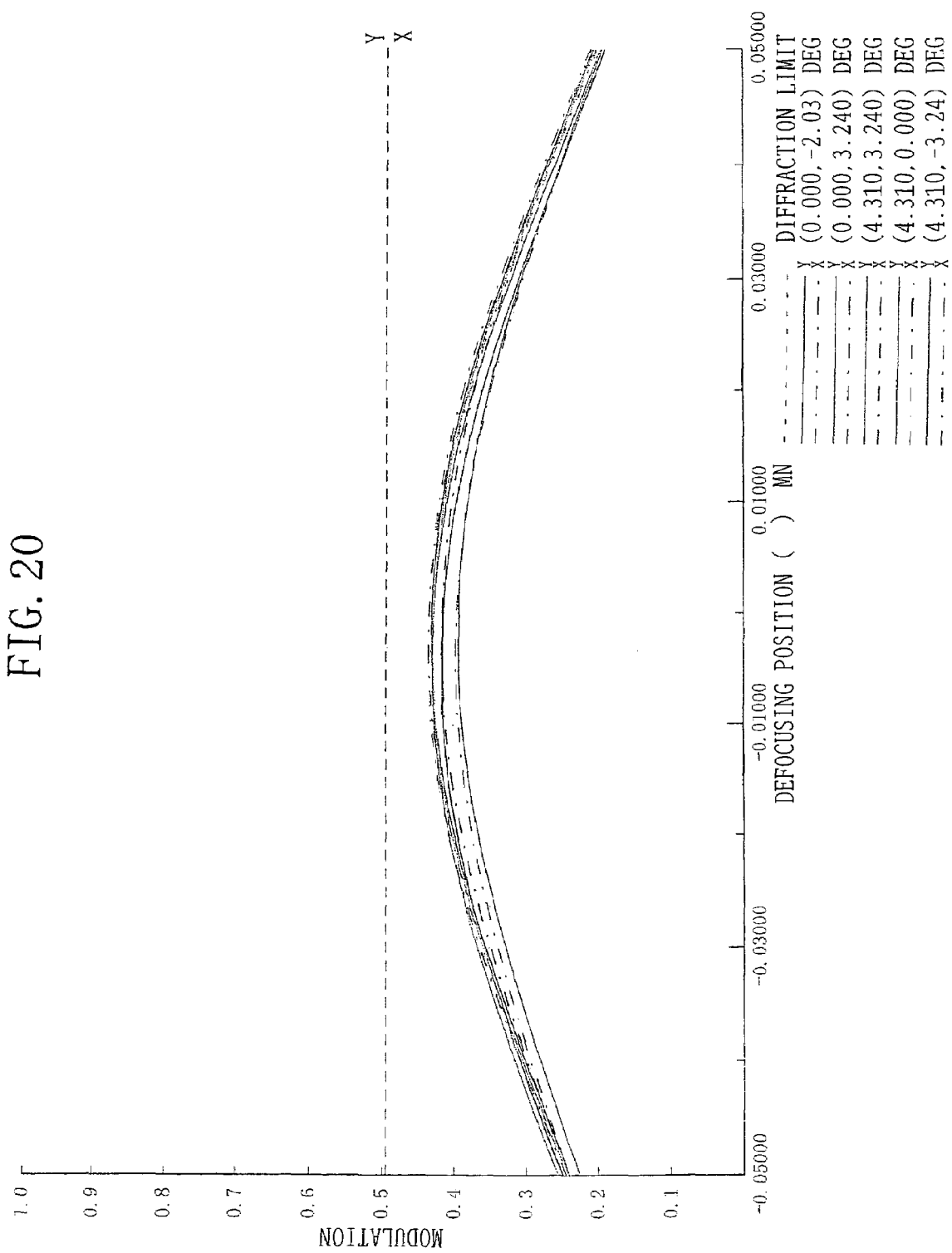
FIG. 20 is a graph showing the MTF where the configuration of the variable mirror is optimized with respect to only a part of the image used when the electronic zoom is performed in the optical system of the second embodiment of FIGS. 16-18.

FIG. 20 is a graph showing the MTF where the shape of the variable mirror is optimized with respect to only a part of the image used when the electronic zoom is performed in the optical system of the second embodiment of FIGS. 16-18. The calculating condition of the MTF is the same as in FIG. 19. Comparison with FIG. 19 shows that the MTF of FIG. 20 is improved.

Subsequently, numerical data of optical members constituting the optical system of the second embodiment in a state of FIG. 20 are shown below. Only the data of the eighth surface are shown here. The numerical data of other surfaces are the same as in State 6 of the numerical data in the second embodiment.

State 13: When the variable mirror is optimized in accordance with the electronic zoom,

FFS [1]

C 4 = −2.7203 × 10$^{-4}$   C 6 = −1.3596 × 10$^{-4}$   C 8 = −4.0935 × 10$^{-6}$
C10 = −1.9999 × 10$^{-6}$   C11 = 1.5109 × 10$^{-6}$   C13 = 1.6613 × 10$^{-6}$
C15 = 4.9016 × 10$^{-7}$    C17 = 1.2327 × 10$^{-7}$   C19 = 1.3220 × 10$^{-7}$
C21 = 3.9806 × 10$^{-8}$

Decentration [3]

X = 0.00                    Y = 2.6902975 × 10$^{-2}$   Z = 3.7656323 × 10$^{-3}$
α = −2.5095701 × 10$^{-1}$   β = 0.00                    γ = 0.00

Also, Conditions (1'), (2), (3), (3'), (3"), (4), (4'), (5), (5'), (6), (6'), (6"), (7), (7'), (8), (8'), (9), (9'), (10), (10'), (10"), (11), (11'), (11"), (12), (12') and (12"), like the optical system of the first embodiment, also hold for the optical system of the second embodiment of FIGS., 16-18. It is only necessary that these conditions are satisfied in at least one zoom state.

In the second embodiment, the values of the focal length f in each of Conditions (3), (3'), and (3"), as set forth in the numerical data, are 4.4 mm (wide-angle)~13.2 mm (telephoto) and 7.6 mm (middle). The value of the maximum amount of deformation md (mm) of the variable mirror is equal to that of the amount of decentration Z of the eighth surface. The value of the area Sm of the optically effective reflecting surface of the variable mirror in Conditions (4) and (4') is 69.08 mm². The value of the voltage Vm applied to the deformable mirror in Conditions (5) and (5') is in the range of 0 to 200 V, depending on the state. The value of the power φDM of the deformable mirror in Conditions (6), (6'), and (6") is ½ (C4+C6). Also, the amount φDMx is C4 and φDMy is C6. The value of the focal length f 1 of the lens unit with negative power placed on the object side of the variable mirror is −8.003. The value of the bending angle θ of the axial chief ray of the deformable mirror in Conditions (8) and (8') is 90.6°. The magnifications β1 of the lens unit ranging from an optical surface situated immediately behind the deformable mirror to the last surface in Conditions (9) and (9') are −0.550 at the wide-angle position, −0.950 at the middle position, and −1.649 at the telephoto position. The overall length Cj of the optical system in Conditions (10), (10'), and (10") is 56.78 mm. As mentioned above, it is only necessary that individual conditions of the present invention are satisfied in at least one state.

Subsequently, values of parameters of Conditions (3), (4), (6), (7), (9), and (10) are listed in Tables 2-6 and those of Conditions (11) and (12) are listed in Tables 7-10.

TABLE 2

| | Condition | State 1 | State 2 | State 3 |
|---|---|---|---|---|
| Object distance | | Wide-angle ∞ allowance | Middle ∞ allowance | Telephoto ∞ allowance |
| φDMx (power x) [l/mm] | | 0.000 × 10⁰ | 0.000 × 10⁰ | 0.000 × 10⁰ |
| φDMy (power y) [l/mm] | | 0.000 × 10⁰ | 0.000 × 10⁰ | 0.000 × 10⁰ |
| φDM | | 0.000 × 10⁰ | 0.000 × 10⁰ | 0.000 × 10⁰ |
| md (the amount of deformation) [mm] | | 0 | 0 | 0 |
| β 1 (magnification of rear lens unit) | (9) | −0.550 | −0.950 | −1.649 |
| f (focal length) [mm] | | 4.4 | 7.6 | 13.2 |
| Cj (overall length of optical system) [mm] | | 56.78 | 56.78 | 56.78 |
| Sm (mirror area) [mm²] | | 69.08 | 69.08 | 69.08 |
| f 1 (focal length of front lens unit) [mm] | | −8.003 | −8.003 | −8.003 |
| |md/f| | (3) | 0.000 × 10⁰ | 0.000 × 10⁰ | 0.000 × 10⁰ |
| md²/Sm | (4) | 0 | 0 | 0 |
| |φDM × f| | (6) | 0.000 × 10⁰ | 0.000 × 10⁰ | 0.000 × 10⁰ |
| f1/f | (7) | −1.819 | −1.053 | −0.606 |
| Cj/f | (10) | 12.905 | 7.471 | 4.302 |

TABLE 3

| | Condition | State 4 | State 5 | State 6 |
|---|---|---|---|---|
| Object distance | | Wide-angle ∞ | Middle ∞ | Telephoto ∞ |
| φDMx (power x) [l/mm] | | −5.8995 × 10$^{-4}$ | −2.2653 × 10$^{-4}$ | −1.0629 × 10$^{-4}$ |
| φDMy (power y) [l/mm] | | −2.9424 × 10$^{-4}$ | −1.1179 × 10$^{-4}$ | −5.1178 × 10$^{-5}$ |
| φDM | | −4.4210 × 10$^{-4}$ | −1.6916 × 10$^{-4}$ | −7.8734 × 10$^{-5}$ |
| md (the amount of deformation) [mm] | | 0.00757 | 0.0028 | 0.00119 |
| β 1 (magnification of rear lens unit) | (9) | −0.550 | −0.950 | −1.649 |
| f (focal length) [mm] | | 4.4 | 7.6 | 13.2 |
| Cj (overall length of optical system) [mm] | | 56.78 | 56.78 | 56.78 |
| Sm (mirror area) [mm²] | | 69.08 | 69.08 | 69.08 |
| f 1 (focal length of front lens unit) [mm] | | −8.003 | −8.003 | −8.003 |
| |md/f| | (3) | 1.7205 × 10$^{-3}$ | 3.6842 × 10$^{-4}$ | 9.0152 × 10$^{-5}$ |
| md²/Sm | (4) | 8.29544 × 10$^{-7}$ | 1.13492 × 10$^{-7}$ | 2.04994 × 10$^{-8}$ |

TABLE 3-continued

| | Condition | State 4 | State 5 | State 6 |
|---|---|---|---|---|
| $\|\phi DM \times f\|$ | (6) | $-1.9452 \times 10^{-3}$ | $-1.2856 \times 10^{-3}$ | $-1.0393 \times 10^{-3}$ |
| fl/f | (7) | $-1.819$ | $-1.053$ | $-0.606$ |
| Cj/f | (10) | 12.905 | 7.471 | 4.302 |

TABLE 4

| | Condition | State 7 | State 8 | State 9 |
|---|---|---|---|---|
| Object distance | | Wide-angle 300 mm | Middle 300 mm | Telephoto 300 mm |
| φDMx (power x) [1/mm] | | $-8.9987 \times 10^{-4}$ | $-5.5202 \times 10^{-4}$ | $-4.4543 \times 10^{-4}$ |
| φDMy (power y) [1/mm] | | $-4.6031 \times 10^{-4}$ | $-2.8215 \times 10^{-4}$ | $-2.3298 \times 10^{-4}$ |
| φDM | | $-6.8009 \times 10^{-4}$ | $-4.1709 \times 10^{-4}$ | $-3.3921 \times 10^{-4}$ |
| md (the amount of deformation) [mm] | | 0.0127 | 0.00836 | 0.00675 |
| β1 (magnification of rear lens unit) | (9) | $-0.550$ | $-0.950$ | $-1.649$ |
| f (focal length) [mm] | | 4.4 | 7.6 | 13.2 |
| Cj (overall length of optical system) [mm] | | 56.78 | 56.78 | 56.78 |
| Sm (minor area) [mm²] | | 69.08 | 69.08 | 69.08 |
| fl (focal length of front lens unit) [mm] | | $-8.003$ | $-8.003$ | $-8.003$ |
| \|md/fl\| | (3) | $2.8864 \times 10^{-3}$ | $1.1000 \times 10^{-3}$ | $5.1136 \times 10^{-4}$ |
| md²/Sm | (4) | $2.33483 \times 10^{-6}$ | $1.01172 \times 10^{-8}$ | $6.59561 \times 10^{-7}$ |
| $\|\phi DM \times f\|$ | (6) | $-2.9924 \times 10^{-3}$ | $-3.1698 \times 10^{-3}$ | $-4.4775 \times 10^{-3}$ |
| fl/f | (7) | $-1.819$ | $-1.053$ | $-0.606$ |
| Cj/f | (10) | 12.905 | 7.471 | 4.302 |

TABLE 5

| | Condition | State 10 | State 11 | State 12 |
|---|---|---|---|---|
| Object distance | | Wide-angle 300 mm allowance | Middle 300 mm allowance | Telephoto 300 mm allowance |
| φDMx (power x) [1/mm] | | $-1.4304 \times 10^{-3}$ | $-7.6639 \times 10^{-4}$ | $-5.4800 \times 10^{-4}$ |
| φDMy (power y) [1/mm] | | $-7.4243 \times 10^{-4}$ | $-3.9897 \times 10^{-4}$ | $-2.8654 \times 10^{-4}$ |
| φDM | | $-1.0864 \times 10^{-3}$ | $-5.8268 \times 10^{-4}$ | $-4.1727 \times 10^{-4}$ |
| md (the amount of deformation) [mm] | | 0.02075 | 0.01146 | 0.00826 |
| β1 (magnification of rear lens unit) | (9) | $-0.550$ | $-0.950$ | $-1.649$ |
| f (focal length) [mm] | | 4.4 | 7.6 | 13.2 |
| Cj (overall length of optical system) [mm] | | 56.78 | 56.78 | 56.78 |
| Sm (mirror area) [mm²] | | 69.08 | 69.08 | 69.08 |
| fl (focal length of front lens unit) [mm] | | $-8.003$ | $-8.003$ | $-8.003$ |
| \|md/fl\| | (3) | $4.7159 \times 10^{-3}$ | $1.5079 \times 10^{-3}$ | $6.2576 \times 10^{-4}$ |
| md²/Sm | (4) | $6.23281 \times 10^{-8}$ | $1.90115 \times 10^{-6}$ | $9.87661 \times 10^{-7}$ |
| $\|\phi DM \times f\|$ | (6) | $-4.7802 \times 10^{-3}$ | $-4.4284 \times 10^{-3}$ | $-5.5080 \times 10^{-3}$ |
| fl/f | (7) | $-1.819$ | $-1.053$ | $-0.606$ |
| Cj/f | (10) | 12.905 | 7.471 | 4.302 |

TABLE 6

| | Condition | State 13 |
|---|---|---|
| Object distance | | Telephoto electronic zoom |
| φDMx (power x) [1/mm] | | $-2.7203 \times 10^{-4}$ |
| φDMy (power y) [1/mm] | | $-1.3596 \times 10^{-4}$ |
| φDM | | $-2.0400 \times 10^{-4}$ |
| md (the amount of deformation) [mm] | | 0.00377 |
| β1 (magnification of rear lens unit) | (9) | $-1.649$ |
| f (focal length) [mm] | | 13.2 |
| Cj (overall length of optical system) [mm] | | 56.78 |
| Sm (mirror area) [mm²] | | 69.08 |
| fl (focal length of front lens unit) [mm] | | $-8.003$ |
| \|md/fl\| | (3) | $2.8561 \times 10^{-4}$ |
| md²/Sm | (4) | $2.05746 \times 10^{-7}$ |
| $\|\phi DM \times f\|$ | (6) | $-2.6927 \times 10^{-3}$ |
| fl/f | (7) | $-0.606$ |
| Cj/f | (10) | 4.302 |

TABLE 7

| | Lens No. (in order from the object side) | | |
|---|---|---|---|
| | 1 | 2 | 3 |
| δ [mm] | 0.06 | 0 | $-0.05$ |
| \|δ/fl\| Wide-angle | 0.013636364 | 0 | 0.011363636 |
| Middle | 0.007894737 | 0 | 0.006578947 |
| Telephoto | 0.004545455 | 0 | 0.003787879 |
| ε [deg] | $-0.76$ | 0 | 0 |
| \|ε/fl\| Wide-angle | 0.172727273 | 0 | 0 |
| Middle | 0.1 | 0 | 0 |
| Telephoto | 0.057575758 | 0 | 0 |

TABLE 8

| | Lens No. (in order from the object side) | | |
|---|---|---|---|
| | 4 | 5 | 6 |
| δ [mm] | $-0.05$ | 0.07 | 0.07 |
| \|δ/fl\| Wide-angle | 0.011363636 | 0.015909091 | 0.015909091 |
| Middle | 0.006578947 | 0.009210526 | 0.009210526 |
| Telephoto | 0.003787879 | 0.005303030 | 0.005303030 |
| ε [deg] | 0 | 0 | 0 |
| \|ε/fl\| Wide-angle | 0 | 0 | 0 |
| Middle | 0 | 0 | 0 |
| Telephoto | 0 | 0 | 0 |

TABLE 9

| | | Lens No. (in order from the object side) | | |
|---|---|---|---|---|
| | | 7 | 8 | 9 |
| |δ [mm] | −0.01 | 0 | 0 |
| \|δ/f\| | Wide-angle | 0.002272727 | 0 | 0 |
| | Middle | 0.001315789 | 0 | 0 |
| | Telephoto | 0.000757576 | 0 | 0 |
| | ε [deg] | 0 | 0 | 0 |
| \|ε/f\| | Wide-angle | 0 | 0 | 0 |
| | Middle | 0 | 0 | 0 |
| | Telephoto | 0 | 0 | 0 |

TABLE 10

| | | Lens No. (in order from the object side) 10 | Imaging surface |
|---|---|---|---|
| | δ [mm] | 0.19 | 0 |
| \|δ/f\| | Wide-angle | 0.043181818 | 0 |
| | Middle | 0.025 | 0 |
| | Telephoto | 0.014393939 | 0 |
| | ε [deg] | 0 | 1.15 |
| \|ε/f\| | Wide-angle | 0 | 0.261363636 |
| | Middle | 0 | 0.151315789 |
| | Telephoto | 0 | 0.087121212 |

In the first and second embodiments, reference has been made to the optical system using the deformable mirror. However, even in the optical system using a planar mirror or curved mirror whose shape is not changed, instead of the deformable mirror, the above conditions and limitations may be applied unless otherwise specified. This is because the merit of compactness in a path-bending optical system using the mirror is held as it is.

In the first and second embodiments, the optical system designed to have the reflecting surface in the lens unit has been described. However, when the optical system with no reflecting surface is constructed by using a variable optical-property element, for example, a variable focal-length lens, effects of compactness, a cost reduction, power saving, and operation noiselessness can be obtained. In addition, the variable focal-length mirror with no deformable surface may be used in the above embodiments. Also, the variable focal-length mirror is a kind of variable mirror. For the variable focal-length mirror, one example will be described later with reference to FIG. 46.

The above optical system is applicable to a film camera, a digital camera, a TV camera, a camera for personal digital assistants, an imaging device of a mobile phone, a monitoring camera, a robot's eye, and an electronic endoscope.

In the above description, the imaging optical system is assumed as the optical system, but the optical system can be used as a projection optical system, such as a projector, by replacing the object plane with the image plane, and an optical apparatus using this projection optical system can be fabricated.

Subsequently, a description will be given of the structural examples of variable optical-property elements, such as deformable mirrors and variable focal-length lenses, applicable to the optical system used in the optical apparatus of the present invention.

Figure 21:
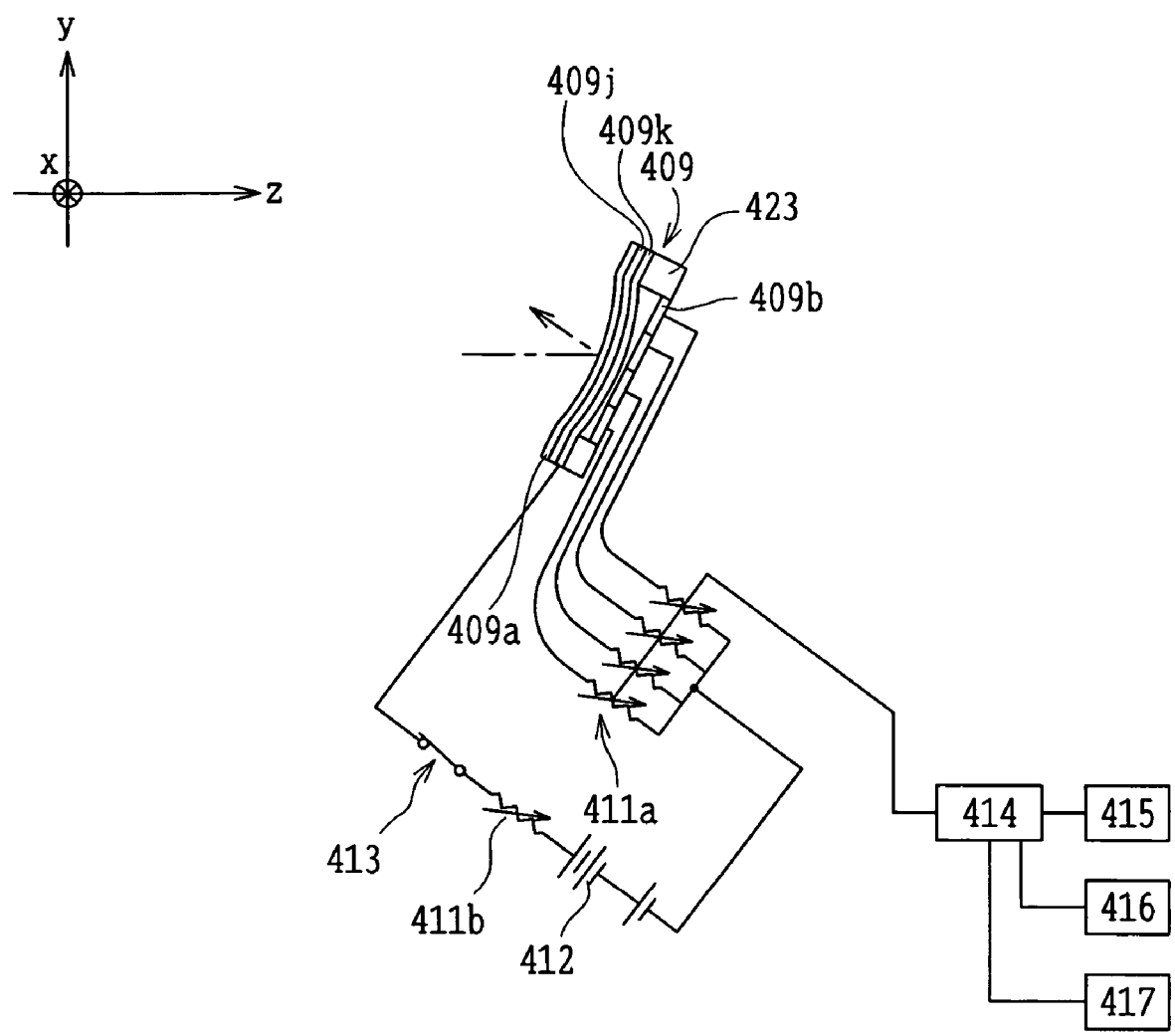
FIG. 21 is a diagram schematically showing an example of a deformable mirror as a variable optical-property element applicable to the optical system used in the optical apparatus of the present invention.

FIG. 21 shows an example of the deformable mirror constructed as the variable optical-property element applicable to the optical system used in the optical apparatus of the present invention. In FIG. 21, the deformable mirror 409 includes the thin film (reflecting surface) 409a of an aluminum coating formed on the deforming substrate 409j; the plurality of electrodes 409b in which the periphery of the three-layer structure including the electrode 409k provided beneath the substrate 409j is supported by the annular support 423 so that the electrodes 409b are spaced away from the electrode 409k and are mounted to the support 423; a plurality of variable resistors 411a connecting to the electrodes 409b and functioning as driving circuits; a power source 412 connected between the electrode 409k and the electrodes 409b through a variable resistor 411b and a power switch 413; and the arithmetical unit 414 for controlling the resistance values of the plurality of variable resistors 411a. The temperature sensor 415, the humidity sensor 416, and the range sensor 417 are connected to the arithmetical unit 414, and as shown in the figure, these constitute one optical unit. Also, the deforming substrate 409j may be the thin film or a plate.

The reflecting surface of the variable mirror need not necessarily be planar, depending on the control of the arithmetical unit 414, and may have any shape such as a spherical or rotationally symmetrical aspherical surface; a spherical, planar, or rotationally symmetrical aspherical surface which has decentration with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. In general, such a surface is referred as to an extended surface. By the reflecting surface constructed of the thin film 409a, a ray of light is reflected in the direction of the arrow of the figure.

Figure 23:
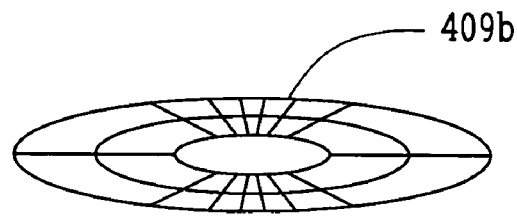
FIG. 23 is an explanatory view showing one aspect of electrodes used in the variable mirror of FIGS. 21 and 22.
Figure 24:
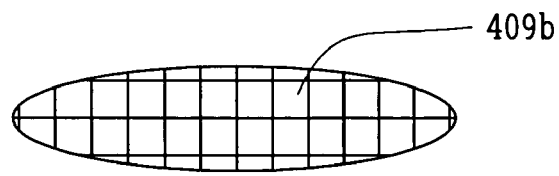
FIG. 24 is an explanatory view showing another aspect of electrodes used in the variable mirror of FIGS. 21 and 22.

The thin film 409a, like a membrane mirror set forth, for example, in "Handbook of Microlithography, Micromachining and Microfabrication", by P. Rai-Choudhury, Volume 2: Micromachining and Microfabrication, p. 495, FIG. 8.58, SPIE PRESS, or Optics Communication, Vol. 140, pp. 187-190, 1997, is such that when voltages are applied between the plurality of electrodes 409b and the electrode 409k, the thin film 409a is deformed by the electrostatic force and its surface profile is changed. Also, it is only necessary that the profile of the electrodes 409b, for example, as shown in FIG. 23 or 24, is selected to have a concentric or rectangular division pattern in accordance with the deformation of the thin film 409a.

As mentioned above, the configuration of the thin film 409a functioning as the reflecting surface is controlled in such a way that the resistance values of the variable resistors 411a are changed by signals from the arithmetical unit 414 to optimize imaging performance. Signals corresponding to ambient temperature and humidity and a distance to the object are input into the arithmetical unit 414 from the temperature sensor 415, the humidity sensor 416, and the range sensor 417. In accordance with these input signals, the arithmetical unit 414 outputs signals for determining the resistance values of the variable resistors 411a so that voltages governing the configuration of the thin film 409a are applied to the electrodes 409b by the command of the image processor 303 for the ambient temperature and humidity conditions, the distance to the object, and the electronic zoom. Thus, since the thin film 409a is deformed with the voltages applied to the electrodes 409b, that is, the electrostatic forces, it assumes various shapes including an aspherical surface, according to circumstances. The range sensor 417 need not necessarily be used, and in this case, it is only necessary that the object distance is calculated and the variable mirror is deformed so that a high-frequency component of an image signal from a solid-state image sensor 408 is roughly maximized. When the variable mirror 409 is made by using lithography, high fabrication accuracy and good quality are easily obtained.

When the deforming substrate 409j is made of synthetic resin, such as polyimide or the trade name, Cytop (made by ASAHI GLASS CO., LTD), it can be considerably deformed even at a low voltage, which is advantageous.

In FIG. 21, the thin film 409a of the reflecting surface and the deforming electrode 409k sandwiching the deforming substrate 409j between them are integrally constructed, and thus there is the merit that some manufacturing methods can be chosen. The thin film 409a of the reflecting surface may be configured as a conductive thin film. By doing so, the thin film 409a can also be used as the deforming electrode 409k. This brings about the merit that the structure is simplified because both are configured into one unit It is favorable that the profile of the reflecting surface of the variable mirror is a free-formed surface. This is because correction for aberration can be facilitated, which is advantageous.

Also, although in FIG. 21 the arithmetical unit 414, the temperature sensor 415, the humidity sensor 416, and the range sensor 417 are provided so that the variable mirror 409 compensates for the changes of the temperature, the humidity, and the object distance, the present invention is not limited to this construction. That is, the arithmetical unit 414, the temperature sensor 415, the humidity sensor 416, and the range sensor 417 may be eliminated so that the variable mirror 409 compensates for only a change of an observer's diopter.

Figure 22:
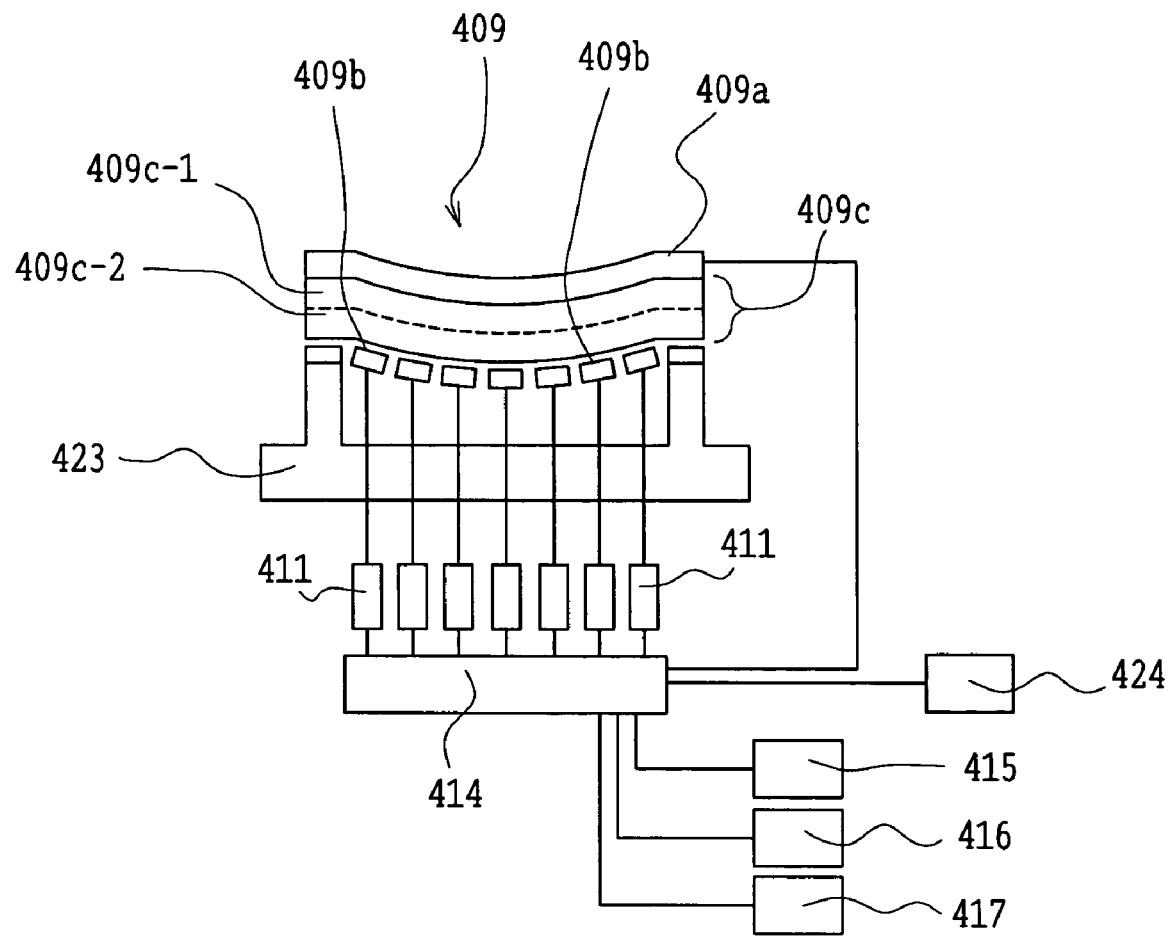
FIG. 22 is a diagram schematically showing another example of the variable mirror.

FIG. 22 shows another example of the variable mirror 409. In the variable mirror of this example, a piezoelectric element 409c is interposed between the thin film 409a of the reflecting surface and the electrodes 409b, and these are placed on the support 423. A voltage applied to the piezoelectric element 409c is changed in accordance with each of the electrodes 409b, and thereby the piezoelectric element 409c causes expansion and contraction which are partially different so that the shape of the thin film 409a can be changed. The configuration of the electrodes 409b, as illustrated in FIG. 23, may have a concentric division pattern, or as in FIG. 24, may be a rectangular division pattern. As other patterns, proper configurations can be chosen. In FIG. 22, reference numeral 424 represents a shake sensor connected to the arithmetical unit 414. The shake sensor 424, for example, detects the shake of a digital camera when the optical apparatus mentioned above is used in the digital camera, and changes the voltages applied to the electrodes 409b through the arithmetical unit 414 and driving circuits 411 housing variable resistors in order to deform the thin film 409a so as to compensate for the blurring of an image caused by the shake. At this time, signals from the temperature sensor 415, the humidity sensor 416, and range sensor 417 are taken into account simultaneously, and focusing and compensation for temperature and humidity are performed. In this case, stress is applied to the thin film 409a by the deformation of the piezoelectric element 409c, and hence it is good practice to design the thin film 409a so that it has a moderate thickness and a proper strength.

The driving circuits 411 are not limited to the construction that a plurality of circuits are arranged in accordance with the number of the electrodes 409b, and like the driving circuit 304 shown in FIG. 1, may be constructed so that the plurality of electrodes 409b are controlled by a single driving circuit.

Figure 25:
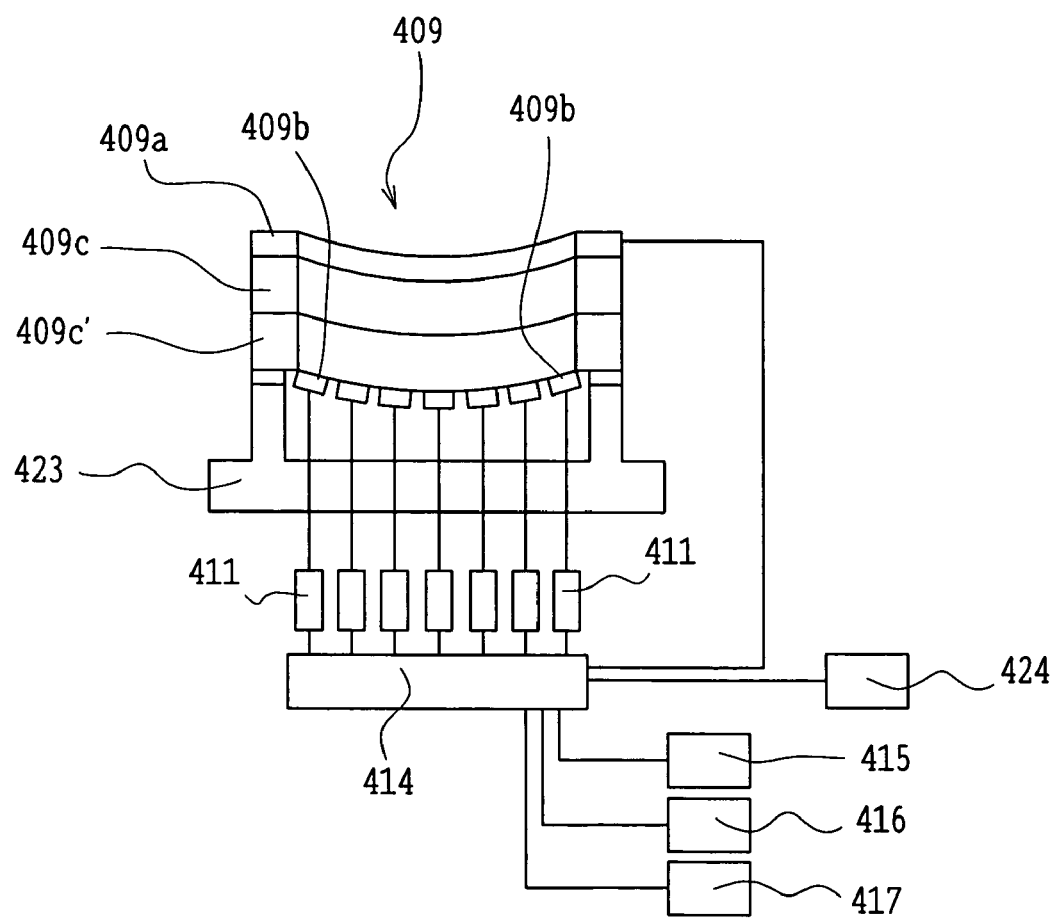
FIG. 25 is a view schematically showing another example of the variable mirror.

FIG. 25 shows still another example of the variable mirror. The variable mirror of this example is constructed with two piezoelectric elements 409c and 409c' interposed between the thin film 409a and the electrodes 409b and made with substances having piezoelectric characteristics which are reversed in direction. Specifically, the piezoelectric elements 409c and 409c' are made with ferroelectric crystals and are arranged so that their crystal axes are reversed in direction with respect to each other. In this case, the piezoelectric elements 409c and 409c' expand or contract in a reverse direction when voltages are applied, and thus there is the advantage that a force for deforming the thin film 409a becomes stronger than in the single layer structure of FIG. 22, and as a result, the shape of the mirror surface can be considerably changed.

For substances used for the piezoelectric elements 409c and 409c', for example, there are piezoelectric substances such as barium titanate, Rochelle salt, quartz crystal, tourmaline, KDP, ADP, and lithium niobate; polycrystals or crystals of the piezoelectric substances; piezoelectric ceramics such as solid solutions of $PbZrO_3$ and $PbTiO_3$; organic piezoelectric substances such as PVDF; and other ferroelectrics. In particular, the organic piezoelectric substance has a small value of Young's modulus and brings about a considerable deformation at a low voltage, which is favorable. When these piezoelectric elements are used, it is also possible to properly deform the thin film 409a in each of the above examples if their thicknesses are made uneven.

As materials of the piezoelectric elements 409c and 409c', high-polymer piezoelectrics such as polyurethane, silicon rubber, acrylic elastomer, PZT, PLZT, and PVDF; vinylidene cyanide copolymer; and copolymer of vinylidene fluoride and trifluoroethylene are used.

Figure 26:
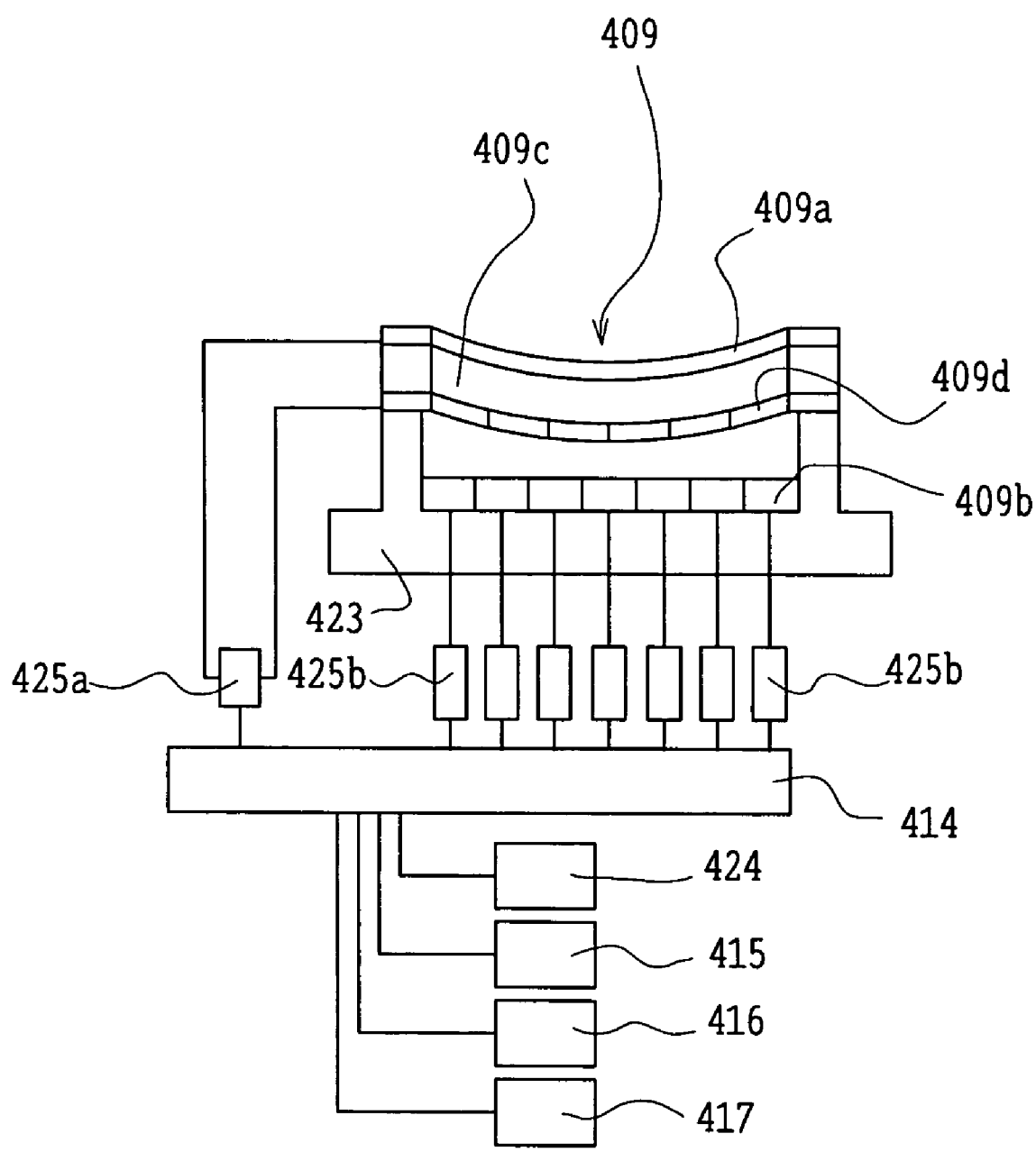
FIG. 26 is a view schematically showing another example of the variable mirror.

The use of an organic substance, synthetic resin, or elastomer, having a piezoelectric property, is favorable because it brings about a considerable deformation of the surface of the variable mirror When an electrostrictive substance, for example, acrylic elastomer or silicon rubber, is used for the piezoelectric element 409c shown in FIGS. 22 and 26, the piezoelectric element 409c, instead of the single layer structure, as indicated by a broken line in FIG. 22, may have the two-layer structure in which a substrate 409c-1 is cemented to an electrostrictive substance 409c-2.

FIG. 26 shows another example of the variable mirror 409. The variable mirror of this example is designed so that the piezoelectric element 409c is sandwiched between the thin film 409a and an electrode 409d, and these are placed on the support 423. Voltages are applied to the piezoelectric element 409c between the thin film 409a and the electrode 409d through a driving circuit 425a controlled by the arithmetical unit 414. Furthermore, apart from this, voltages are also applied to the electrodes 409b provided on the support 423, through driving circuits 425b controlled by the arithmetical unit 414. Therefore, in this example, the thin film 409a can be doubly deformed by electrostatic forces due to the voltages applied between the thin film 409a and the electrode 409d and applied to the electrodes 409b. There are advantages that various deformation patterns can be provided and the response is quick, compared with any of the above examples.

By changing the signs of the voltages applied between the thin film 409a and the electrode 409d, the variable mirror can be deformed into either a convex or concave surface. In this case, a considerable deformation may be performed by a piezoelectric effect, while a slight shape change may be carried out by the electrostatic force. Alternatively, the piezoelectric effect may be chiefly used for the deformation of the convex surface, while the electrostatic force may be used for the deformation of the concave surface. Also, the electrode 409*d* may be constructed as a plurality of electrodes like the electrodes 409*b*. This state is shown in FIG. 26. In the present invention, all of the piezoelectric effect, the electrostrictive effect, and electrostriction are generally called the piezoelectric effect. Thus, it is assumed that the electrostrictive substance comes into the category of the piezoelectric substance.

Figure 27:
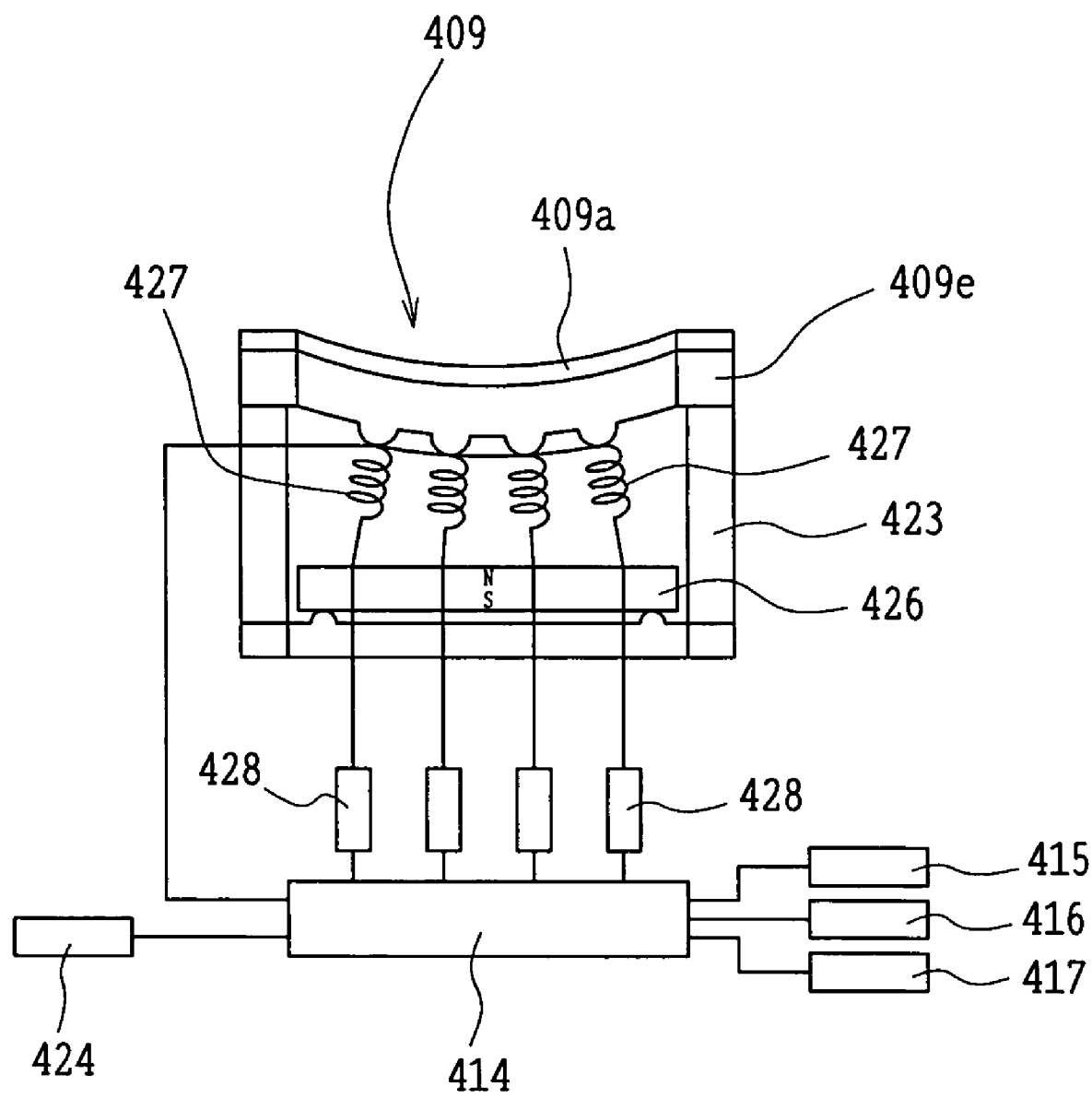
FIG. 27 is a view schematically showing another example of the variable mirror.

FIG. 27 shows another example of the variable mirror 409. The variable mirror of this example is designed so that the shape of the reflecting surface can be changed by utilizing an electromagnetic force. A permanent magnet 426 is fixed on the bottom surface inside the support 423, and the periphery of a substrate 409*e* made with silicon nitride or polyimide is mounted and fixed on the top surface thereof. The thin film 409*a* with the coating of metal, such as aluminum, is deposited on the surface of the substrate 409*e*, thereby constituting the variable mirror 409.

Below the substrate 409*e*, a plurality of coils 427 are fixedly mounted and connected to the arithmetical unit 414 through driving circuits 428. In accordance with output signals from the arithmetical unit 414 corresponding to changes of the optical system obtained at the arithmetical unit 414 by signals from the sensors 415, 416, 417, and 424 and the image processor 303 for the electronic zoom, proper electric currents are supplied from the driving circuits 428 to the coils 427. At this time, the coils 427 are repelled or attracted by the electromagnetic force with the permanent magnet 426 to deform the substrate 409*e* and the thin film 409*a* functioning as the reflecting surface.

In this case, a different amount of current can also be caused to flow through each of the coils 427. A single coil 427 may be used. The permanent magnet 426 may be mounted on the lower surface of the substrate 409*e* so that the coils 427 are arranged on the bottom side in the support 423. It is desirable that the coils 427 are made by a lithography process. A ferromagnetic iron core may be encased in each of the coils 427.

Figure 28:
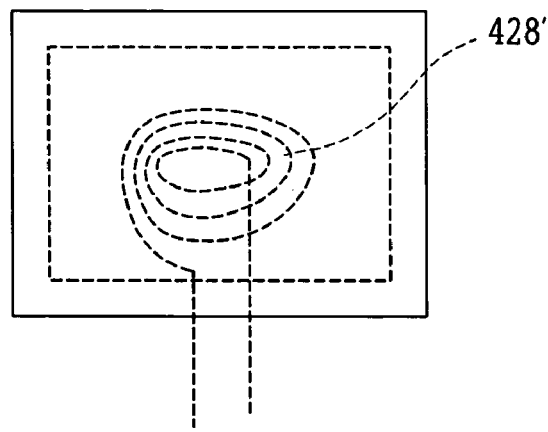
FIG. 28 is an explanatory view showing the winding density of a thin-film coil in the example of FIG. 27.

In this case, each of the coils 427, as illustrated in FIG. 28, can be designed so that a coil density varies with the place like a coil 428', and thereby a desired deformation is brought to the substrate 409*e* and the thin film 409*a*. A single coil 427 may be used, or a ferromagnetic iron core may be encased in each of the coils 427.

Figure 29:
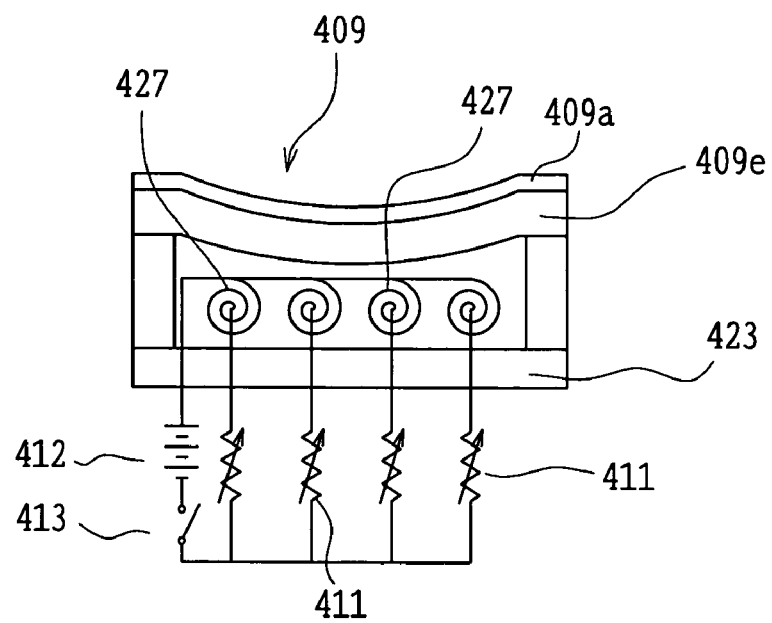
FIG. 29 is a view schematically showing another example of the variable mirror.
Figure 30:
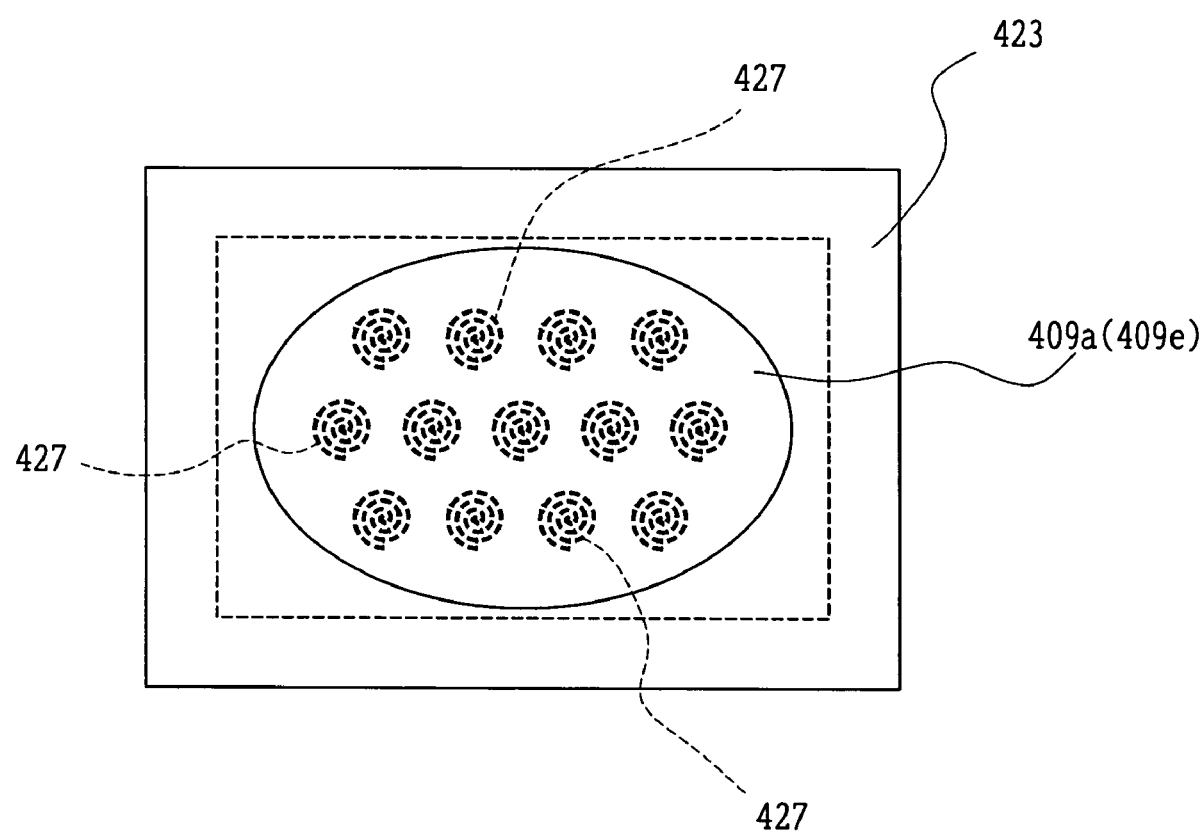
FIG. 30 is an explanatory view showing one example of an array of coils in the example of FIG. 29.
Figure 31:
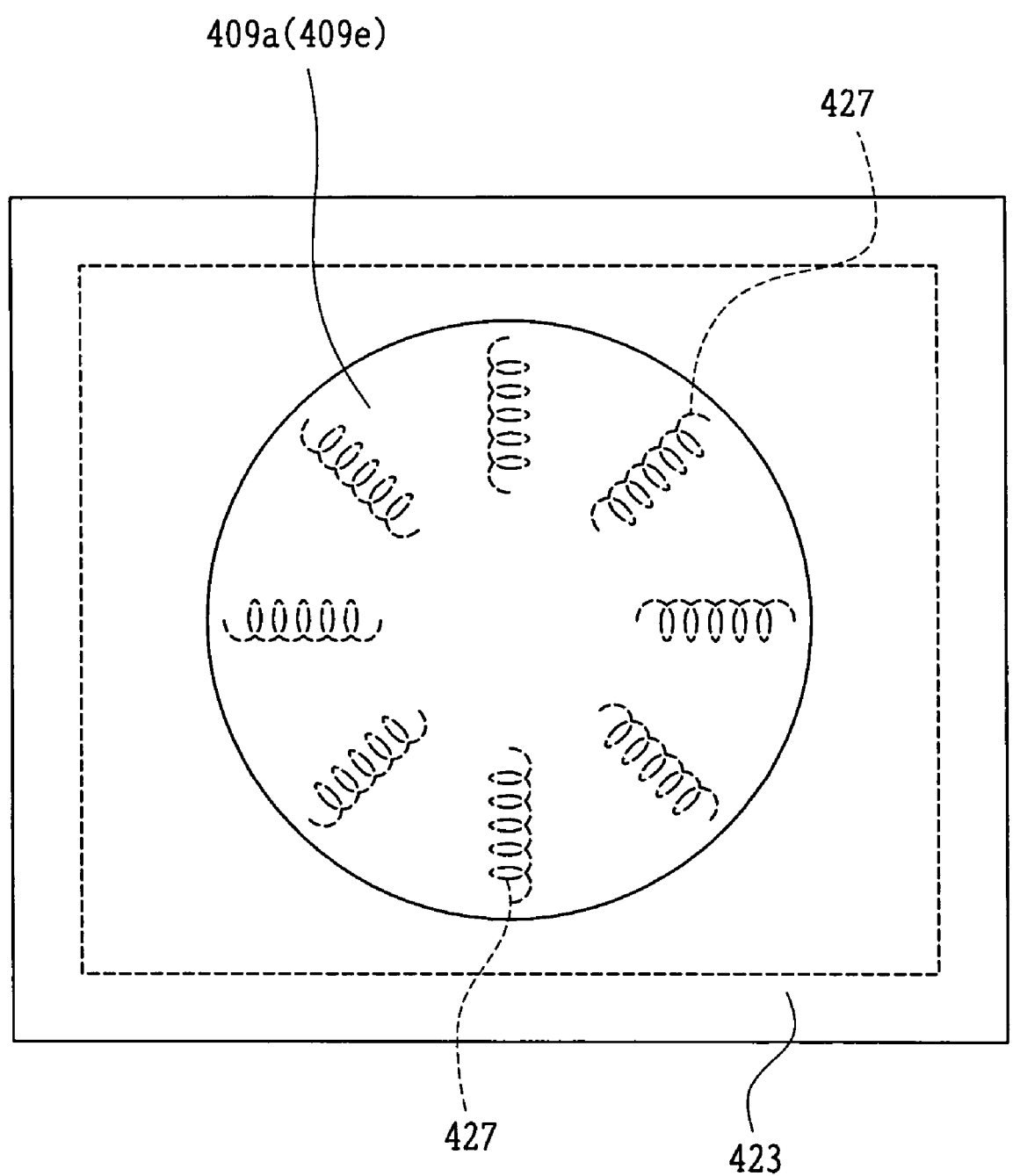
FIG. 31 is an explanatory view showing another example of the array of coils in the example of FIG. 29.
Figure 32:
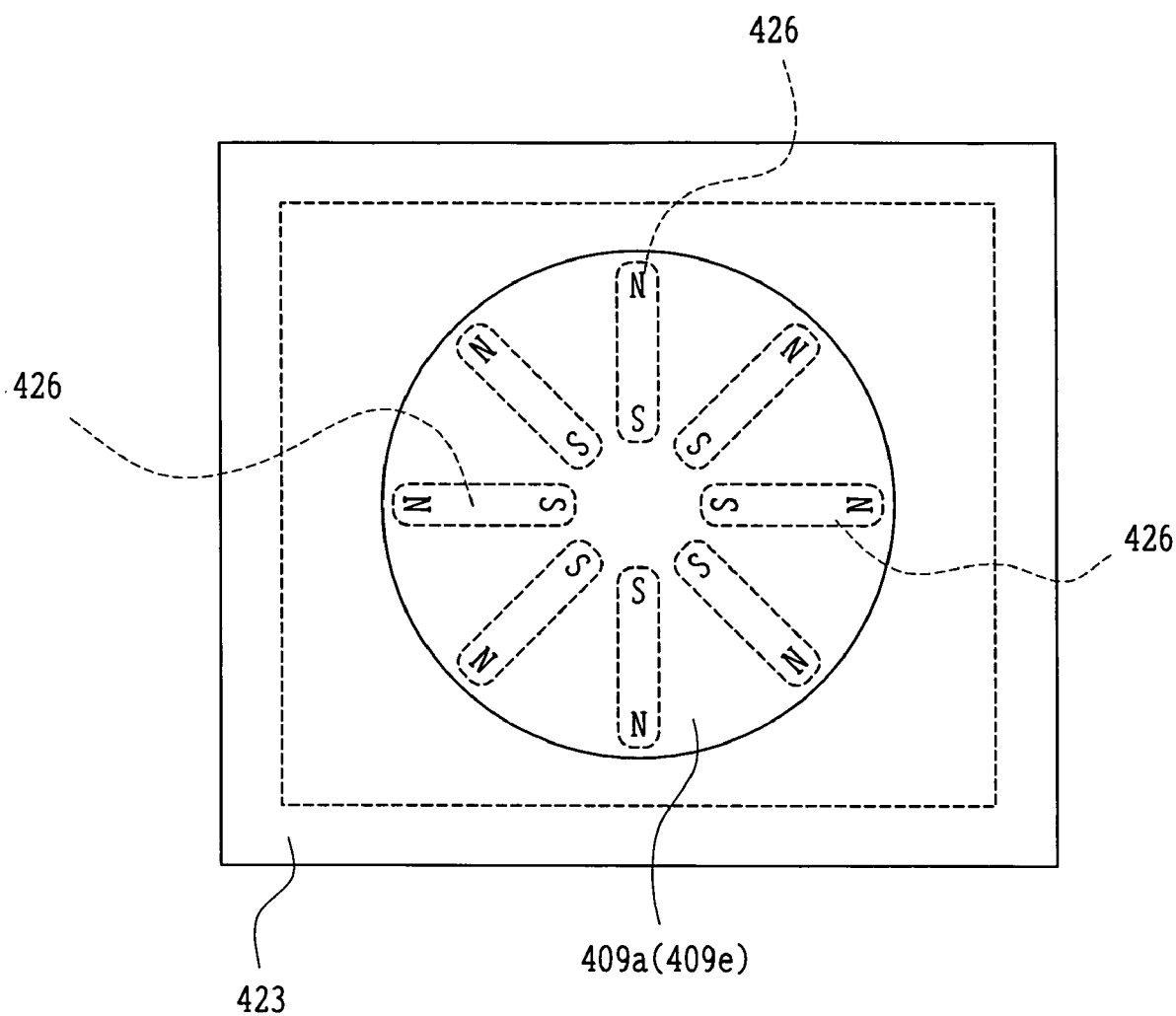
FIG. 32 is an explanatory view showing an array of permanent magnets suitable for the array of coils of FIG. 31 in the example of FIG. 27.

FIG. 29 shows another example of the variable mirror 409. In the variable mirror of this example, the substrate 409*e* is made with a ferromagnetic such as iron, and the thin film 409*a* of the reflecting film is made with aluminum. In this case, since even though the coils are not provided beneath the substrate 409*e*, the thin film 409*a* can be deformed by the magnetic force, the structure is simplified and the manufacturing cost can be reduced. If the power switch 413 is replaced with a changeover and power on-off switch, the directions of currents flowing through the coils 427 can be changed, and the configurations of the substrate 409*e* and the thin film 409*a* can be changed at will. FIG. 30 shows an example of an array of the coils 427 of this example. FIG. 31 shows another example of the array of the coils 427. These arrays are also applicable to the example of FIG. 27. FIG. 32 shows an array of the permanent magnets 426 suitable for the case where the coils 427, as shown in FIG. 31, are radially arrayed. Specifically, when the bar-shaped permanent magnets 426, as shown in FIG. 32, are radially arrayed, a delicate deformation can be provided to the substrate 409*e* and the thin film 409*a* in contrast with the example of FIG. 27. As mentioned above, when the electromagnetic force is used to deform the substrate 409*e* and the thin film 409*a* (in the examples of FIGS. 27 and 29), there is the advantage that they can be driven at a lower voltage than in the case where the electrostatic force is used.

Some examples of the variable mirrors have been described, but as shown in the example of FIG. 26, at least two kinds of forces may be used in order to change the shape of the mirror constructed with a thin film. Specifically, at least two of the electrostatic force, electromagnetic force, piezoelectric effect, magnetrostriction, pressure of a fluid, electric field, magnetic field, temperature change, and electromagnetic wave, may be used simultaneously to deform the thin film constituting the reflecting surface. That is, when at least two different driving techniques are used to make the variable optical-property element, a considerable deformation and a slight deformation can be realized simultaneously and a mirror surface with a high degree of accuracy can be obtained.

Figure 33:
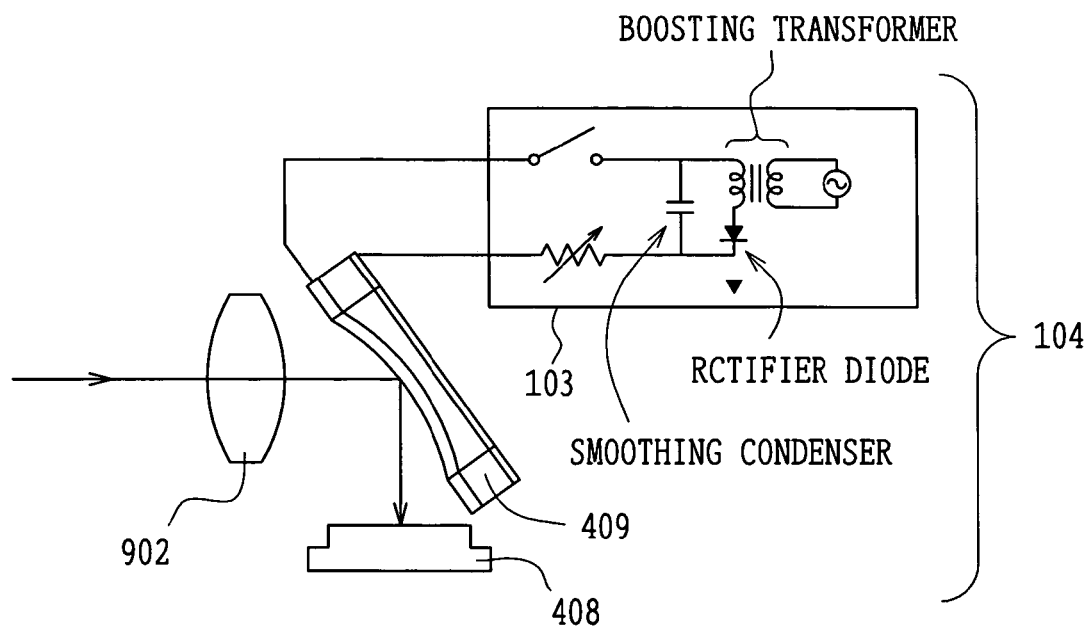
FIG. 33 is a view schematically showing the variable mirror applicable to the optical apparatus of the present invention.

FIG. 33 shows an imaging system which uses the variable mirror 409 applicable to the optical apparatus of another example of the present invention and is used, for example, in a digital camera of a mobile phone, a capsule endoscope, an electronic endoscope, a digital camera for personal computers, or a digital camera for PDAs. In the imaging system of this example, one imaging unit 104 is constructed with the deformable mirror 409, the lens 902, the solid-state image sensor 408, and a control system 103. The imaging unit 104 of this example is designed so that light from an object passing through the lens 902 is condensed by the variable mirror 409 and is imaged on the solid-state image sensor 408. The variable mirror 409 is a kind of variable optical-property element and is also referred to as the variable focal-length mirror.

According to this example, even when the object distance is changed, the variable mirror 409 is deformed and thereby the object can be brought into a focus. The example need not move the lens 902 by using a motor and excels in compact and lightweight design and low power consumption. The imaging unit 104 can be used in any of the examples as the imaging optical system of the present invention. When a plurality of variable mirrors 409 are used, an optical system, such as a zoom imaging optical system or a variable magnification imaging optical system, can be constructed.

In FIG. 33, an example of a control system is cited which includes the boosting circuit of a transformer using coils in the control system 103. In particular, the use of a laminated piezoelectric transformer is favorable because a compact design can be achieved. The boosting circuit can be used in the variable mirror or the variable focal-length lens which uses electricity, and is particularly useful for the variable mirror or the variable focal-length lens which utilizes the electrostatic force or the piezoelectric effect. In order to use the variable mirror 409 for focusing, it is only necessary, for example, to form an object image on the solid-state image sensor 408 and to find a state where the high-frequency component of the object image is maximized while changing the focal length of the variable mirror 409. In order to detect the high-frequency component, it is only necessary, for example, to connect a processor including a microcomputer to the solid-state image sensor 408 and to detect the high-frequency component therein.

Figure 34:
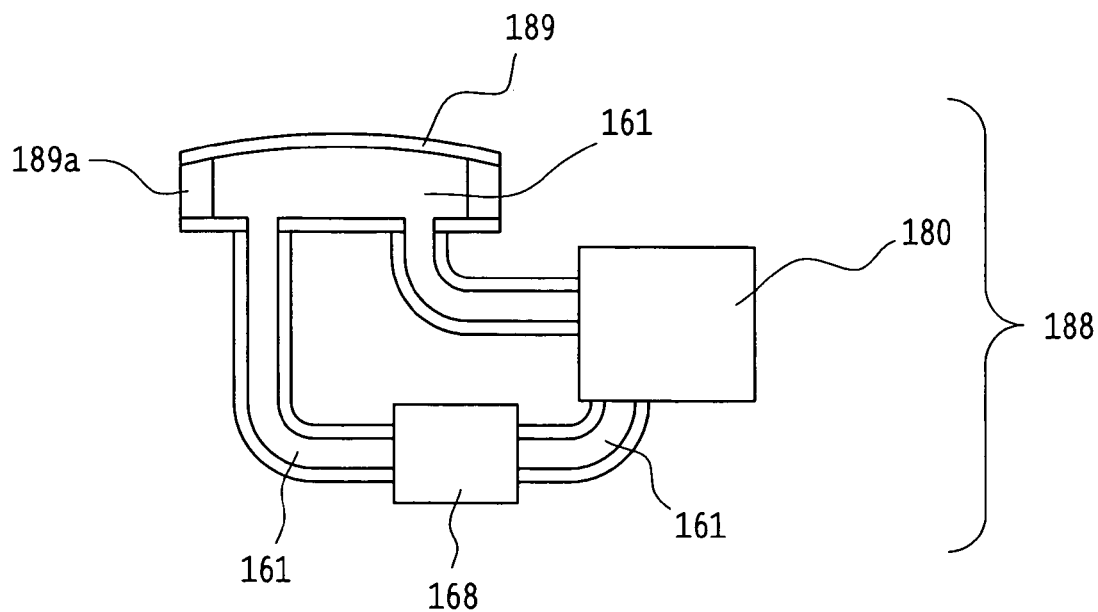
FIG. 34 is a view schematically showing the variable mirror in which a fluid is taken in and out by a micropump to deform a lens surface.

FIG. 34 shows another example of the variable mirror. In this figure, a variable mirror 188 is constructed so that a fluid 161 is taken in and out by a micropump 180 to deform a mirror surface which is configured with a film extended on the upper surface of a support 189*a*. According to this example, there is the merit that the mirror surface can be considerably deformed. In this figure, reference numeral 168 denotes a control device controlling the amount of the fluid 161 in the support 189a, together the micropump 180. The control device 168 and the micropump 180 are to control the deformation of a film 189, and thus correspond to the driving circuit 304. The micropump 180 is a small-sized pump, for example, made by a micromachining technique and is constructed so that it is operated with an electric power. As examples of pumps made by the micromachining technique, there are those which use thermal deformations, piezoelectric substances, and electrostatic forces.

Figure 35:
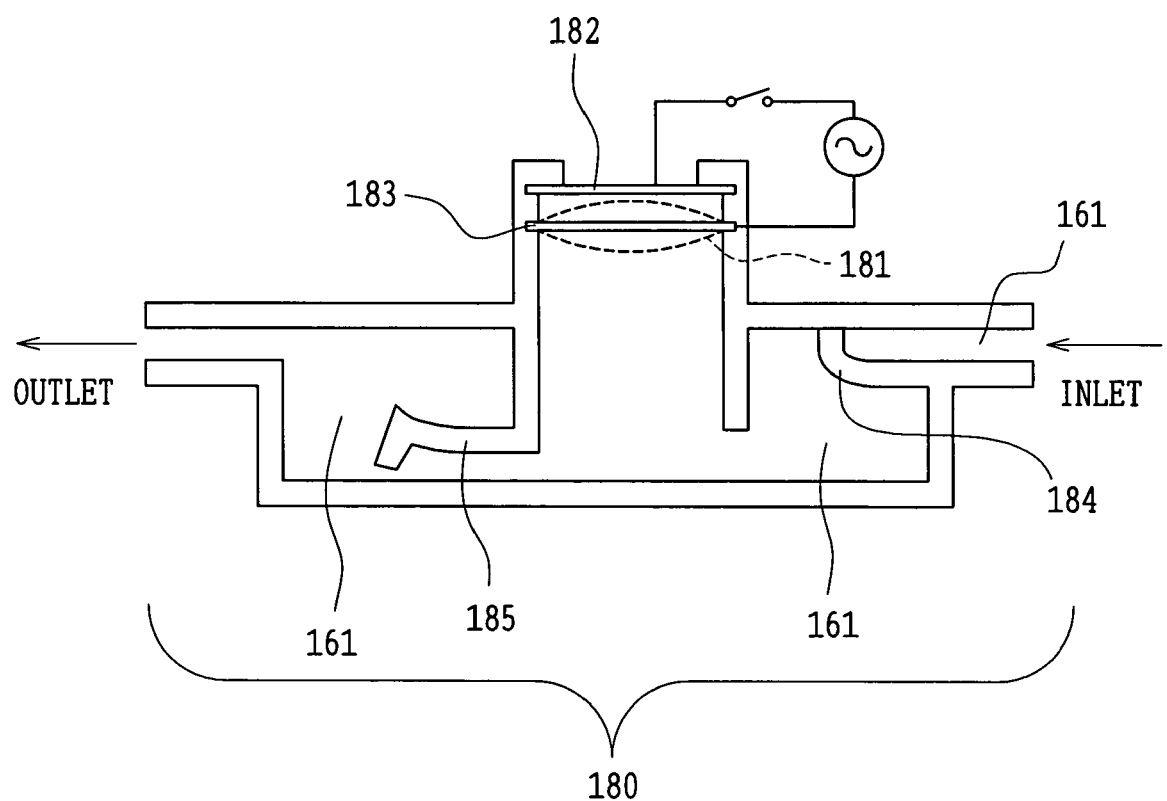
FIG. 35 is a view schematically showing one example of the micropump.

FIG. 35 shows an example of the micropump 180 of FIG. 34. In the micropump 180 of this example, a vibrating plate 181 is vibrated by the electrostatic force or the electric force of the piezoelectric effect. In FIG. 35, a case where the vibrating plate is vibrated by the electrostatic force is shown and reference numerals 182 and 183 represent electrodes. Dotted lines indicate the vibrating plate 181 where it is deformed. When the vibrating plate 181 is vibrated, two valves 184 and 185 are opened and closed to feed the fluid 161 from the right to the left.

In the variable mirror 188 shown in FIG. 34, the film 189 constituting the reflecting surface is deformed into a concave or convex surface in accordance with the amount of the fluid 161, thereby functioning as the variable mirror. An organic or inorganic substance, such as silicon oil, air, water, or jelly, can be used as the fluid.

In the variable mirror or the variable focal-length lens which uses the electrostatic force or the piezoelectric effect, a high voltage is sometimes required for drive. In this case, for example, as shown in FIG. 33, it is desirable that the boosting transformer or the piezoelectric transformer is used to constitute the control system.

The provision of the thin film 409a or the film 189 which constitutes the reflecting surface on a member which is not deformed like the upper portion of the annular member of the support 423 or 189a is convenient because it can be used as a reference surface when the profile of the reflecting surface of the variable mirror is measured by an interferometer.

FIG. 36 shows the principle structure of the variable focal-length lens that a part of lenses or a lens unit constituting the optical system applicable to the optical apparatus of the present invention is replaced with the variable focal-length lens and thereby zooming of the lenses or the lens unit in the direction of the optical axis becomes unnecessary. A variable focal-length lens 511 includes a first lens 512a having lens surfaces 508a and 508b as a first surface and a second surface, respectively; a second lens 512b having lens surfaces 509a and 509b as a third surface and a fourth surface, respectively; and a third lens 512c constructed with a macromolecular dispersed liquid crystal layer 514 sandwiched between the first and second lenses through transparent electrodes 513a and 513b. Incident light is converged through the first, third, and second lenses 512a, 512c, and 512b. The transparent electrodes 513a and 513b are connected to an alternating-current power supply 516 through a switch 515 so that an alternating-current voltage is selectively applied to the macromolecular dispersed liquid crystal layer 514. The macromolecular dispersed liquid crystal layer 514 is composed of a great number of minute macromolecular cells 518, each having any shape, such as a sphere or polyhedron, and including liquid crystal molecules 517. The volume of each cell is equal to the sum of volumes occupied by macromolecules and the liquid crystal molecules 517 which constitute the macromolecular cells 518.

Here, for the size of each of the macromolecular cells 518, for example, in the case of a sphere, when an average diameter is denoted by D and the wavelength of light used is denoted by $\lambda$, the average diameter D is chosen to satisfy the following condition:

$$2 \text{ nm} \leq D \leq \lambda/5 \tag{13}$$

That is, the size of each of the liquid crystal molecules 517 is at least about 2 nm and thus the lower limit of the average diameter D is set to 2 nm or larger. The upper limit of the diameter D depends on a thickness t of the macromolecular dispersed liquid crystal layer 514 in the direction of the optical axis of the variable focal-length lens 511. However, if the diameter is larger than the wavelength $\lambda$, a difference in refractive index between the macromolecule and the liquid crystal molecule 517 will cause light to be scattered at the interface of the macromolecular cell 518 and will render the liquid crystal layer 514 opaque. Hence, the upper limit of the diameter D, as described later, should preferably be $\lambda/5$ or less. A high degree of accuracy is not necessarily required, depending on an optical product using the variable focal-length lens. In this case, the diameter D below the value of the wavelength $\lambda$ is satisfactory. Also, the transparency of the macromolecular dispersed liquid crystal layer 514 deteriorates with increasing thickness t.

Figure 37:
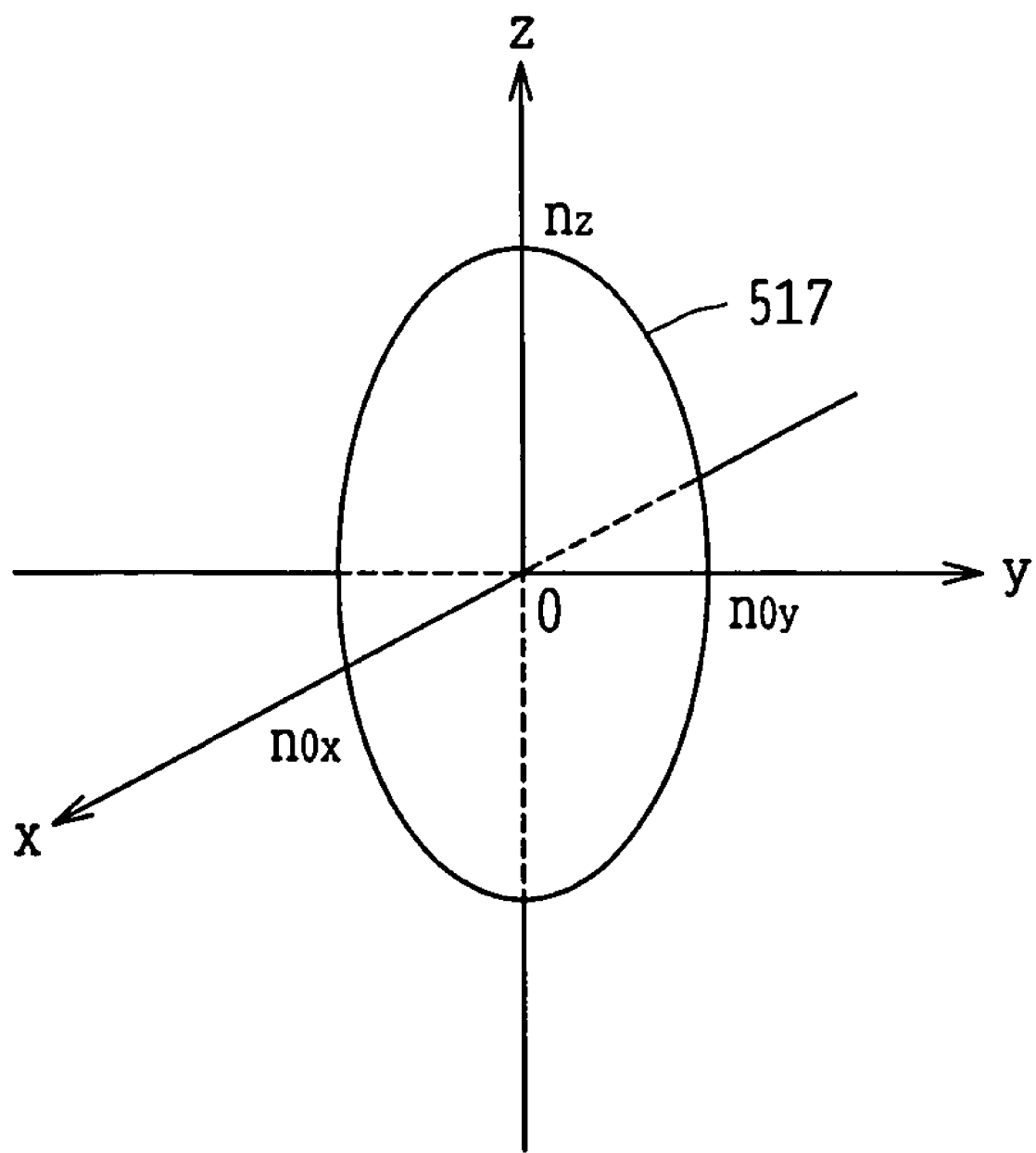
FIG. 37 is a view showing the index ellipsoid of a nematic liquid crystal of uniaxial anisotropy.

In the liquid crystal molecules 517, for example, uniaxial nematic liquid crystal molecules are used. The index ellipsoid of each of the liquid crystal molecules 517 is as shown in FIG. 37. That is, $$n_{ox} = n_{oy} = n_o \tag{14}$$

where $n_o$ is the refractive index of an ordinary ray, and $n_{ox}$ and $n_{oy}$ are refractive indices in directions perpendicular to each other in a plane including ordinary rays.

Figure 38:
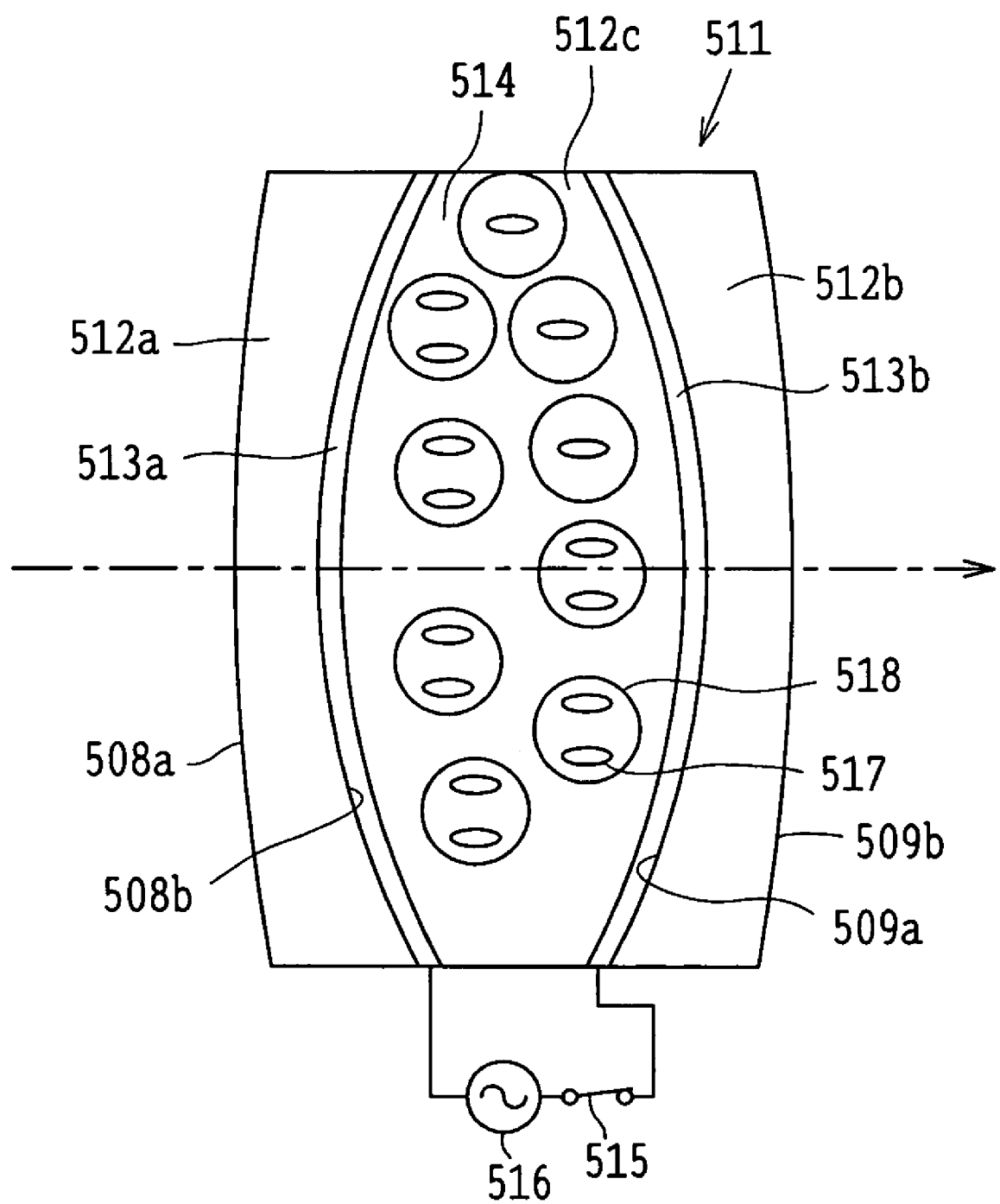
FIG. 38 is a view showing a state where an electric field is applied to a macro-molecular dispersed liquid crystal layer in FIG. 36.

Here, in the case where the switch 515, as shown in FIG. 36 is turned off, that is, the electric field is not applied to the liquid crystal layer 514, the liquid crystal molecules 517 are oriented in various directions, and thus the refractive index of the liquid crystal layer 514 relative to incident light becomes high to provide a lens with strong refracting power. In contrast to this, when the switch 515, as shown in FIG. 38, is turned on and the alternating-current voltage is applied to the liquid crystal layer 514, the liquid crystal molecules 517 are oriented so that the major axis of the index ellipsoid of each liquid crystal molecule 517 is parallel with the optical axis of the variable focal-length lens 511, and hence the refractive index becomes lower to provide a lens with weaker refracting power.

Figure 39:
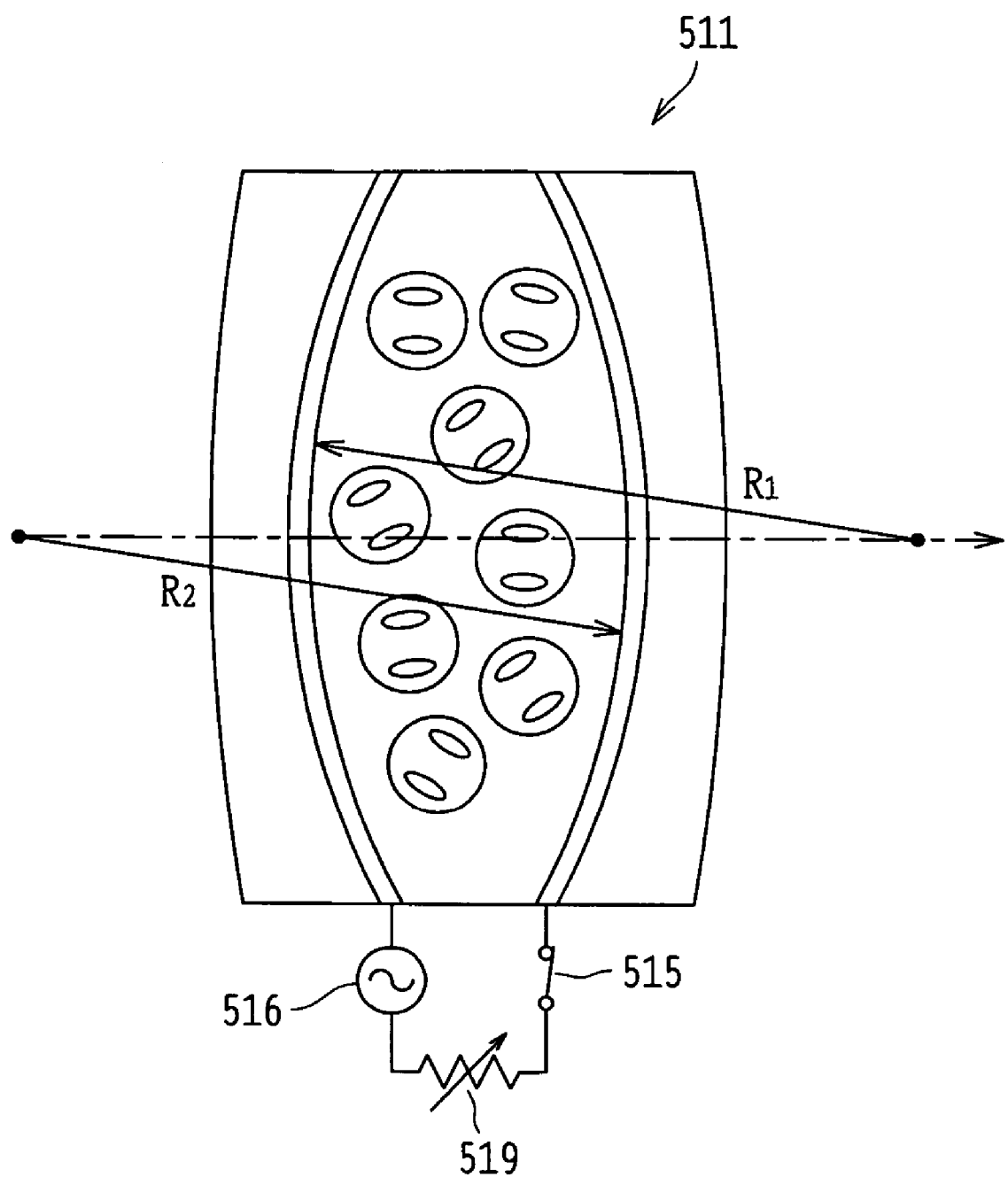
FIG. 39 is a view showing an example where a voltage applied to the macro-molecular dispersed liquid crystal layer in FIG. 36 can be changed.

The voltage applied to the macromolecular dispersed liquid crystal layer 514, for example, as shown in FIG. 39, can be changed stepwise or continuously by the use of a variable resistor 519. By doing so, as the applied voltage becomes high, the liquid crystal molecules 517 are oriented so that the major axis of the index ellipsoid of each liquid crystal molecule 517 becomes progressively parallel with the optical axis of the variable focal-length lens 511, and thus the refractive index can be changed stepwise or continuously.

Here, in the case of FIG. 36, that is, in the case where the voltage is not applied to the macromolecular dispersed liquid crystal layer 514, when the refractive index in the direction of the major axis of the index ellipsoid, as shown in FIG. 37, is denoted by $n_z$, an average refractive index $n_{LC}'$ of the liquid crystal molecules 517 is roughly given by $$(n_{ox} + n_{oy} + n_z)/3 = n_{LC}' \tag{15}$$

Also, when the refractive index $n_z$ is expressed as a refractive index $n_e$ of an extraordinary ray, an average refractive index $n_{LC}$ of the liquid crystal molecules 517 where Equation (14) is established is given by $$(2n_o + n_e)/3 = n_{LC} \tag{16}$$

In this case, when the refractive index of each of the macromolecules constituting the macromolecular cells 518 is represented by $n_p$, and the ratio of volume between the liquid crystal layer 514 and the liquid crystal molecules 517 is represented by ff, a refractive index $n_A$ of the liquid crystal layer 514 is given from the Maxwell-Garnet's law as $$n_A = ff \cdot n_{LC}' + (1-ff)n_p \tag{17}$$

Thus, as shown in FIG. 39, when the radii of curvature of the inner surfaces of the lenses 512*a* and 512*b*, that is, the surfaces on the side of the liquid crystal layer 514, are represented by $R_1$ and $R_2$, a focal length $f_1$ of the third lens 512*c* constructed with the liquid crystal layer 514 is given by $$1/f_1 = (n_A - 1)(1/R_1 - 1/R_2) \tag{18}$$

Also, when the center of curvature is located on the image side, it is assumed that each of the radii of curvature $R_1$ and $R_2$ is positive. Refraction caused by the outer surface of each of the lenses 512*a* and 512*b* is omitted. That is, the focal length of the lens 512*c* constructed with only the liquid crystal layer 514 is given by Equation (18).

When the average refractive index of ordinary rays is expressed as $$(n_{ox} + n_{oy})/2 = n_o' \tag{19}$$

a refractive index $n_B$ of the liquid crystal layer 514 in the case of FIG. 38, namely, in the case where the voltage is applied to the liquid crystal layer 514, is given by $$n_B = ff \cdot n_o' + (1-ff)n_p \tag{20}$$

and thus a focal length $f_2$ of the lens 512*c* constructed with only the liquid crystal layer 514 in this case is given by $$1/f_2 = (n_B - 1)(1/R_1 - 1/R_2) \tag{21}$$

Also, the focal length where a lower voltage than in FIG. 38 is applied to the liquid crystal layer 514 takes a value between the focal length $f_1$ given by Equation (18) and the focal length $f_2$ by Equation (21).

From Equations (18) and (21), a change rate of the focal length of the lens constructed with the liquid crystal layer 514 is given by $$|(f_2 - f_1)/f_2| = |(n_B - n_A)/(n_A - 1)| \tag{22}$$

Thus, in order to increase the change rate, it is only necessary to increase the value of $|n_B - n_A|$. Here, $$n_B - n_A = ff(n_o' - n_{LC}') \tag{23}$$

and hence if the value of $|n_o' - n_{LC}'|$ is increased, the change rate can be raised. Practically, since the refractive index $n_B$ of the liquid crystal layer 514 is about 1.3-2, the value of $|n_o' - n_{LC}'|$ is chosen so as to satisfy the following condition:

$$0.01 \leq |n_o' - n_{LC}'| \leq 10 \tag{24}$$

In this way, when ff=0.5, the focal length of the lens constructed with the liquid crystal layer 514 can be changed by at least 0.5%, and thus an effective variable focal-length lens can be obtained. Also, the value of $|n_o' - n_{LC}'|$ cannot exceed 10 because of restrictions on liquid crystal substances.

Subsequently, a description will be given of grounds for the upper limit of Condition (13). The variation of a transmittance τ where the size of each cell of a macromolecular dispersed liquid crystal is changed is described in "Transmission variation using scattering/transparent switching films" on pages 197-214 of "Solar Energy Materials and Solar Cells", Wilson and Eck, Vol. 31, Eleesvier Science Publishers B. v., 1993. In FIG. 6 on page 206 of this publication, it is shown that when the radius of each cell of the macromolecular dispersed liquid crystal is denoted by r, t=300 μm, ff=0.5, $n_p$=1.45, $n_{LC}$=1.585, and λ=500 nm, the theoretical value of the transmittance τ is about 90% if r=5 nm (D=λ/50 and D·t=λ·6 μm, where D and λ are expressed in nanometers), and is about 50% if r=25 nm (D=λ/10).

Here, it is assumed that t=150 μm and the transmittance τ varies as the exponential function of the thickness t. The transmittance τ in the case of t=150 μm is nearly 71% when r=25 nm (D=λ/10 and D·t=λ·15 μm). Similarly, in the case of t=75 μm, the transmittance τ is nearly 80% when r=25 nm (D=λ/10 and D·t=λ·7.5 μm).

From these results, the transmittance τ becomes at least 70-80% and the liquid crystal can be actually used as a lens, if the liquid crystal satisfies the following condition:

$$D \cdot t \leq \lambda \cdot 15 \, \mu m \tag{25}$$

Hence, for example, in the case of t=75 μm, if D≤λ/5, a satisfactory transmittance can be obtained.

The transmittance of the macromolecular dispersed liquid crystal layer 514 is raised as the value of the refractive index $n_p$ approaches the value of the refractive index $n_{LC}'$. On the other hand, if the values of the refractive indices $n_o'$ and $n_p$ are different from each other, the transmittance of the liquid crystal layer 514 will be degraded. In FIGS. 36 and 38, the transmittance of the liquid crystal layer 514 is improved on an average when the liquid crystal layer 514 satisfies the following equation:

$$n_p = (n_o' + n_{LC}')/2 \tag{26}$$

The variable focal-length lens 511 is used as a lens, and thus in both FIGS. 36 and 38, it is desirable that the transmittances are almost the same and high. For this, although there are limits to the substances of the macromolecules and the liquid crystal molecules 517 constituting the macromolecular cells 518, it is only necessary, in practical use, to satisfy the following condition:

$$n_o' \leq n_p \leq n_{LC}' \tag{27}$$

When Equation (26) is satisfied, Condition (25) is moderated and it is only necessary to satisfy the following condition:

$$D \cdot t \leq \lambda \cdot 60 \, \mu m \tag{28}$$

It is for this reason that, according to the Fresnel's law of reflection, the reflectance is proportional to the square of the difference of the refractive index, and thus the reflection of light at the interfaces between the macromolecules and the liquid crystal molecules 517 constituting the macromolecular cells 518, that is, a reduction in the transmittance of the liquid crystal layer 514, is roughly proportional to the square of the difference in refractive index between the macromolecules and the liquid crystal molecules 517.

In the above description, reference has been made to the case where $n_o' \approx 1.45$ and $n_{LC}' \approx 1.585$, but in a more general formulation, it is only necessary to satisfy the following condition:

$$D \cdot t \leq \lambda \cdot 15 \, \mu m \cdot (1.585 - 1.45)^2 / (n_u - n_p)^2 \tag{29}$$

where $(n_u-n_p)^2$ is a value when one of $(n_{LC}{}'-n_p)^2$ and $(n_e{}'-n_p)^2$ is larger than the other.

In order to largely change the focal length of the variable focal-length lens 511, it is favorable that the ratio ff is as high as possible, but in the case of ff=1, the volume of the macromolecule becomes zero and the macromolecular cells 518 cease to be formable. Thus, it is necessary to satisfy the following condition:

$$0.1 \leq \text{ff} \leq 0.999 \qquad (30)$$

On the other hand, the transmittance τ improves as the ratio ff becomes low, and hence Condition (29) may be moderated, preferably, as follows:

$$4\times10^{-6}[\mu m]^2 \leq D\cdot t \leq \lambda\cdot 45\ \mu m\cdot(1.585-1.45)^2/(n_u-n_p)^2 \qquad (31)$$

Also, the lower limit of the thickness t, as is obvious from FIG. 36, corresponds to the diameter D, which is at least 2 nm as described above, and therefore the lower limit of D·t becomes $(2\times10^{-3}\ \mu m)^2$, namely $4\times10^{-6}[\mu m]^2$.

An approximation where the optical property of substance is represented by the refractive index is established when the diameter D is 5-10 nm or larger, as set forth in "Iwanami Science Library 8, Asteroids are coming", T. Mukai, Iwanami Shoten, p. 58, 1994. If the value of the diameter D exceeds 500 λ, the scattering of light will be changed geometrically, and the scattering of light at the interfaces between the macromolecules and the liquid crystal molecules 517 constituting the macromolecular cells 518 is increased in accordance with the Fresnel's equation of reflection. As such, in practical use, the diameter D must be chosen so as to satisfy the following condition:

$$7\ \text{nm} \leq D \leq 500\ \lambda \qquad (32)$$

Figure 40:
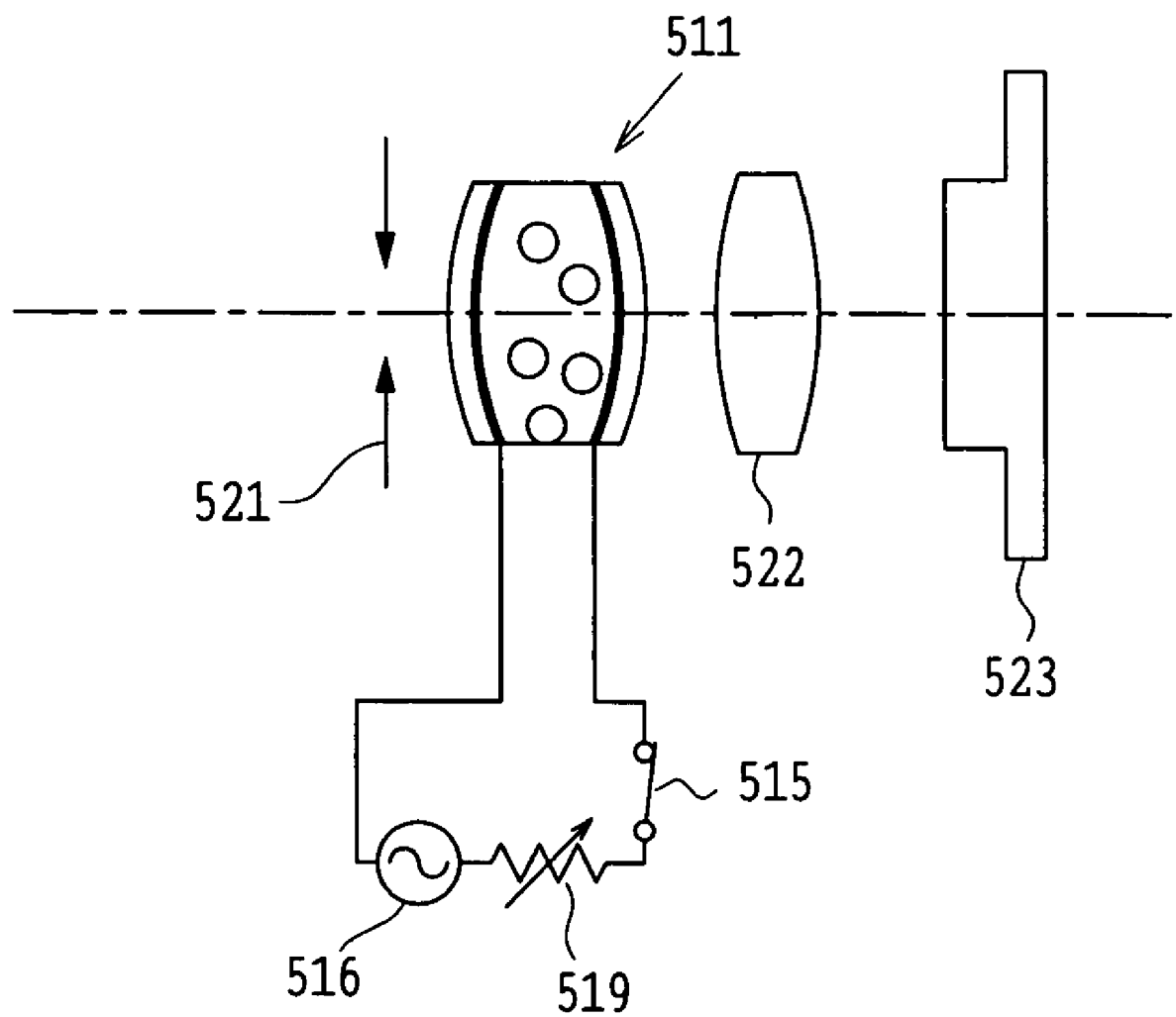
FIG. 40 is a view showing an example of an imaging optical system for digital cameras which uses the variable focal-length lens in the optical apparatus of the present invention.

FIG. 40 shows an imaging optical system using the variable focal-length lens 511 of FIG. 39 provided between an aperture stop 521 and the image sensor in the optical apparatus of the present invention, for example, an example where the variable focal-length lens 511 is used in an imaging optical system for digital cameras. In this imaging optical system, an image of an object (not shown) is formed on a solid-state image sensor 523, such as a CCD, through the stop 521, the variable focal-length lens 511, and a lens 522. Also, in FIG. 40, the liquid crystal molecules are not shown.

According to such an imaging optical system, the alternating-current voltage applied to the macromolecular dispersed liquid crystal layer 514 of the variable focal length lens 511 is controlled by the variable resistor 519 to change the focal length of the variable focal-length lens 511. Whereby, without moving the variable focal-length lens 511 and the lens 522 along the optical axis, it becomes possible to perform continuous focusing with respect to the object distance, for example, from the infinity to 600 mm.

Figure 41:
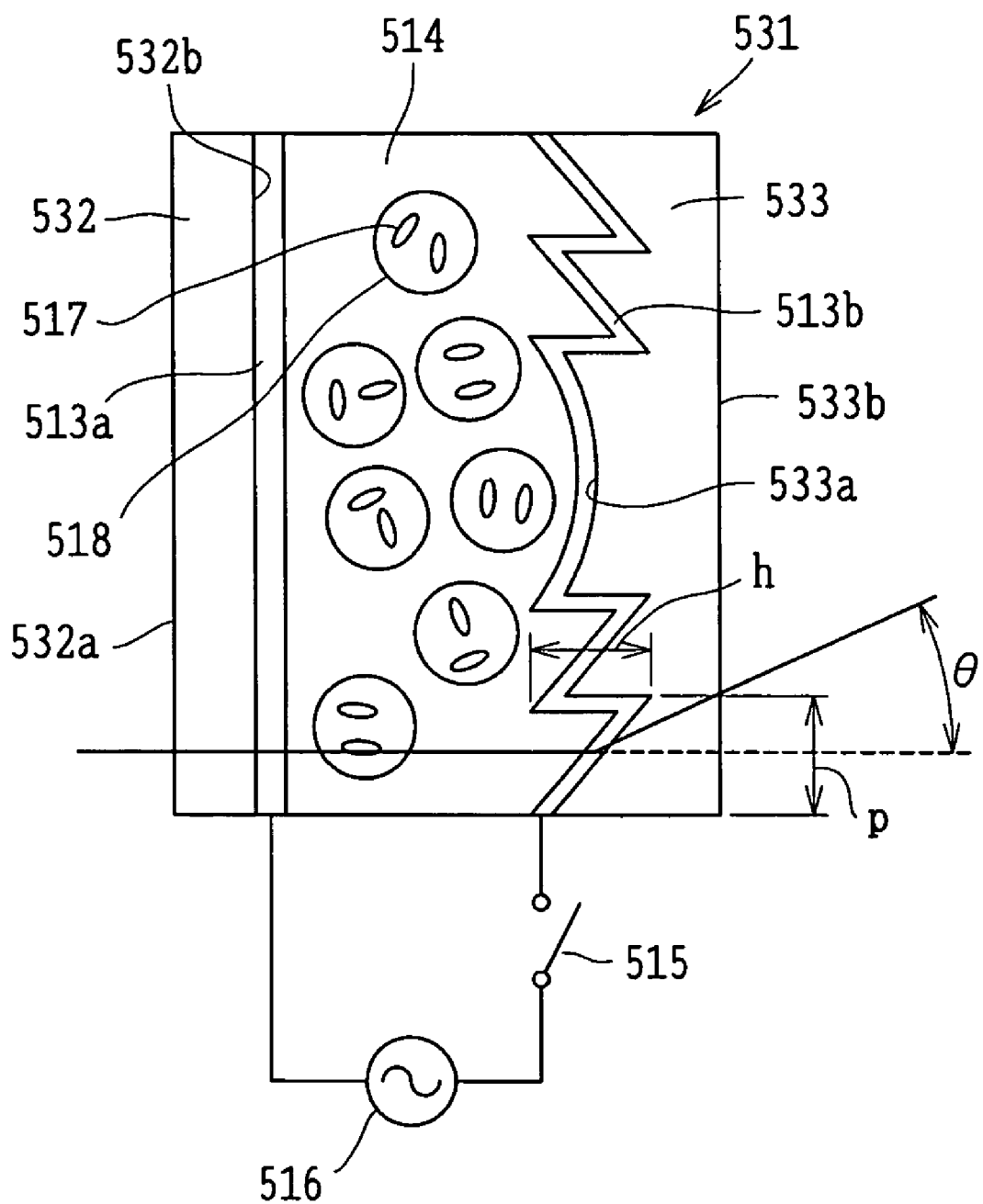
FIG. 41 is a view showing an example of a variable focal-length diffraction optical element applicable to the optical system of the optical apparatus of the present invention.

FIG. 41 shows one example of a variable focal-length diffraction optical element used so that the focal length of the imaging optical system can be changed, like the variable focal-length lens of FIG. 39, in the optical apparatus of the present invention. A variable focal-length diffraction optical element 531 of this example includes a first transparent substrate 532 having a first surface 532a and a second surface 532b which are parallel with each other and a second transparent substrate 533 having a third surface 533a which is constructed with an annular diffraction grating of saw-like cross section having the depth of a groove corresponding to the wavelength of light and a fourth surface 533b which is flat. Incident light emerges through the first and second transparent substrates 532 and 533. Between the first and second transparent substrates 532 and 533, as in FIG. 36, the macromolecular dispersed liquid crystal layer 514 is sandwiched through the transparent electrodes 513a and 513b so that the transparent electrodes 513a and 513b are connected to the alternating-current power supply 516 through the switch 515 and the alternating-current voltage is applied to the macromolecular dispersed liquid crystal layer 514.

In such a structure, when the grating pitch of the third surface 533a is represented by p and an integer is represented by m, a ray of light incident on the variable focal-length diffraction optical element 531 is deflected by an angle θ satisfying the following equation:

$$p \sin \theta = m\lambda \qquad (33)$$

and emerges therefrom. When the depth of the groove is denoted by h, the refractive index of the transparent substrate 533 is denoted by $n_{33}$, and an integer is denoted by k, a diffraction efficiency becomes 100% at the wavelength λ and the production of flare can be prevented by satisfying the following equations:

$$h(n_A-n_{33})=m\lambda \qquad (34)$$

$$h(n_B-n_{33})=k\lambda \qquad (35)$$

Here, the difference in both sides between Equations (34) and (35) is given by $$h(n_A-n_B)=(m-k)\lambda \qquad (36)$$

Therefore, when it is assumed that λ=500 nm, $n_A$=1.55, and $n_B$=1.5, $$0.05h=(m-k)\cdot 500\ \text{nm}$$

and when m=1 and k=0, $$h=10000\ \text{nm}=10\ \mu m$$

In this case, the refractive index $n_{33}$ of the transparent substrate 533 is obtained as 1.5 from Equation (34). When the grating pitch p on the periphery of the variable focal-length diffraction optical element 531 is assumed to be 10 μm, θ≈2.87° and a lens with an F-number of 10 can be obtained.

The variable focal-length diffraction optical element 531, whose optical path length is changed by the on-off operation of the voltage applied to the liquid crystal layer 514, for example, can be used for focus adjustment in such a way that it is placed at a portion where the light beam of a lens system is not parallel, or can be used to change the focal length of the entire lens system.

In this example, it is only necessary that Equations (34)-(36) are set in practical use to satisfy the following conditions:

$$0.7m\lambda \leq h(n_A-n_{33}) \leq 1.4m\lambda \qquad (37)$$

$$0.7k\lambda \leq h(n_A-n_{33}) \leq 1.4k\lambda \qquad (38)$$

$$0.7(m-k)\lambda \leq h(n_A-n_B) \leq 1.4(m-k)\lambda \qquad (39)$$

Figure 42:
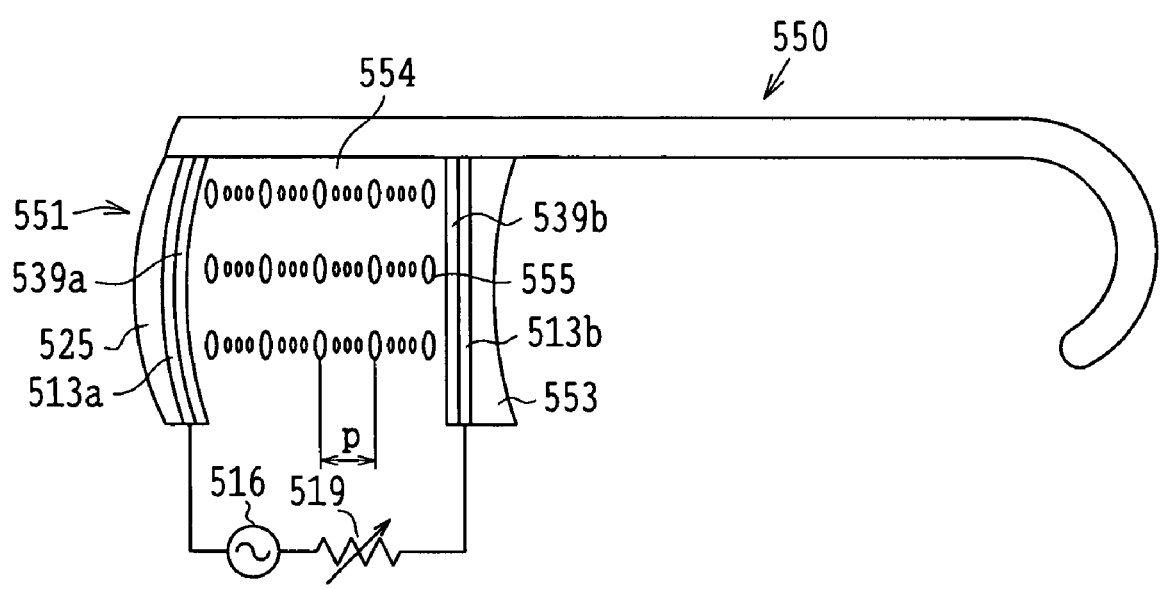
FIG. 42 is a view showing variable focal-length spectacles, each having a variable focal-length lens which uses a twisted nematic liquid crystal.
Figure 43:
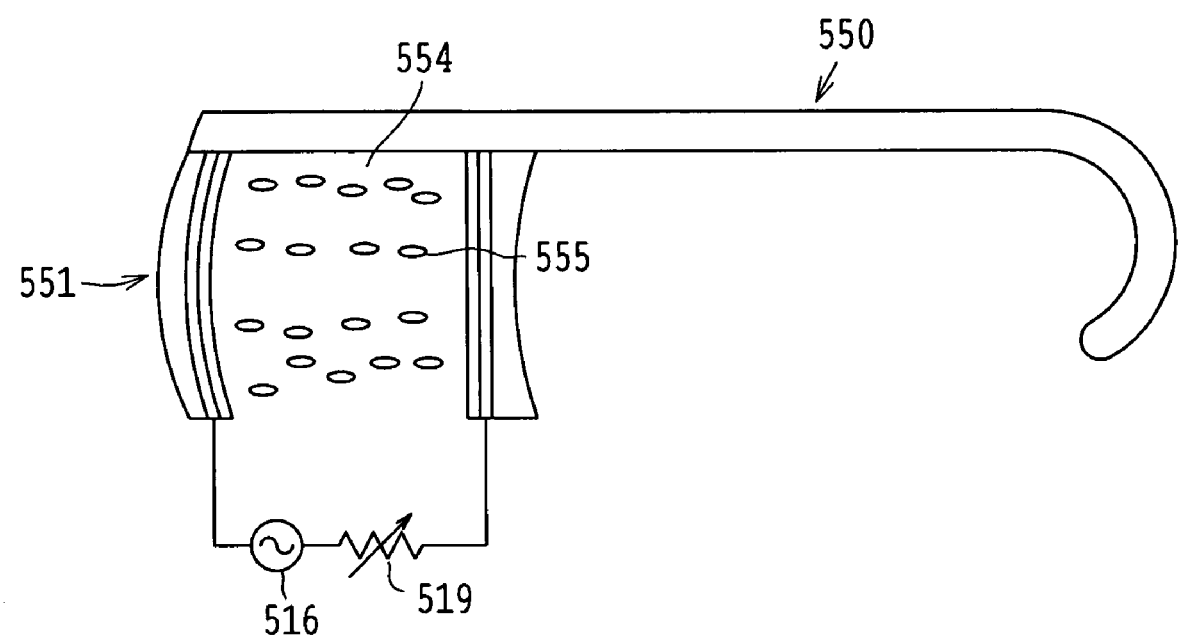
FIG. 43 is a view showing the orientation of liquid crystal molecules where a voltage applied to a twisted nematic liquid crystal layer of FIG. 42 is increased.

A variable focal-length lens using a twisted nematic liquid crystal also falls into the category of the present invention. FIGS. 42 and 43 show variable focal-length spectacles 550 in this case. A variable focal-length lens 551 has lenses 552 and 553, orientation films 539a and 539b provided through the transparent electrodes 513a and 513b, respectively, inside these lenses, and a twisted nematic liquid crystal layer 554 sandwiched between the orientation films. The transparent electrodes 513a and 513b are connected to the alternating-current power supply 516 through the variable resistor 519 so that the alternating-current voltage is applied to the twisted nematic liquid crystal layer 554.

In this structure, when the voltage applied to the twisted nematic liquid crystal layer 554 is increased, liquid crystal molecules 555, as illustrated in FIG. 43, exhibit a homeotropic orientation, in which the refractive index of the liquid crystal layer 554 is lower and the focal length is longer than in a twisted nematic state of FIG. 42 in which the applied voltage is low.

A spiral pitch P of the liquid crystal molecules 555 in the twisted nematic state of FIG. 42 must be made nearly equal to, or much smaller than, the wavelength λ of light, and thus is set to satisfy the following condition:

$$2 \text{ nm} \leq P \leq 2\lambda/3 \quad (40)$$

Also, the lower limit of this condition depends on the sizes of the liquid crystal molecules 555, while the upper limit is a value necessary for the behavior of the liquid crystal layer 554 as an isotropic medium in a state of FIG. 42 when incident light is natural light. If the upper limit of the condition is overstepped, the variable focal-length lens 551 is changed to a lens in which the focal length varies with the direction of deflection. Hence, a double image is formed and only a blurred image is obtained.

Figure 44A:
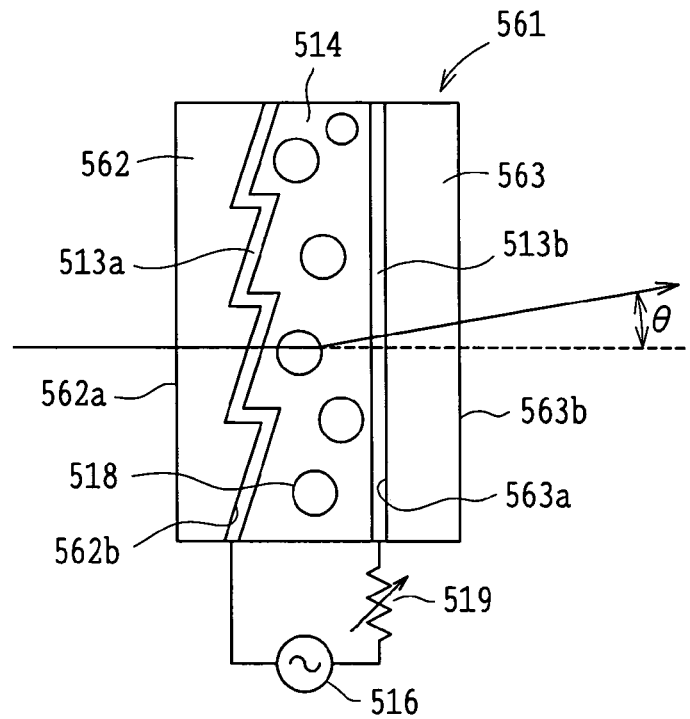
FIGS. 44A and 44B are views showing two examples of variable deflection-angle prisms applicable to the optical system of the optical apparatus of the present invention.
Figure 44B:
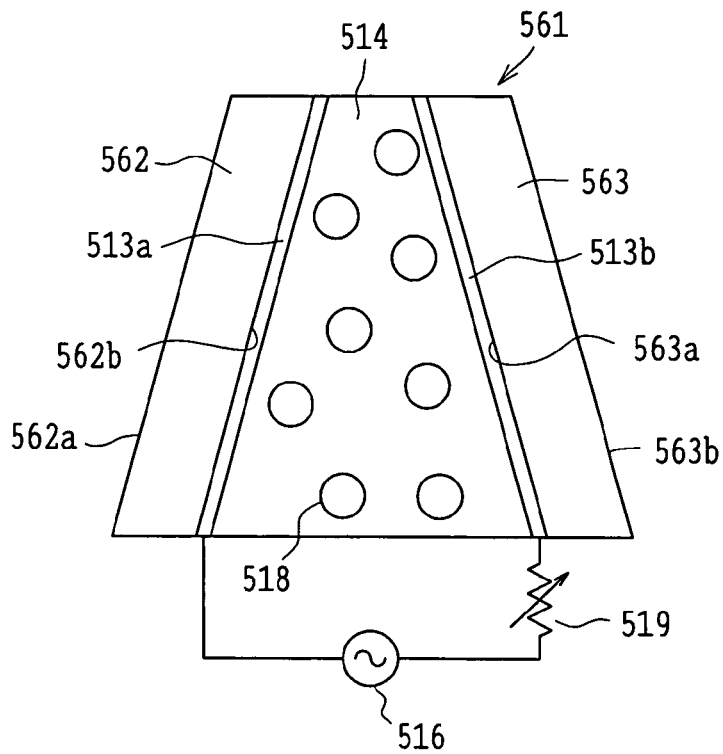

FIG. 44A shows an example of a variable deflection-angle prism applicable to the optical system used in the optical apparatus of the present invention. A variable deflection-angle prism 561 includes a first transparent substrate 562 on the entrance side, having a first surface 562a and a second surface 562b; and a second transparent substrate 563 like a plane-parallel plate on the exit side, having a third surface 563a and a fourth surface 563b. The inner surface (the second surface) 562b of the transparent substrate 562 on the entrance side is configured into a Fresnel form, and the macromolecular dispersed liquid crystal layer 514, as in FIG. 36, is sandwiched between this transparent substrate 562 and the transparent substrate 563 on the exit side through the transparent electrodes 513a and 513b. The transparent electrodes 513a and 513b are connected to the alternating-current power supply 516 through the variable resistor 519. Whereby, the alternating-current voltage is applied to the liquid crystal layer 514 so that a deflection angle θ of light transmitted through the variable deflection-angle prism 561 is controlled. Also, in FIG. 44A, the inner surface 562b of the transparent substrate 562 is configured into the Fresnel form, but as shown in FIG. 44B, the inner surfaces of the transparent substrates 562 and 563 may be configured like an ordinary prism whose surfaces are relatively inclined, or may be configured like the diffraction grating shown in FIG. 41. In the case of the latter, Equations (33)-(36) and Conditions (37)-(39) apply equally.

Figure 45:
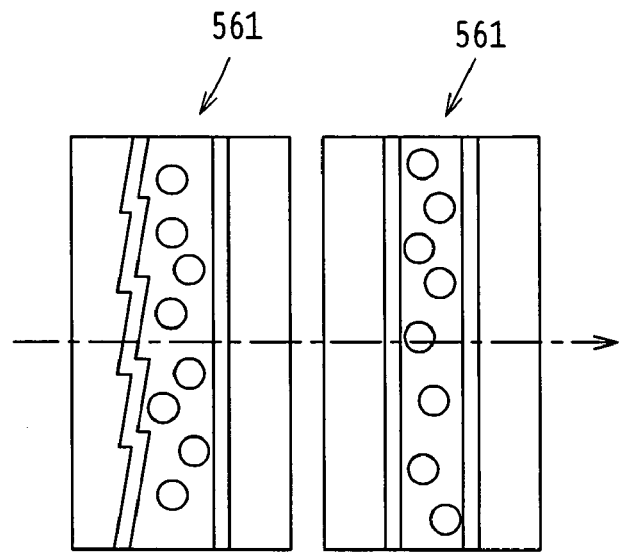
FIG. 45 is a view for explaining the applications of the variable deflection-angle prisms shown in FIGS. 44A and 44B.

The variable deflection-angle prism 561 constructed mentioned above is used in each of the optical systems, for example, of TV cameras, digital cameras, film cameras, or binoculars, and thereby can be effectively used for shake prevention. In this case, it is desirable that the direction of refraction (deflection) of the variable deflection-angle prism 561 is vertical. In order to further improve its performance, it is desirable that two variable deflection-angle prisms 561 are arranged so that the directions of deflection of the prisms 561 are varied and as shown in FIG. 45, the refraction angles are changed in vertical and lateral directions. Also, in FIGS. 44A, 44B, and 45, the liquid crystal molecules are omitted.

Figure 46:
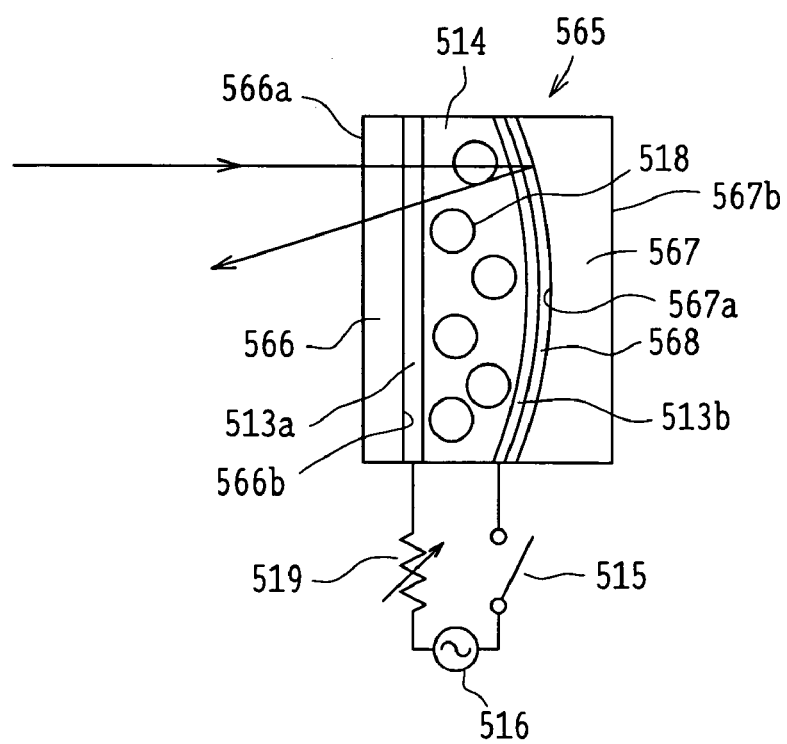
FIG. 46 is a view schematically showing an example of a variable focal-length mirror which functions as the variable focal-length lens applicable to the optical system of the optical apparatus of the present invention.

FIG. 46 shows an example of a variable focal-length mirror used instead of the variable mirror, that is, configured by providing a reflecting film on one surface of the variable focal-length lens, in the optical system of the optical apparatus according to the present invention.

A variable focal-length mirror 565 of this example includes a first transparent substrate 566 having a first surface 566a and a second surface 566b, and a second transparent substrate 567 having a third surface 567a and a fourth surface 567b. The first transparent substrate 566 is configured into a flat plate or lens shape to provide the transparent electrode 513a on the inner surface (the second surface) 566b. The second transparent substrate 567 is such that the inner surface (the third surface) 567a is configured as a concave surface, on which a reflecting film 568 is deposited, and the transparent electrode 513b is provided on the reflecting film 568. Between the transparent electrodes 513a and 513b, as in FIG. 36, the macromolecular dispersed liquid crystal layer 514 is sandwiched so that the transparent electrodes 513a and 513b are connected to the alternating-current power supply 516 through the switch 515 and the variable resistor 519, and the alternating-current voltage is applied to the macromolecular dispersed liquid crystal layer 514. Also, in FIG. 46, the liquid crystal molecules are omitted.

According to the above structure, since a ray of light incident from the side of the transparent substrate 566 is passed again through the liquid crystal layer 514 by the reflecting film (reflecting surface) 568, the function of the liquid crystal layer 514 can be exercised twice, and the focal position of reflected light can be shifted by changing the voltage applied to the liquid crystal layer 514. In this case, the ray of light incident on the variable focal-length mirror 565 is transmitted twice through the liquid crystal layer 514, and therefore when a thickness twice that of the liquid crystal layer 514 is represented by t, the conditions mentioned above can be used. Moreover, the inner surface of the transparent substrate 566 or 567, as shown in FIG. 41, can also be configured into a diffraction grating shape to reduce the thickness of the liquid crystal layer 514. This offers the advantage that the amount of scattered light can be decreased.

In the above description, in order to prevent the deterioration of the liquid crystal, the alternating-current power supply 516 is used as a voltage source to apply the alternating-current voltage to the liquid crystal layer. However, a direct-current power supply is used and thereby a direct-current voltage can also be applied to the liquid crystal. Techniques of shifting the orientation of the liquid crystal molecules, in addition to changing the voltage, can be achieved by changing the frequency of the electric field applied to the liquid crystal, the strength and frequency of the magnetic field applied to the liquid crystal, and the temperature of the liquid crystal. In the above description, some of macromolecular dispersed liquid crystals are close to solids, rather than liquids. In this case, therefore, one of the lenses 512a and 512b, the transparent substrates 532 and 533, one of the lenses 552 and 553, the transparent substrate 563 in FIG. 44A, one of the transparent substrates 562 and 563 in FIG. 44B, or one of the transparent substrates 566 and 567, may be eliminated.

The optical element of the type that the focal length of the optical element is changed by altering the refracting index of a medium, such as that described in FIGS. 36-46, has the merits that since the shape is not changed, a mechanical design is easy and a mechanical structure becomes simple.

Figure 47:
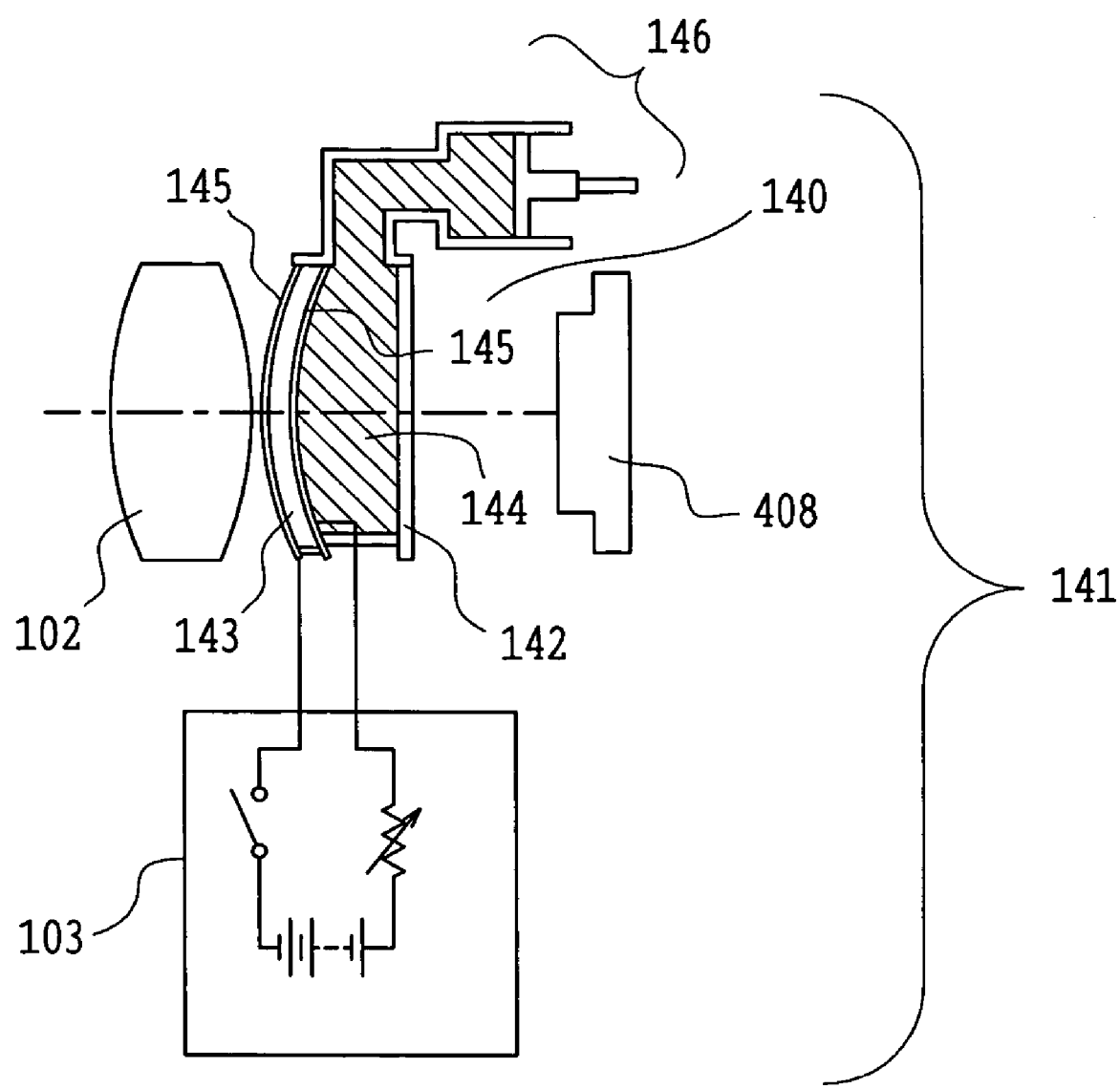
FIG. 47 is a view schematically showing an imaging optical system where another example of the variable focal-length lens is used in the optical system of the optical apparatus of the present invention.

FIG. 47 shows an example of an imaging optical system using a variable focal-length lens 140 ahead of the image sensor 408 in the optical apparatus of the present invention. The imaging optical system can be used as an imaging unit 141. In this example, a lens 102 and the variable focal-length lens 140 constitute an imaging lens system. This imaging lens system and the image sensor 408 constitute the imaging unit 141. The variable focal-length lens 140 is constructed with a transparent member 142; a soft transparent substance 143, such as piezoelectric synthetic resin, enclosed between a pair of transparent electrodes 145; and a light-transmitting fluid or a jelly-like substance 144 sandwiched between the transparent member 142 and the transparent electrode 145. As the fluid or the jelly-like substance 144, silicon oil, elastic rubber, jelly, or water can be used. The transparent electrodes 145 are provided on both sides of the transparent substance 143, and when voltages are applied through a circuit 103 to the transparent electrodes 145, the transparent substance 143 is deformed by the piezoelectric effect of the transparent substance 143 so that the focal length of the variable focal-length lens 140 is changed. Thus, according to the example, even when the object distance is changed, focusing can be performed without moving the imaging optical system with a motor, and as such the example excels in compact and lightweight design and low power consumption.

Again, in FIG. 47, reference numerals 145 denotes transparent electrodes and numeral 146 denotes a cylinder for storing a fluid. For the transparent substance 143, high-polymer piezoelectrics such as polyurethane, silicon rubber, acrylic elastomer, PZT, PLZT, and PVDF; vinylidene cyanide copolymer; or copolymer of vinylidene fluoride and trifluoroethylene is used.

The use of an organic substance, synthetic resin, or elastomer, having a piezoelectric property, is favorable because a considerable deformation of the surface of the variable focal-length lens 140 is brought about. It is good practice to use a transparent piezoelectric substance for the variable focal-length lens 140.

Figure 48:
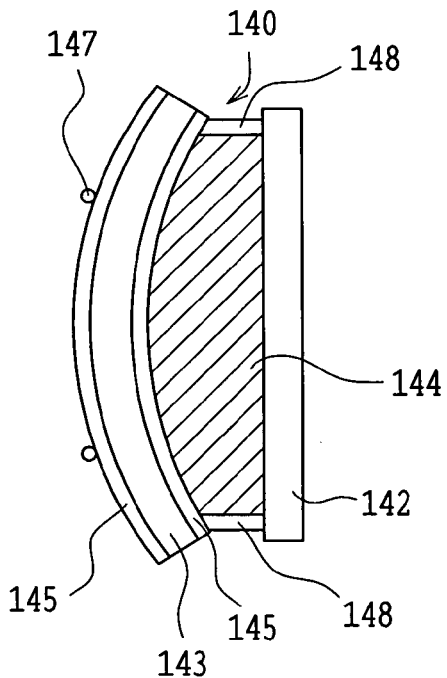
FIG. 48 is an explanatory view showing a modified example of the variable focal-length lens of FIG. 47.

In FIG. 47, instead of using the cylinder 146, the variable focal-length lens 140, as shown in FIG. 48, may be designed so that annular supporting members 147 are provided at the position parallel with the transparent member 142 and a distance between the transparent member 142 and the supporting members 147 is maintained.

Figure 49:
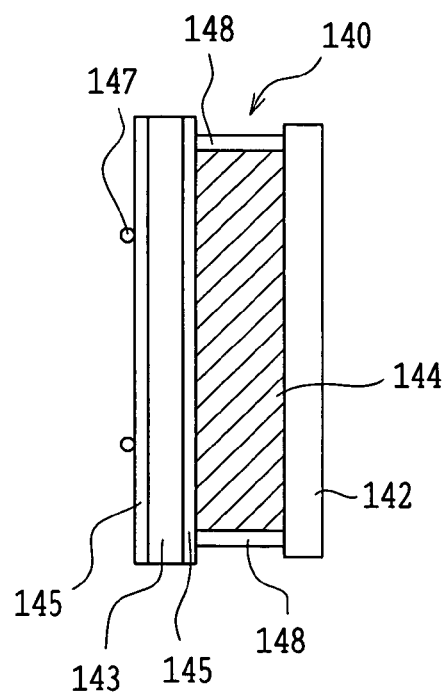
FIG. 49 is an explanatory view showing a state where the variable focal-length lens of FIG. 48 is deformed.

In FIG. 48, the transparent substance 143 enclosed between the pair of electrodes 143 and the fluid or the jelly-like substance 144 covered with a periphery-deformable member 148 are interposed between the supporting members 147 and the transparent member 142. Even when the voltage is applied to the transparent substance 143 and thereby the transparent substance 143 is deformed, as shown in FIG. 49, the deformable member 148 is deformed so that the entire volume of the variable focal-length lens 140 is not changed. As such, the cylinder 146 becomes unnecessary. Also, in FIGS. 48 and 49, the deformable member 148 is made with an elastic body, accordion-shaped synthetic resin, or metal.

In each of the examples shown in FIGS. 47 and 48, when a reverse voltage is applied, the transparent substance 143 is deformed in a reverse direction, and thus it is also possible to construct a concave lens.

Where an electrostrictive substance, for example, acrylic elastomer or silicon rubber, is used for the transparent substance 143, it is desirable that the transparent substance 143 is constructed so that the transparent substrate and the electrostrictive substance are cemented to each other.

Figure 50:
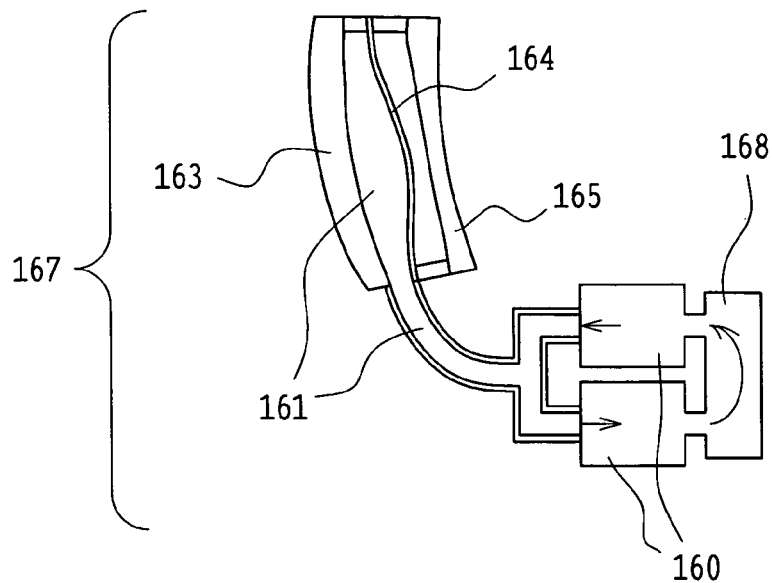
FIG. 50 is a view schematically showing another example of the variable focal-length lens, applicable to the optical system of the optical apparatus of the present invention, in which a fluid is taken in and out by the micropump to deform a lens surface.

FIG. 50 shows a variable focal-length lens 167 in which the fluid 161 is taken in and out by micropumps 160 to deform the lens surface, in another example of the variable focal-length lens applicable to the imaging optical system of the optical apparatus according to the present invention.

Each of the micropumps 160 is a small-sized pump, for example, made by a micromachining technique and is constructed so that it is operated with an electric power. The fluid 161 is sandwiched between a transparent substrate 163 and a transparent elastic body 164. The elastic body 164 constitutes a lens surface deformed by the fluid 161. In FIG. 50, reference numeral 165 represents a transparent substrate for protecting the elastic body 164, but this substrate is not necessarily required. As examples of pumps made by the micromachining technique, there are those which use thermal deformations, piezoelectric substances, and electrostatic forces. It is also possible to use two micropumps, each of which is the micropump 180 shown in FIG. 35, for example, as in the micropumps 160 used in the variable focal-length lens 167 of FIG. 50.

In the variable focal-length lens which uses the electrostatic force or the piezoelectric effect, a high voltage is sometimes required for drive. In this case, it is desirable that the boosting transformer or the piezoelectric transformer is used to constitute the control system. In this case, when a laminated piezoelectric transformer is used, a compact design can be achieved.

Figure 51:
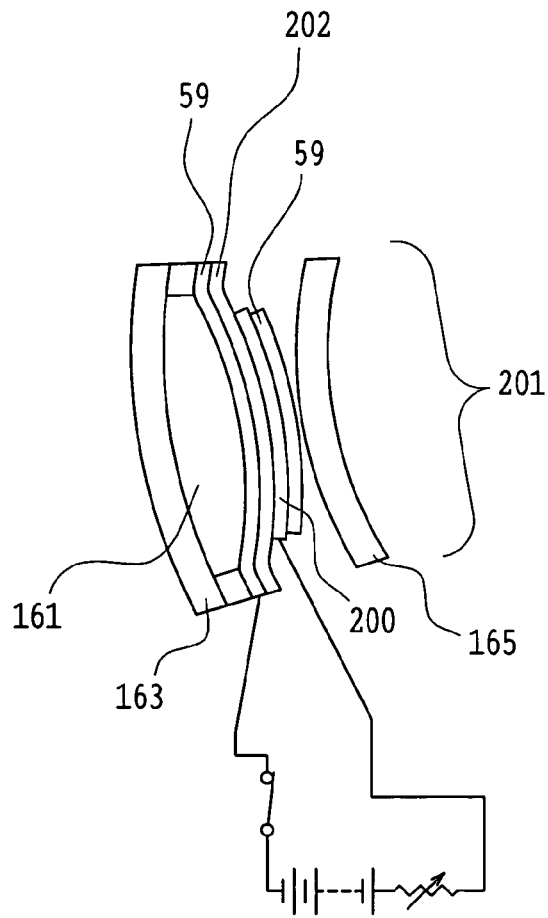
FIG. 51 is a view schematically showing another example of the variable optical-property element, applicable to the optical system of the optical apparatus of the present invention, which is the variable focal-length lens using a piezoelectric substance.

FIG. 51 shows a variable focal-length lens 201 using a piezoelectric substance 200, in another example of a variable optical-property element applicable to the optical system of the optical apparatus according to the present invention. The same substance as the transparent substance 143 is used for the piezoelectric substance 200, which is provided on a soft transparent substrate 202. It is desirable that synthetic resin or an organic substance is used for the substrate 202.

In the example, the voltage is applied to the piezoelectric substance 200 through two transparent electrodes 59, and thereby the piezoelectric substance 200 is deformed so that the function of a convex lens is exercised in FIG. 51.

Figure 52:
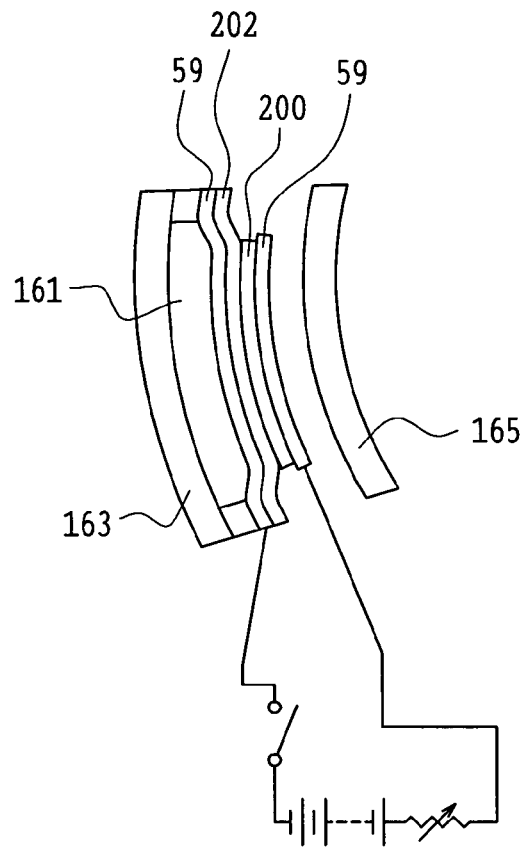
FIG. 52 is an explanatory view showing a state where the variable focal-length lens of FIG. 51 is deformed.

The substrate 202 is previously configured into a convex form, and at least one of the two transparent electrodes 59 is caused to differ in size from the substrate 202, for example, one of the electrodes 59 is made smaller than the substrate 202. In doing so, when the applied voltage is removed, the opposite preset portions of the two transparent electrodes 59, as shown in FIG. 52, are deformed into concave shapes so as to have the function of a concave lens, acting as the variable focal-length lens.

In this case, since the substrate 202 is deformed so that the volume of the fluid 161 is not changed, there is the merit that the liquid tank 168 becomes unnecessary.

This example has a great merit that a part of the substrate 202 holding the fluid 161 is deformed by the piezoelectric substance and the liquid tank 168 is dispensed with.

The transparent substrates 163 and 165 may be constructed as lenses or plane surfaces, although the same may be said of the example of FIG. 50.

Figure 53:
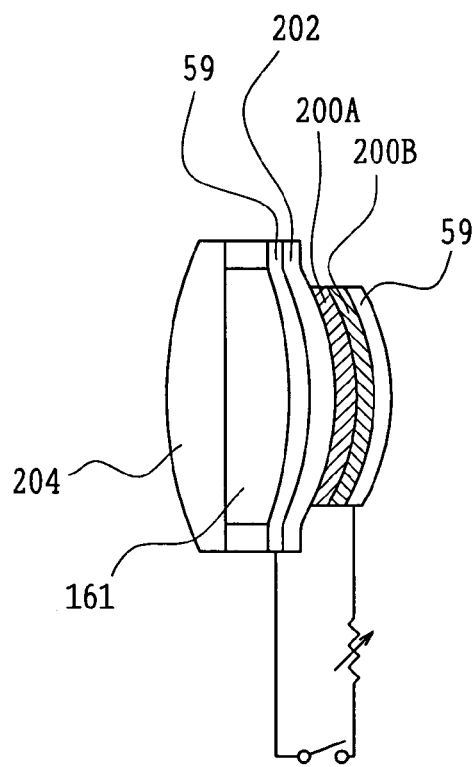
FIG. 53 is a view schematically showing still another example of the variable optical-property element, applicable to the optical system of the optical apparatus of the present invention, which is the variable focal-length lens using two thin plates constructed of piezoelectric substances.

FIG. 53 shows a variable focal-length lens using two thin plates 200A and 200B constructed of piezoelectric substances, in still another example of the variable optical-property element applicable to the optical system of the optical apparatus according to the present invention. According to this example, the variable focal-length lens has the merit that the thin plate 200A and the thin plate 200B, reversed in direction of the piezoelectric substance, are used and thereby the amount of deformation is increased so that a wide variable focal-length range can be obtained. Also, in FIG. 53, reference numeral 204 denotes a lens-shaped transparent substrate and 161 denotes a fluid. Even in the example, the transparent electrode 59 on the right side of the figure is configured to be smaller than the substrate 202.

In the examples of FIGS. 51-53, the thicknesses of the substrate 202, the piezoelectric substance 200, and the thin plates 200A and 200B may be rendered uneven so that a state of deformation caused by the application of the voltage is controlled. This is convenient because lens aberration can be corrected.

Figure 54:
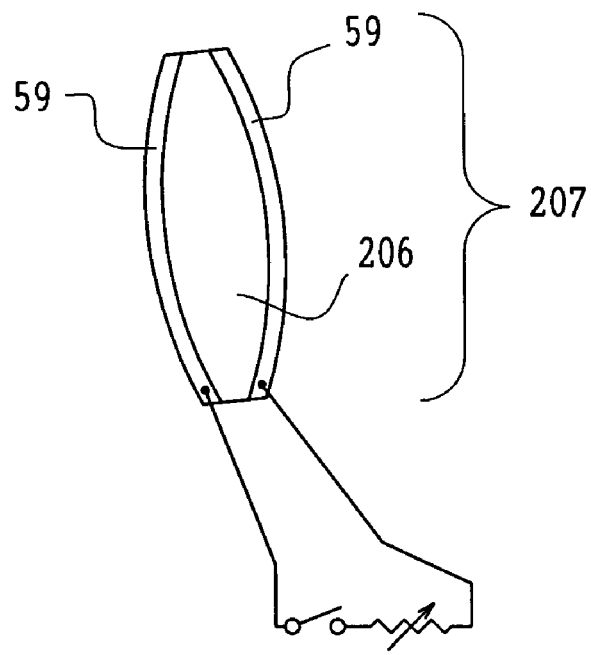
FIG. 54 is a view schematically showing still another example of the variable focal-length lens applicable to the optical system of the optical apparatus of the present invention.

FIG. 54 shows another example of the variable focal-length lens applicable to the optical system of the optical apparatus according to the present invention. A variable focal-length lens 207 of this example is constructed of an electrostrictive substance 206 such as silicon rubber or acrylic elastomer.

Figure 55:
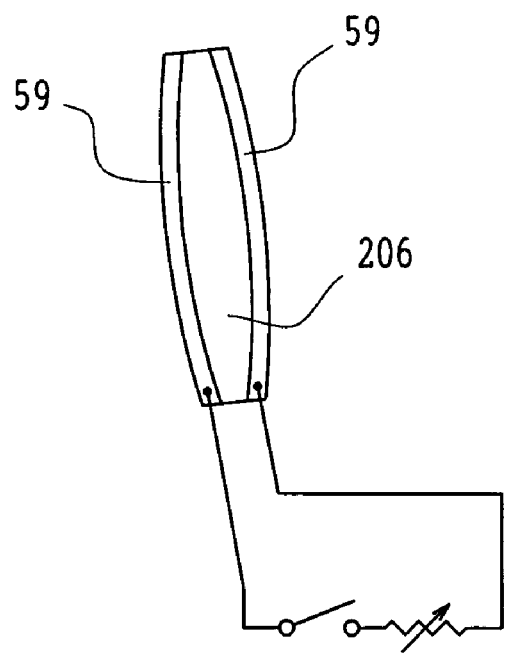
FIG. 55 is an explanatory view showing the deformation of the variable focal-length lens of FIG. 54.

When the voltage is low, the variable focal-length lens 207 constructed as mentioned above, as depicted in FIG. 54, acts as a convex lens, while when the voltage is increased, the electrostrictive substance 206, as depicted in FIG. 55, expands in a vertical direction and contracts in a lateral direction, and thus the focal length is increased. In this way, the electrostrictive substance 206 operates as the variable focal-length lens. According to the variable focal-length lens of the example, there is the merit that since a large power supply is not required, power consumption is minimized.

The feature common to the variable focal-length lenses of FIGS. 47-55 mentioned above is that the shape of the medium acting as a lens is changed and thereby a variable focal length can be obtained. Such variable focal-length lenses, in contrast with those in which the refractive index is changed, have the merit that a variable focal-length range or a lens size can be arbitrarily chosen.

Figure 56:
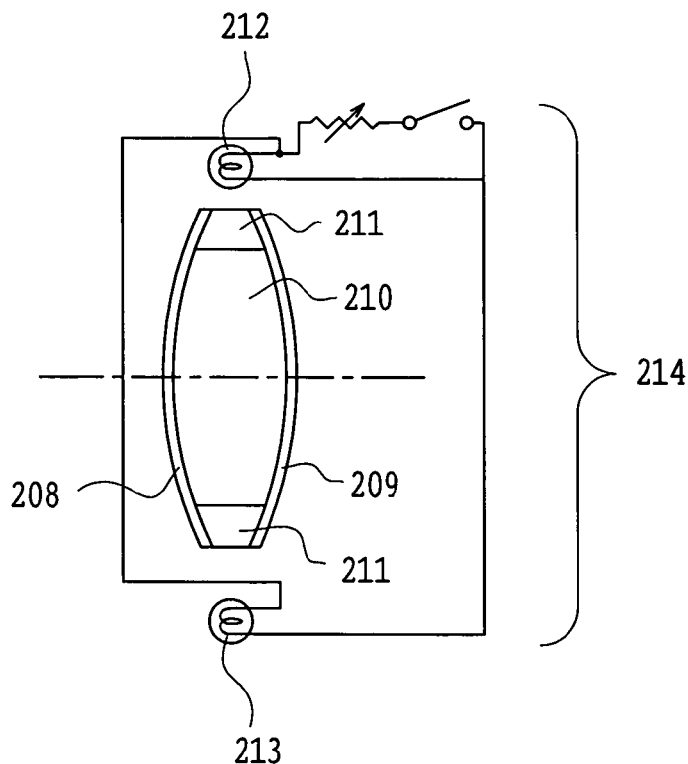
FIG. 56 is a view schematically showing a further example of the variable optical-property element, applicable to the optical system of the optical apparatus of the present invention, which is the variable focal-length lens using a photonical effect.

FIG. 56 shows a variable focal-length lens using a photomechanical effect in a further example of the variable optical-property element applicable to the optical system of the optical apparatus according to the present invention. A variable focal-length lens 214 of this example is designed so that azobenzene 210 is sandwiched between transparent elastic bodies 208 and 209 and is irradiated with ultraviolet light through a transparent spacer 211. In FIG. 56, reference numerals 212 and 213 represent sent ultraviolet light sources, such as ultraviolet LEDs or ultraviolet semiconductor lasers, of central wavelengths $\lambda_1$ and $\lambda_2$, respectively.

Figure 57A:
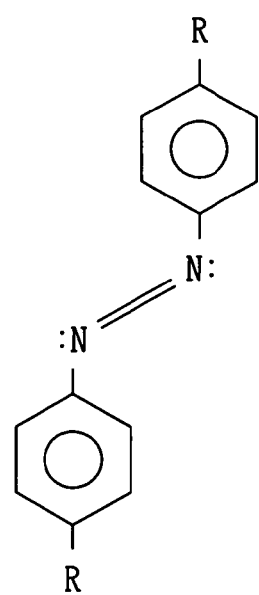
FIGS. 57A and 57B are explanatory views showing the structures of trans-type and cis-type azobenzene, respectively, used in the variable focal-length lens in FIG. 56.
Figure 57B:
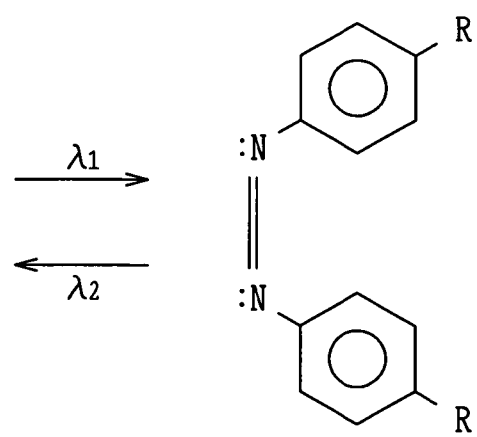

In the example, when trans-type azobenzene shown in FIG. 57A is irradiated with ultraviolet light of the central wavelength $\lambda_1$, the azobenzene 210 changes to cis-type azobenzene shown in FIG. 57B to reduce its volume. Consequently, the thickness of the variable focal-length lens 214 is decreased, and the function of the convex lens is impaired. On the other hand, when the cis-type azobenzene is irradiated with ultraviolet light of the central wavelength $\lambda_2$, the azobenzene 210 changes from the cis-type to the trans-type azobenzene to increase the volume. Consequently, the thickness of the variable focal-length lens 214 is increased, and the function of the convex lens is improved. In this way, the optical element 214 of the example acts as the variable focal-length lens. In the variable focal-length lens 214, since the ultraviolet light is totally reflected at the interface between each of the transparent elastic bodies 208 and 209 and air, the light does not leak through the exterior and high efficiency is obtained.

Figure 58:
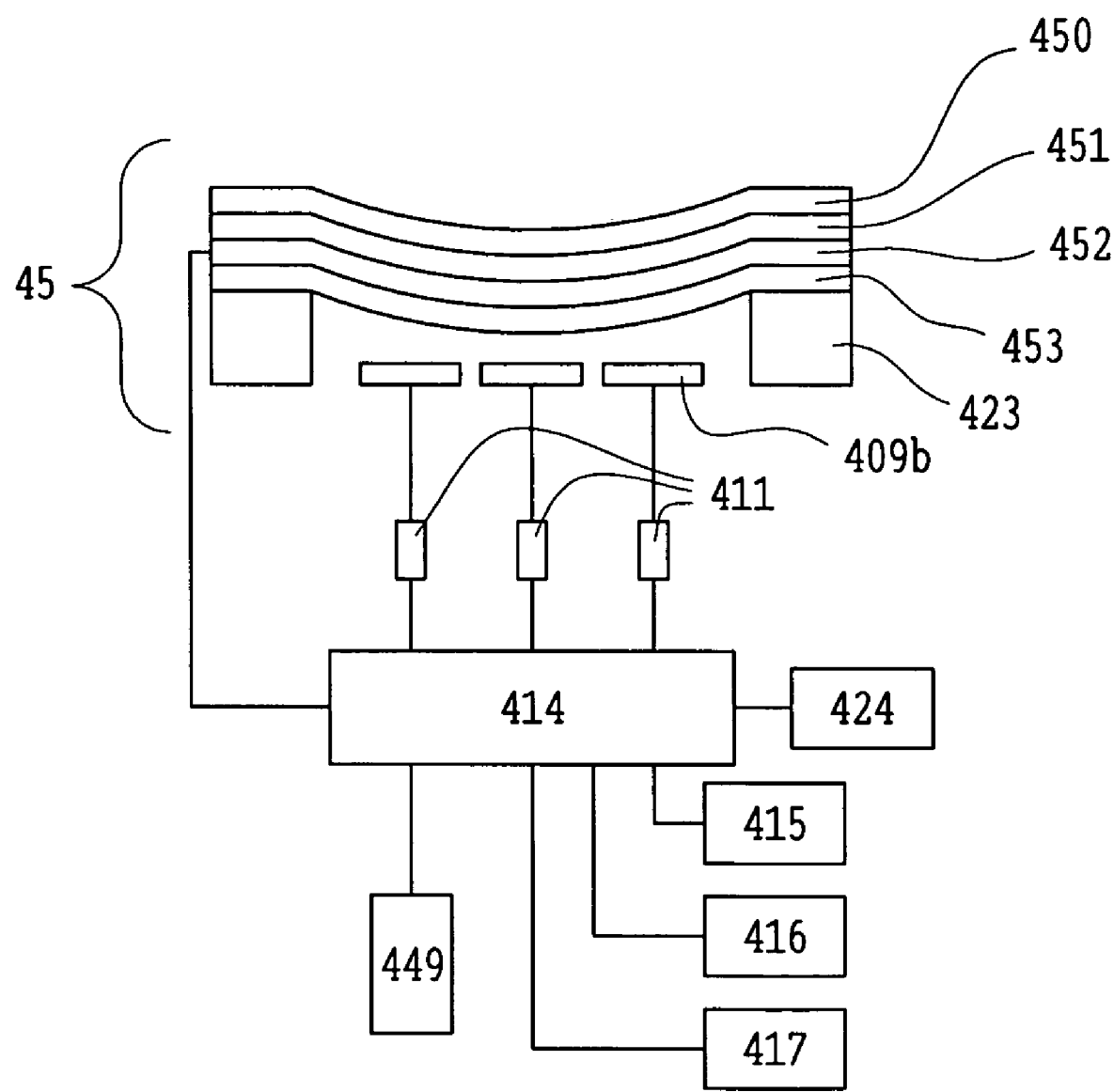
FIG. 58 is a view schematically showing another example of the variable mirror applicable to the optical system of the optical apparatus of the present invention.

FIG. 58 shows another example of the variable mirror applicable to the optical system of the optical apparatus according to present invention. This example is described on the assumption that the variable mirror is used in the imaging optical system of the digital camera. Again, in FIG. 58, reference numeral 411 designates the variable resistors housing variable resistors; 414, the arithmetical unit; 415, the temperature sensor; 416, the humidity sensor; 417, the range sensor; and 424, the shake sensor.

A variable mirror 45 of the example is constructed as a four-layer structure in which the divided electrodes 409b are spaced away from an electrostrictive substance 453 including an organic substance such as acrylic elastomer, whose periphery is supported by the support 423, an electrode 452 and a deformable substrate 451 are placed in turn on the electrostrictive substance 453, and a reflecting film 450 including a metal thin film, such as aluminum, for reflecting incident light is provided on the substrate 451.

The variable mirror, when constructed as mentioned above, has the merit that the surface profile of the reflecting film 450 becomes smooth and it is hard to produce aberration, in contrast to the case where the divided electrodes 409b and the electrostrictive substance 453 are integrally constructed.

Also, the deformable substrate 451 and the electrode 452 may be arranged in reverse order. In FIG. 58, reference numeral 449 stands for a button for changing the magnification of the optical system or zooming. The variable mirror 45 is controlled through the arithmetical unit 414 so that a user pushes the button 449 and thereby the reflecting film 450 can be deformed to change the magnification or zooming.

Also, instead of the electrostrictive substance including an organic substance such as acrylic elastomer, the piezoelectric substance such as barium titanate, already mentioned, may be used.

Also, although what follows is said in common with the variable mirrors applicable to the optical apparatus of the present invention, it is desirable that the shape where the portion of deformation of the reflecting surface is viewed from a direction perpendicular to the reflecting surface is long along the direction of the incident plane of an axial ray, for example, elliptical, oval, or polygonal. This is because the variable mirror, as in FIG. 33, is often used in a state where a ray of light is incident at a grazing angle. In order to suppress aberration produced in this case, it is desirable that the reflecting surface has a shape similar to ellipsoid of revolution, paraboloid of revolution, or hyperboloid of revolution. This s because it is desirable that in order to deform the reflecting surface of the deformable mirror into such a shape, the shape where the portion of deformation of the reflecting surface is viewed from a direction perpendicular to the reflecting surface is long along the direction of the incident plane of the axial ray.

Figure 59A:
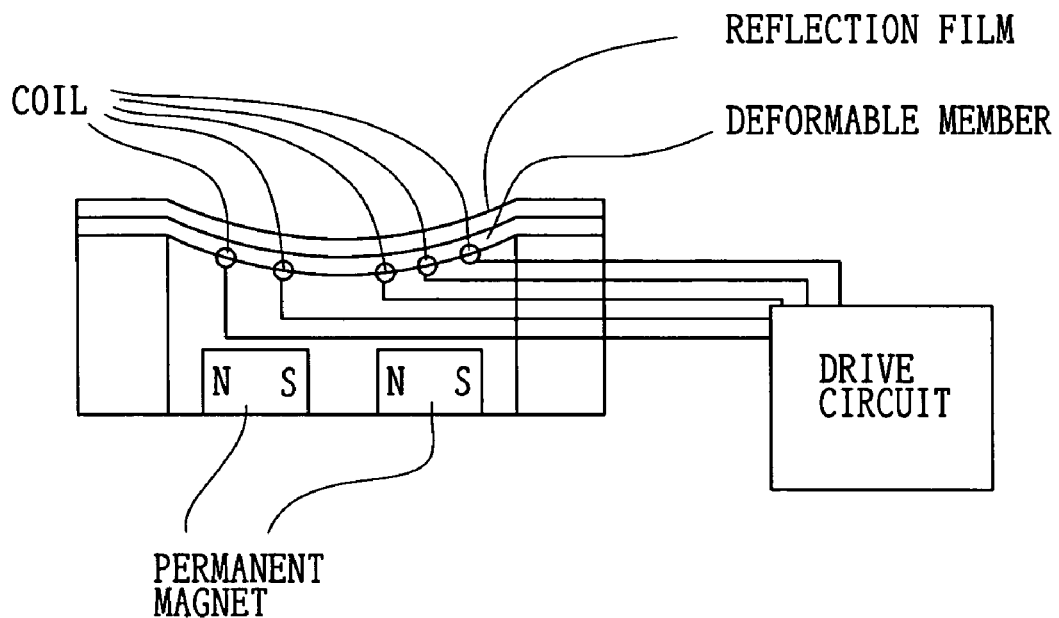
FIGS. 59A and 59B are a side view showing an electromagnetic driving variable mirror applicable to the optical system of the optical apparatus in the aspect of the present invention and a view looking from the opposite side of a reflection film, respectively.
Figure 59B:
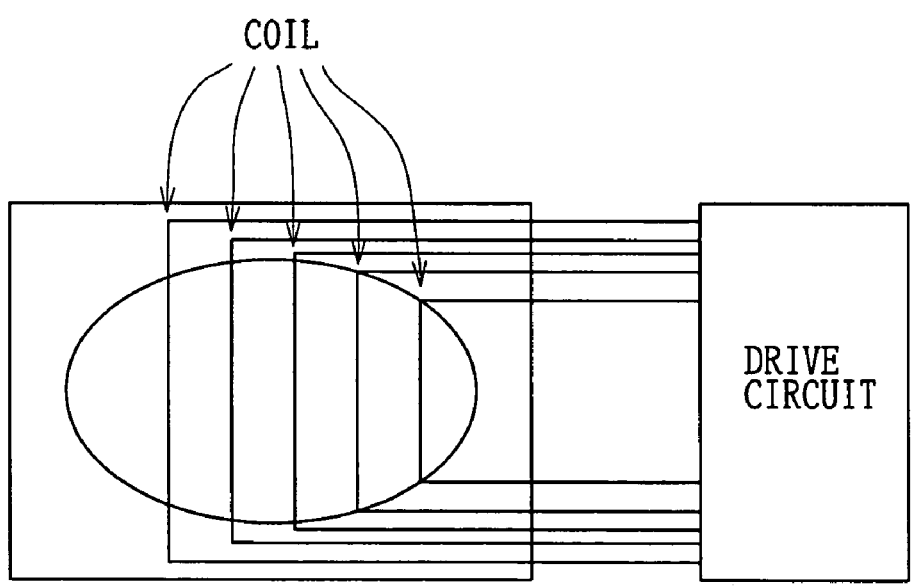

FIGS. 59A and 59B show the structure of an electromagnetic driving variable mirror applicable to the optical system of the optical apparatus according to the present invention. FIG. 59B is a diagram viewed from the opposite side of a reflection film. Coils (electrodes) are provided to a deformable member to supply the current from a driving circuit and thereby electromagnetic forces are produced in the magnetic fields of permanent magnets so that the shape of the mirror is changed. Since the use of thin film coils facilitates the fabrication of the coils and reduces their rigidity, it is easy to deform the mirror.

Figure 60:
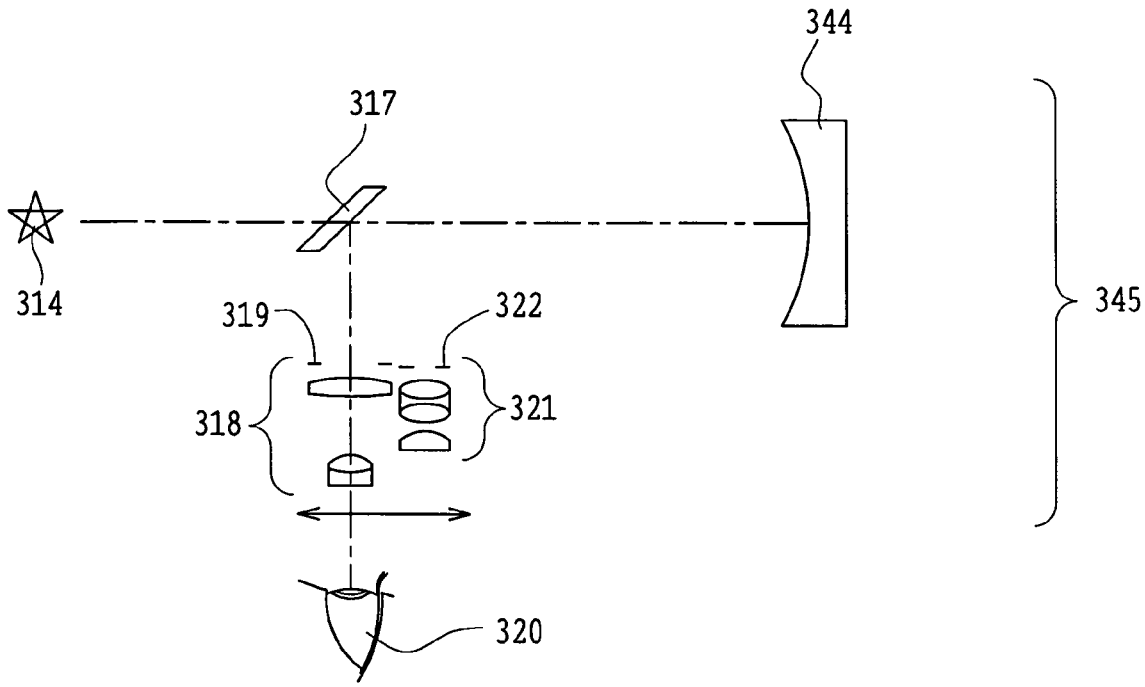
FIG. 60 is a view schematically showing a conventional example of a Newtonian reflecting telescope.

FIG. 60 shows a conventional example of a Newtonian reflecting telescope. In a telescope 345 of this example, light reflected by an objective 344 is bent by an oblique mirror 317 so that a real image is formed at the position of an field stop 319 of a low-magnification eyepiece 318 and can be observed through a user's eye 320. When a high-magnification eyepiece 321 is used instead of the low-magnification eyepiece 318, a high-magnification observation at about the center of the field of view can be carried out. In the figure, reference numeral 322 represents a field stop of the high-magnification eyepiece 321, and its size is smaller than that of the field stop 319 of the low-magnification eyepiece 318. The low-magnification eyepiece 318 is suitable for high-magnification observation on the optical axis. However, when the low-magnification eyepiece 318 is used, there is the problem that considerable coma is produced on the periphery of the field of view to impair the sharpness of an observation image.

Figure 61:
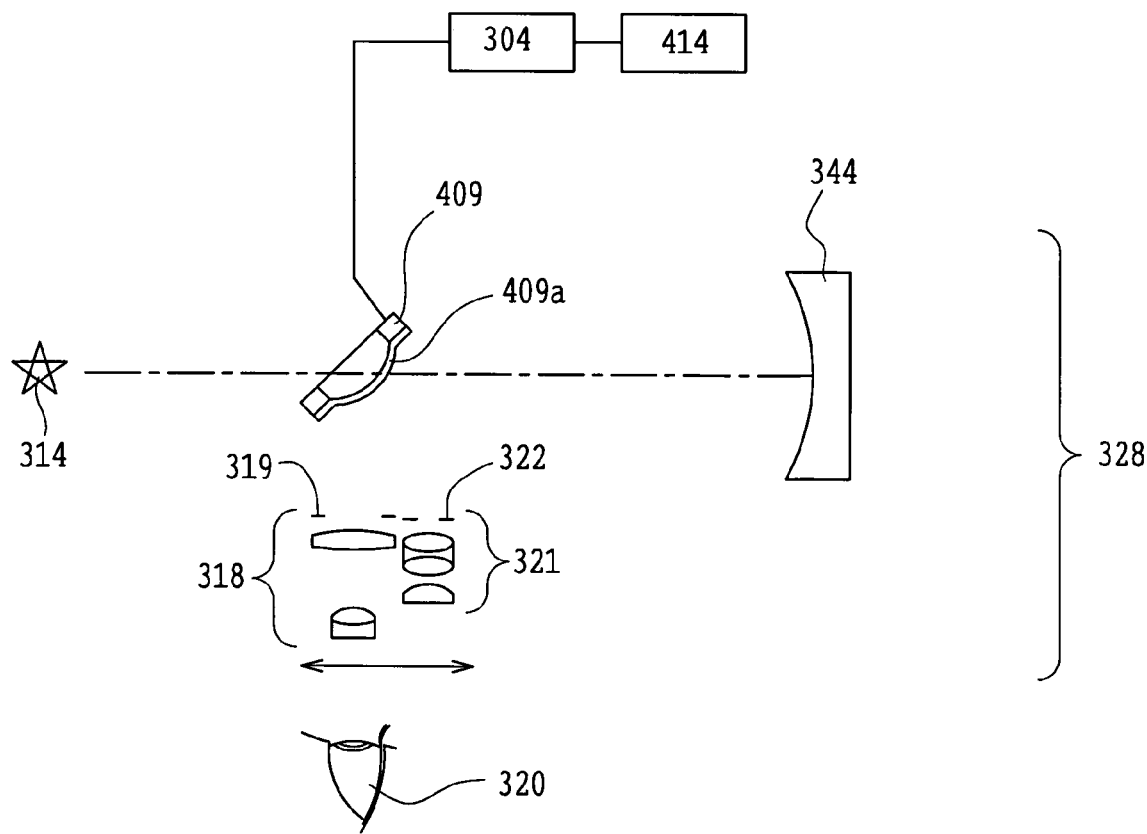
FIG. 61 is a view schematically showing a reflecting telescope using the deformable mirror which is the optical apparatus according to the present invention.

Thus, as shown in FIG. 61, in a reflecting telescope 328 using the deformable mirror 409 as the optical apparatus according to one aspect of the present invention, the deformable mirror 409 is used instead of the oblique mirror 317 to solve the above problem. Also, for the deformable mirror 409, an electromagnetic or piezoelectric driving variable mirror is adequate because it can be changed into a convex or a concave shape, but other driving ones may be used.

According to the reflecting telescope 328 of this example, when the low-magnification eyepiece 318 is used, the thin film 409a is deformed so that coma on the periphery of the image is reduced. Although the sharpness of the image at the center of the field of view is impaired, this drawback is invisible because of the low magnification, and a favorable image is obtained over the entire field of view. On the other hand, when the high-magnification eyepiece 321 is used, the thin film 409a becomes planar and an image which is free from aberration and has high sharpness can be observed at the center of the field of view as in the case of the conventional telescope 345 of FIG. 60. The deformable mirror 409 is driven by the driving circuit 304 so that aberration can be changed in accordance with the replacement of the eye-piece.

When the deformable mirror 409 is used, like the reflecting telescope 328 of this example, the sharpness of the image can be improved with respect to the area of an image used by the user even in an observation apparatus which has a variable magnification function. Also, instead of the deformable mirror 409, the variable focal-length lens may be used.

Figure 62:
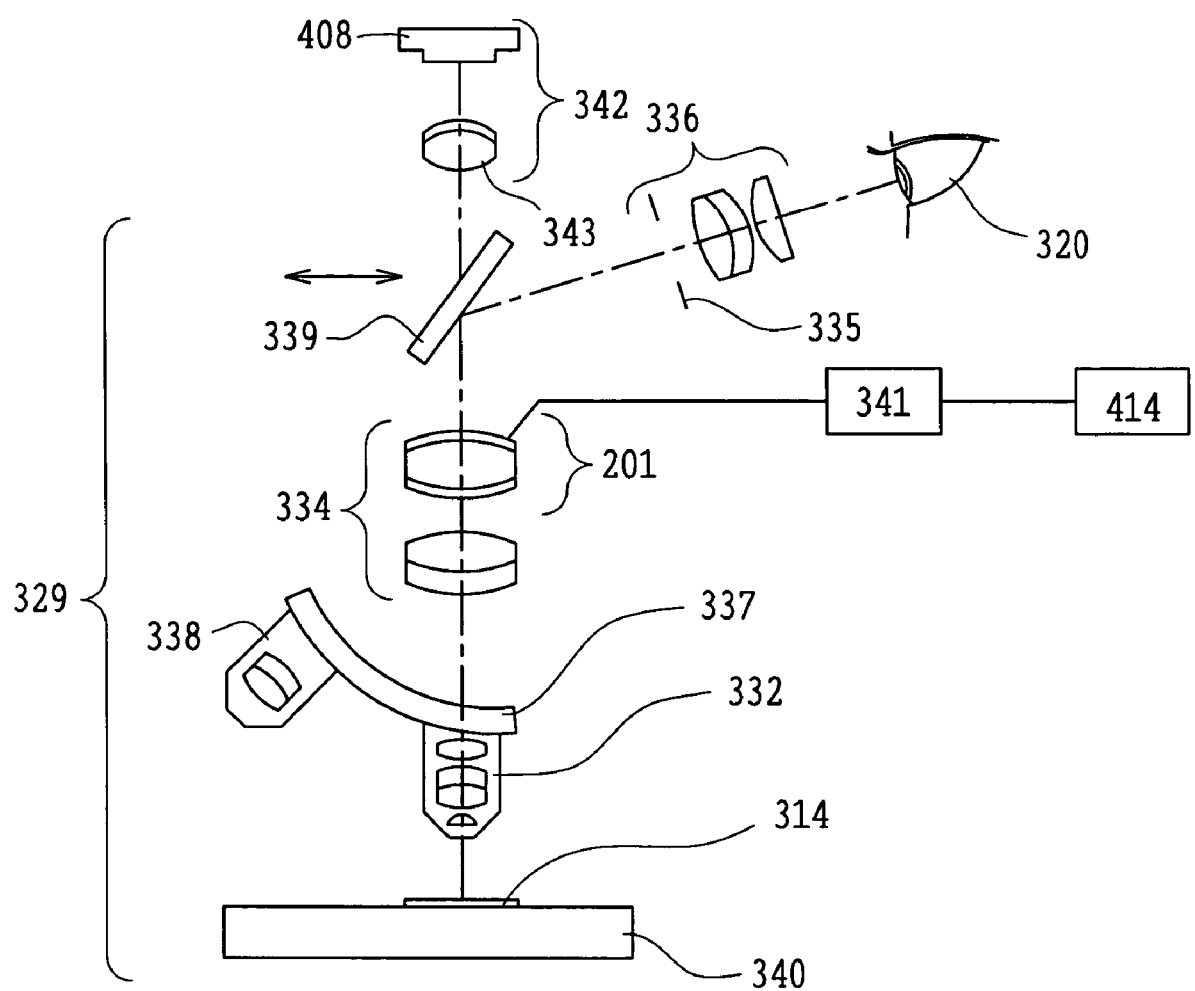
FIG. 62 is a view schematically showing a microscope using the variable focal-length lens which is also the optical apparatus according to the present invention.

FIG. 62 shows a microscope 329 using the variable focal-length lens 201 as the optical apparatus according to another aspect of the present invention. In the microscope 329 of this example, the image of an object 314 is magnified by a high-magnification objective lens 332 and is formed by a barrel lens 334 so that a real image is formed on a field stop 335. The real image is magnified through an eye-piece 336 and is observed by a viewer. The high-magnification objective lens 332 can be switched by a revolver 337 to a low-magnification objective lens 338.

In a conventional microscope, the barrel lens 334 is constructed with ordinary lens elements, and thus aberration caused by a combination of the objective lens and the barrel lens in accordance with the lens replacement fluctuates when the objective lens is changed. This does not necessarily bring about the best imaging state.

In contrast to this, the microscope of this example is constructed so that the refracting function of a ray of light of the variable focal-length lens 201 is changed in association with a change of the objective lens, and aberration due to the combination of the objective lens and the barrel lens is corrected most favorably. Specifically, in the microscope 329 of the example, when the area of an object to be observed is changed, the variable focal-length lens 201 is driven through the arithmetical unit 414 by a driving circuit 341 in order to change aberration of the variable focal-length lens 201 so that the sharpness of the image of the area becomes best.

Also, although aberration caused by combining the objective lens with the barrel lens is controlled so that it is optimized, aberrations caused by combining the objective lens, the barrel lens 334, and the eyepiece 336 may, of course, be controlled so that the variable focal-length lens 201 is changed with respect to each combination and thereby aberration is optimized.

In the above description, reference has been made to the case of an observation by the naked eye, but even in the case where the microscope is combined with a film camera, an electronic camera, or a TV camera, aberration can be likewise optimized.

In the microscope 329 shown in FIG. 62, a path switching mirror 339 is moved from the optical path to the left side of the figure and thereby photographing can be performed by a TV camera 342. In this case, aberration caused by a combination of a lens 343 of the TV camera, the barrel lens 334, and the objective lens is optimized by the variable focal-length lens 201 and thereby more favorable photographing can be carried out.

As mentioned above, in the optical apparatus in which optical units, such as a plurality of objective lenses, the eyepiece, and the barrel lens, are combined and used, aberration fluctuating due to each combination is optimized by changing the variable optical-property element like the variable focal-length lens 201, and thereby the sharpness of the image can be improved. In this example also, instead of the variable focal-length lens 201, the deformable mirror 409 may, of course, be employed.

Finally, the definitions of terms used in the present invention will be described.

The optical apparatus refers to an apparatus including an optical system or optical elements. The optical apparatus need not necessarily function by itself. That is, it may be thought of as a part of an apparatus.

The optical apparatus includes an imaging device, an observation device, a display device, an illumination device, and a signal processing device.

The imaging device refers to, for example, a film camera, a digital camera, a digital camera for PDAs, a robot's eye, a lens-exchangeable digital single-lens reflex camera, a TV camera, a moving-picture recorder, an electronic moving-picture recorder, a camcorder, a VTR camera, a digital camera of a mobile phone, a TV camera of a mobile phone, or an electronic endoscope. Any of the digital camera, a card digital camera, the TV camera, the VTR camera, a moving-picture recording camera, a digital camera of a mobile phone, and a TV camera of a mobile phone is an example of an electronic imaging device.

The observation device refers to, for example, a microscope, a telescope, spectacles, binoculars, a magnifier, a fiber scope, a finder, or a viewfinder.

The display device includes, for example, a liquid crystal display, a viewfinder, a game machine (Play Station by Sony), a video projector, a liquid crystal projector, a head mounted display (HMD), a personal digital assistant (PDA), or a mobile phone.

The illumination device includes, for example, a stroboscopic lamp for cameras, a headlight for cars, a light source for endoscopes, or a light source for microscopes.

The signal processing device refers to, for example, a mobile phone, a personal computer, a game machine, a read/write device for optical disks, an arithmetic unit for optical computers, an optical interconnector, or an optical information processor.

The image sensor refers to, for example, a CCD, a pickup tube, a solid-state image sensor, or a photographing film. The plane-parallel plate is included in one of prisms. A change of an observer includes a change in diopter. A change of an object includes a change in object distance, the displacement of the object, the movement of the object, vibration, or the shake of the object.

An extended surface is defined as follows:

Any shape such as a spherical, planar, or rotationally symmetrical aspherical surface; a spherical, planar, or rotationally symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. is satisfactory. Moreover, any surface which has some effect on light, such as a reflecting or refracting surface, is satisfactory. In the present invention, it is assumed that such a surface is generally referred as to the extended surface.

The variable optical-property element includes a variable focal-length lens, a variable mirror, a deflection prism whose surface profile is changed, a variable angle prism, a variable diffraction optical element in which the function of light deflection is changed, namely a variable HOE, or a variable DOE. The variable focal-length lens also includes a variable lens such that the focal length is not changed, but the amount of aberration is changed. The variable mirror includes a mirror such that the focal length is not changed, but the amount of aberration is changed. The variable focal-length lens includes a mirror provided with a reflecting surface, a variable focal-length mirror whose shape is not changed, or a deformable mirror whose shape is changed. In a word, an optical element in which the function of light deflection, such as reflection, refraction, or diffraction, can be changed is called the variable optical-property element.

In the present invention, an optical surface constituting the extended surface of the variable optical-property element, that is, an optical surface having the function of light deflection, is formed by the dimension that a light beam is not divided due to the difference of the position where a ray of light passes with respect to the light beam of the object.

An information transmitter refers to a device which is capable of inputting and transmitting any information from a mobile phone; a stationary phone; a remote control for game machines, TVs, radio-cassette tape recorders, or stereo sound systems; a personal computer; or a keyboard, mouse, or touch panel for personal computers. It also includes a TV monitor with the imaging device, or a monitor or display for personal computers. The information transmitter is included in the signal processing device.

What is claimed is:

1. An optical apparatus comprising:
an optical system having a reflection-type variable optical-property element;
a driving circuit configured to drive the reflection-type variable optical-property element;
an image sensor arranged at an image position of the optical system;
an arithmetical unit connected with the driving circuit; and
an image processor connected with the arithmetical unit,
wherein the image processor is provided with an electronic zoom function such that an image picked up by the image sensor is magnified based on electronic zoom data,
wherein the arithmetical unit performs a predetermined calculation based on an output of the image sensor and the electronic zoom data,
wherein the predetermined calculation generates a control signal that controls a ray-deflecting function of the reflection-type variable optical property element, and
wherein the ray-deflecting function of the reflection-type variable optical-property element is changed in accordance with performance of the electronic zoom function based on the control signal.

2. An optical apparatus according to claim 1,
wherein the optical system comprises at least two optical element units, and
wherein when the electronic zoom function is performed, at least one of the optical element units is subjected to a change.

3. An optical apparatus comprising:
an optical system having a reflection-type variable optical-property element;
an image sensor arranged at an image position of the optical system;
a driving circuit configured to drive the reflection-type variable optical-property element
an arithmetical unit connected with the driving circuit; and
an image processor connected with the arithmetical unit,
wherein the image processor is provided with an electronic zoom function in that an image picked up by the image sensor is magnified based on electronic zoom data,
wherein the arithmetical unit performs a predetermined calculation based on an output of the image sensor and the electronic zoom data,
wherein the predetermined calculation generates a control signal that controls the optical system, and
wherein a part of the optical system is changed in accordance with performance of the electronic zoom function based on the control signal.

4. An optical apparatus comprising:
an optical system including a reflection-type variable optical-property element;
a driving circuit configured to drive the reflection-type variable optical-property element;
an image sensor arranged at an image position of the optical system;
an arithmetical unit connected with the driving circuit; and
an image processor connected with the arithmetical unit,
wherein the image processor is provided with an electronic zoom function in that an image picked up by the image sensor is magnified based on electronic zoom data,
wherein the arithmetical unit performs a calculation for obtaining sharpness of an image in an area magnified by the electronic zoom function based on an output of the image sensor and the electronic zoom data,
wherein the calculation generates a control signal for maximizing the sharpness, and wherein the reflection-type variable optical-property element is driven by the driving circuit based on the control signal.

5. An optical apparatus comprising:
an optical system including a reflection-type variable optical-property element;

a driving circuit configured to drive the reflection-type variable optical-property element;

an image sensor arranged at an image position of the optical system;

an arithmetical unit connected with the driving circuit; and an image processor connected with the arithmetical unit, wherein the image processor is provided with an electronic zoom function in that an image picked up by the image sensor is magnified based on electronic zoom data, wherein the arithmetical unit performs a calculation for obtaining sharpness of an image in an area magnified by the electronic zoom function based on an output of the image sensor and the electronic zoom data, upon taking into consideration a change of an imaging state caused by at least one of a change of an object distances, temperature, humidity, a manufacturing error, a change with age, vibration, and an optical magnification change, wherein the calculation generates a control signal based on the sharpness, and wherein the reflection-type variable optical-property element is driven by the driving circuit based on the control signal.

6. An optical apparatus comprising:

an optical system including a reflection-type variable optical-property element;

a driving circuit configured to drive the reflection-type variable optical-property element;

an image sensor arranged at an image position of the optical system;

an arithmetical unit connected with the driving circuit; and an image processor connected with the arithmetical unit, wherein the image processor is provided with an electronic zoom function in that an image picked up by the image sensor is magnified based on electronic zoom data, wherein the arithmetical unit performs a calculation for obtaining sharpness of an image in an area magnified by the electronic zoom function based on an output of the image processor and the electronic zoom data, upon taking into consideration a manufacturing error of the optical apparatus, wherein the calculation generates a control signal for maximizing the sharpness, and wherein the reflection-type variable optical-property element is driven by the driving circuit based on the control signal.

7. An optical apparatus comprising:

an optical system including a reflection-type variable optical-property element;

a driving circuit configured to drive the reflection-type variable optical-property element;

an image sensor arranged at an image position of the optical system;

an arithmetical unit connected with the driving circuit; and an image processor connected with the arithmetical unit, wherein the image processor is provided with an electronic zoom function in that an image picked up by the image sensor is magnified based on electronic zoom data, wherein the arithmetical unit performs a calculation for obtaining an amount of aberration of an image in an area magnified by the electronic zoom function based on an output of the image processor and the electronic zoom data, wherein the calculation generates a control signal based on the amount of aberration, and wherein the reflection-type variable optical-property element is driven by the driving circuit based on the control signal.

8. An optical apparatus according to claim 1, wherein the optical system including the reflection-type variable optical-property element is a single focal-length optical system.

9. An optical apparatus according to claim 1, wherein the optical system including the reflection-type variable optical-property element is a zoom optical system.

10. An optical apparatus according to claim 1, further having an autofocus system.

11. An optical apparatus according to claim 1, wherein the driving circuit outputs driving information to be supplied to the variable optical-property element, and wherein image-pickup operation is performed while the driving information is changed to find a specific value of the driving information that causes a contrast of a picked-up image to be substantially maximized so that the variable optical-property element is driven on a basis of the specific value of the driving information.

12. An optical apparatus according to claim 1, wherein the optical apparatus further comprises a shake sensor so as to provide an image shake compensating function in that the reflection-type variable optical-property element is driven by the driving circuit in accordance with a shake detected by the shake sensor.

13. An optical apparatus comprising:

an optical system having a reflection-type variable optical-property element;

a driving circuit configured to drive the reflection-type variable optical-property element;

an image sensor arranged at an image position of the optical system;

an arithmetical unit connected with the driving circuit; and an image processor connected with the arithmetical unit, wherein the optical system further comprises at least one optical element unit, wherein the image processor is provided with an electronic zoom function in that an image picked up by the image sensor is magnified based on electronic zoom data, wherein the reflection-type variable optical-property element and the optical element unit are driven in association with one another in accordance with performance of the electronic zoom function, wherein the arithmetical unit performs a calculation for obtaining sharpness of an image in an area magnified by the electronic zoom function based on an output of the image processor and the electronic zoom data, wherein the calculation generates a control signal based on the sharpness, and wherein the reflection-type variable optical-property element is driven by the driving circuit based on the control signal.

14. An optical apparatus according to claim 1, further comprising a stop constructed and arranged to be opened when the electronic zoom function is performed.

15. An optical apparatus according to claim 1, wherein the image sensor comprises a plurality of pixels and an electronic zoom magnification by the electronic zoom function satisfies the following condition in a preset state:

$$1.05 < \beta_E > 30 \times \sqrt{(M/10^6)}$$

where $\beta_E$ is the electronic zoom magnification and M is a number of the pixels of the image sensor.

16. An optical apparatus according to claim 1, wherein the image sensor comprises a plurality of pixels and a number of the pixels of the image sensor satisfies the following condition in a preset state:

$$M \geq \text{two hundred thousand}$$

where M is the number of the pixels of the image sensor.

17. An optical apparatus according to claim 1, wherein the optical apparatus is a telephone.

18. An optical apparatus according to claim 1, wherein the optical apparatus is a mobile phone.

19. An optical apparatus according to claim 1, further comprising an image display element for displaying the image.

20. An optical apparatus according to claim 1, wherein the optical apparatus is an endoscope.

21. An optical apparatus according to claim 1, wherein the variable optical-property element is a variable mirror.

22. An optical apparatus according to claim 1, wherein the optical system comprises at least two optical element units, and wherein when the electronic zoom function is performed, at least one of the optical element units is moved to thereby maximize sharpness of a part of an image to be used.

23. An electronic imaging apparatus comprising:

an optical system having a reflection-type variable optical-property element;

a stop arranged in the optical system;

an image sensor arranged at an image position of the optical system;

a driving circuit configured to drive the reflection-type variable optical-property element;

an arithmetical unit connected with the driving circuit; and an image processor connected with the arithmetical unit, wherein the image processor is provided with an electronic zoom function in that an image picked up by the image sensor is magnified based on electronic zoom data, wherein the arithmetical unit performs a calculation for obtaining a value of F number based on the electronic zoom data, wherein the calculation generates a control signal based on the value of F number, and wherein, when the electronic zoom function is performed, the stop is opened larger than in a condition where the electric zoom function is unused, based on the control signal.

* * * * *

UNITED STATES PATENT AND TRADEMARK OFFICE
CERTIFICATE OF CORRECTION

PATENT NO. : 7,269,344 B2  Page 1 of 1
APPLICATION NO. : 10/775340
DATED : September 11, 2007
INVENTOR(S) : Kimihiko Nishioka et al.

It is certified that error appears in the above-identified patent and that said Letters Patent is hereby corrected as shown below:

Column 65, line 3, claim 15, line 3, please replace the listed formula with $$-- \quad 1.05 < \beta_E < 30 \times \sqrt{(M/10^6)} \quad --.$$

Signed and Sealed this

Third Day of June, 2008

JON W. DUDAS
*Director of the United States Patent and Trademark Office*